United States Patent [19]
Takada et al.

[11] Patent Number: 5,715,104
[45] Date of Patent: Feb. 3, 1998

[54] MAGNETIC RECORDING AND REPRODUCING APPARATUS FOR HIGH SPEED DUBBING

[75] Inventors: Yukari Takada; Ken Onishi; Kimitoshi Hongo, all of Nagaokakyo, Japan

[73] Assignee: Mitsubishi Denki Kabushiki Kaisha, Tokyo, Japan

[21] Appl. No.: 532,109

[22] Filed: Sep. 22, 1995

Related U.S. Application Data

[62] Division of Ser. No. 308,630, Sep. 19, 1994, Pat. No. 5,481,414, which is a continuation of Ser. No. 113,319, Aug. 30, 1993, abandoned, which is a continuation of Ser. No. 592,038, Oct. 3, 1990, abandoned.

[30] Foreign Application Priority Data

| Oct. 4, 1989 | [JP] | Japan | 1-260810 |
| Oct. 30, 1989 | [JP] | Japan | 1-283346 |
| Nov. 6, 1989 | [JP] | Japan | 1-289015 |
| Nov. 24, 1989 | [JP] | Japan | 1-305120 |
| Dec. 4, 1989 | [JP] | Japan | 1-315858 |
| Dec. 4, 1989 | [JP] | Japan | 1-315859 |
| Dec. 16, 1989 | [JP] | Japan | 1-326246 |
| Dec. 22, 1989 | [JP] | Japan | 1-333906 |

[51] Int. Cl.$^6$ ............................... G11B 5/86
[52] U.S. Cl. ............. 360/15; 360/13; 360/61; 386/52; 386/112
[58] Field of Search ............. 360/15, 10.1, 10.3, 360/61, 64, 13, 73.06; 386/46, 52, 109, 123, 124, 112

[56] References Cited

U.S. PATENT DOCUMENTS

| 4,053,904 | 10/1977 | Williams et al. | 354/1 |
| 4,053,906 | 10/1977 | Schultz | 354/1 |
| 4,628,373 | 12/1986 | Takahashi et al. | 360/62 |
| 4,656,536 | 4/1987 | Turumoto et al. | 360/77.2 |
| 4,803,570 | 2/1989 | Kashida et al. | 360/61 |
| 4,825,305 | 4/1989 | Itoh et al. | 360/32 |
| 5,023,731 | 6/1991 | Murisaki | 360/64 |
| 5,083,225 | 1/1992 | Morisaki et al. | 360/15 X |
| 5,181,146 | 1/1993 | Koga | 360/10.1 X |
| 5,359,471 | 10/1994 | Hasegawa | 360/64 |

FOREIGN PATENT DOCUMENTS

| 0 177263 | 4/1986 | European Pat. Off. . |
| 0 316954 | 5/1989 | European Pat. Off. . |
| 2 095645 | 1/1972 | France . |
| 61-165801 | 7/1986 | Japan . |
| 62-40789 | 8/1987 | Japan . |
| 1-59962 | 4/1989 | Japan . |

OTHER PUBLICATIONS

Patent Abstracts of Japan, vol. 10, No. 371, p. 526, Kokai No. 61-165801.

*Primary Examiner*—Andrew L. Sniezek

[57] ABSTRACT

A magnetic recording and reproducing apparatus capable of recording video, audio and other information on a magnetic tape by, for example, the helical scanning method. A rotary head is rotated at an m-fold speed to record intermittent tracks on the magnetic tape so that real-time simultaneous monitoring is performed. By high-speed dubbing due to high-density intermittent recording and by increasing the number of repetition of track scanning, the information is recorded and reproduced simultaneously with a plurality of channels. Any tracking error is detected to form a continuous and uniform track pattern. With this intermittent comb-shaped recording, reciprocating recording and reproducing can be realized.

16 Claims, 45 Drawing Sheets

(DURING SELF-RECORDING AND REPRODUCING)

(DURING DUBBING)

FIG. 47
PRIOR ART

| D(1,1) | C(1,1) | D(1,2) | C(1,2) | P$_H$(1,3) | C(1,3) |
|---|---|---|---|---|---|
| D(2,1) | C(2,1) | D(2,2) | C(2,2) | P$_H$(2,3) | C(2,3) |
| D(3,1) | C(3,1) | D(3,2) | C(3,2) | P$_H$(3,3) | C(3,3) |
| D(4,1) | C(4,1) | D(4,2) | C(4,2) | P$_H$(4,3) | C(4,3) |
| D(5,1) | C(5,1) | D(5,2) | C(5,2) | P$_H$(5,3) | C(5,3) |
| D(6,1) | C(6,1) | D(6,2) | C(6,2) | P$_H$(6,3) | C(6,3) |
| D(7,1) | C(7,1) | D(7,2) | C(7,2) | P$_H$(7,3) | C(7,3) |
| D(8,1) | C(8,1) | D(8,2) | C(8,2) | P$_H$(8,3) | C(8,3) |
| P$_V$(9,1) | C(9,1) | P$_V$(9,2) | C(9,2) | P$_H$(9,3) | C(9,3) |

FIG. 48
PRIOR ART

| D(2,1) | | D(2,2) | | | |
|---|---|---|---|---|---|
| | C(2,1) | | C(2,2) | P$_H$(2,3) | C(2,3) |
| | | | | | |
| | | | | | |
| | | | | | |
| | C(6,1) | | | | C(6,3) |
| D(6,1) | | | | P$_H$(6,3) | |
| | | | | | |
| P$_V$(9,1) | C(9,1) | P$_V$(9,2) | C(9,2) | | |

D : INFORMATION DATA     P$_H$ : HORIZONTAL PARITY

C : ERROR DETECTION DATA     P$_V$ : VERTICAL PARITY

FIG.49
PRIOR ART

| D(2,1) | | | | | | |
|---|---|---|---|---|---|---|
| | ▨ | C(2,1) | D(2,2) | C(2,2) | P_H(2,3) | C(2,3) |
| | | | | | | |
| | | | | | | |
| | | | | | | |
| | ▨ | C(6,1) | D(6,2) | | P_H(6,3) | C(6,3) |
| D(6,1) | | | | | | |
| | | | | | | |

MAGNETIC RECORDING AND REPRODUCING APPARATUS FOR HIGH SPEED DUBBING

This application is a divisional of application Ser. No. 08/308,630, filed on Sep. 19, 1994, now U.S. Pat. No. 5,481,414 which was a Continuation of 08/113,319 filed Aug. 30, 1993 which was a Continuation of 07/592,038, filed Oct. 3, 1990, both now abandoned, the entire contents of which are hereby incorporated by reference.

BACKGROUND OF THE INVENTION

1. Field of the Invention

The present invention relates to a magnetic recording and reproducing apparatus for recording video and audio information on a magnetic tape in a helically scanning system.

2. Description of the Related Art

For accurately recording a digital video signal and a digital audio signal by a digital video tape recorder, it has been necessary to confirm the state of recording by reproducing the recorded data soon after recording, namely, to perform simultaneous monitoring.

(1) First Prior Art

FIG. 41 of the accompanying drawings shows a prior digital video tape recorder disclosed in, for example, Japanese Patent Publication No. 40789/1987.

In FIG. 41, reference numerals 1-1,1-2 designate a pair of rotary magnetic heads. These two rotary magnetic heads 1-1, 1-2 are supported by an electric strain element, as shown FIGS. 42 and 43. The electric strain element is a bimorph plate 3-1. The magnetic head 1-1 is attached to one end of the bimorph plate 3-1, and the other end of the bimorph plate 3-1 is attached to a base plate 5 by an adhesive 4. damper member 6 is disposed between the base plate 5 and the bimorph plate 3-1.

In this case, when a voltage is applied to the bimorph plate 3-1, a direction of polarization of the bimorph plate 3-1 is selected in such a manner that the head 1-1 is moved laterally of the track, as indicated by the arrow 7, according to the polarity and level of the voltage.

For better explanation, in FIG. 41, the heads 1-1, 1-2 are both shown in two separate positions, one pair for the signal system and the other pair for the drive system. Actually, however, there exist only one pair of heads 1-1, 1-2.

The base plate 5 is attached to a rotary drum (not shown) in such a manner that the heads 1-1, 1-2 are angularly spaced from each other by 180° and have no step therebetween. The heads 1-1, 1-2 are rotated at, for example, a rate of 30 rotations per second (ratio corresponding to the frame frequency of a brightness signal) as the driving force of a motor 8 is transmitted to the rotary drum via a rotating shaft 9.

A magnetic tape 10 is wound around the circumferential surface of the rotary drum obliquely with respect to the rotating shaft 9 through the range of larger than 180°. The magnetic tape 10 is continuously fed at a constant rate of speed (tape speed) by a capstan and a pinch roller (not shown).

Assuming that the tape speed during reproducing is 1, the tape speed during recording is ½. When digital data as a signal are supplied to the head 1-1 or 1-2, digital data per oblique track 11, i.e., one block of digital data corresponding to one field period of brightness signal are recorded on the tape 10. Simultaneously with this, control pulses (whose frequency is ½ of rotational frequency of the head 1-1, 1-2) are recorded on a control track 12 along an edge portion of the tape 10.

FIG. 41 shows a correcting circuit 13 for correcting inclination of scanning locus of the head 1-1, 1-2 during recording, a tracking servo circuit 14, a system control circuit 15 for controlling the video tape recorder into the recording mode, reproducing mode, etc., a CPU 16, a clock pulse generator circuit 17, and a frequency dividing circuit 18.

The frequency dividing circuit 18 outputs a frequency-division pulse of a frequency (corresponding to the frame frequency of a brightness signal) equal to the rotational frequency of the head 1-1, 1-2.

The correcting circuit 13 are composed of saw-tooth wave generators 19, 20, amplifiers 21, 22, an adder 23, and a voltage source 24. The tracking servo circuit 14 is composed of a phase comparing circuit 25, and amplifiers 26, 27, 28.

29, 30, 31, 32 designate interface circuits (I/O port); and 33, 34, 35, 36, 37 designate recording/reproducing change-over switches. The recording/reproducing change-over switches 33, 34, 35, 36, 37 will be connected to a junction R during recording, and will be connected to a junction P during reproducing. 38 designates a memory serving as a signal source of digital data.

In recording, the video tape recorder is rendered to the recording mode by the system control circuit 15. At that time, the tape 10 is continuously moved at a speed that is a half the speed during reproducing.

Meanwhile, the rotations of the head 1-1, 1-2 are synchronized with the recording data. Specifically, a frequency-division pulse from the frequency dividing circuit 18 is supplied to the phase comparing circuit 25, and one pulse from a pulse generating means 39 supported on the rotating shaft 9 is taken out for every rotation to the head 1-1, 1-2. This pulse is supplied to the phase comparing circuit 25 via the amplifier 26.

A signal of comparison frequency generated as a result of comparison at the phase comparing circuit 25 is supplied to the motor 8 via the amplifiers 27 so that the head 1-1, 1-2 is rotated at a constant phase.

Another pulse generating means 40 is supported on the rotating shaft 9. The pulse generating means 40 outputs one pulse for every rotation of the head 1-1, 1-2 which pulse is displaced in phase from the pulse from the pulse generating means 39 by a ½ of rotation of the head 1-1, 1-2. This pulse is supplied an RS flip-flop circuit 41 via the amplifier 28. In the meantime, a pulse from the amplifier 26 is supplied to the RS flip-flop circuit 41. As a result of these inputs, a rectangular wave signal Sv is out, from the RS flip-flop circuit 41, so as to be "1" in the period of a ½ rotation Ta in which the head 1-1 is in contact with the tape 10 and so as to be "0" in the period of the other ½ rotation Tb in which the head 1-2 is in contact with the tape 10, as shown in FIG. 45.

This signal Sv is supplied to the CPU 16 via the interface circuit 32. The CPU 16 discriminates whether which one of the heads 1-1, 1-2 is in contact with the tape 10 depending on whether the signal Sv is "1" or "0".

The output of the system control circuit 15 is supplied to the CPU 16 via the interface circuit 31 to start recording data.

Specifically, when it enters the period Ta, one block of the data stored in the memory 38 is read according to an instruction from the CPU 16 and is then supplied to the head 1-1 via the CPU 16, the interface circuit 29, the recording amplifier 42 and the junction of the switch 33.

As a result, one block of data has been recorded as one oblique track 11A, as shown in FIG. 44.

In this case, however, since the tape speed during recording is ½ of that during reproducing, the track 11A would have been inclined with respect to the scanning locus of the head 1-1, 1-2 during reproducing.

During this recording, the inclination of the track 11a is corrected by the correcting circuit 13 so as to aligned with the scanning locus of the head 1-1, 1-2 during reproducing.

Specifically, when the signal Sv is supplied to the sawtooth wave signal forming circuit 19, a saw-tooth wave signal Sa rising during every period Ta, as shown in FIG. 45. This signal Sa is supplied to the bimorph plate 3-1, which supports the head 1-1, via the amplifier 21 and the junction R of the switch 36.

Since this bimorph plate 3-1 yields depending on the polarity and level of the signal Sa, the head 1-1 will be displaced laterally of the track.

Namely, by presetting the polarity and level of the signal Sa, the track 11A to be formed by the head 1-1 can be formed so as to be aligned with the scanning locus of the head 1-1 during reproducing.

Thus a first block of data has been recorded on the tape 10 as the track 11A.

When it enters the period Tb, the head 1-2 comes in contact with the tape 10. At that time, a reverse signal $\overline{Sv}$ which is opposite to the signal Sv is taken out from the RS flip-flop circuit 41. This reverse signal $\overline{Sv}$ is supplied to the saw-tooth wave signal forming circuit 20, and as a result, rises during the period Tb, and a saw-tooth wave Sb having a waveform similar to the signal Sa will be formed. This signal Sb is supplied to a bimorph plate 3-2, which supports the head 1-2, via the adder circuit 23, the amplifier 22 and the junction R of the switch 37.

Therefore, when the head 1-2 is in contact with the tape 10 during the period Tb, the head 1-2 scans the tape 10 in parallel to the track 11A.

During that time, since the tape speed is ½ of that during reproducing, the head 1-2 scans the tape 10 between the previous track 11A and the next track 11B (which is not yet formed).

Then, a predetermined d.c. bias voltage is taken out from the d.c. voltage source 24 and is supplied to the bimorph plate 3-2 via the adder circuit 23, the amplifier 22 and the line of switch 37. As a result, since the bimorph plate 3-2 yields to an extent corresponding to the d.c. bias voltage, the head 1-2 scans the track 11A while the head 1-2 is in contact with the tape 10.

During the period Tb, a reproducing signal of the track 11a which the head 1-1 recorded during the previous period Ta, can be obtained from the head 1-2.

This reproducing signal is supplied to a switch circuit 44 via a reproducing amplifier 43. At the same time, a signal Sv is supplied to the switch circuit 44. The switch circuit 44 is controlled according to this signal Sv, and as a result, the reproducing signal is supplied to the CPU 16 via the interface circuit 30.

In the CPU 16, this reproducing signal is compared with the data in the memory 38.

Thus, the data recorded as the track 11A by the head 1-1 during the period Ta are reproduced by the head 1-2 during the period Tb, and are compared with the original data.

As a result of this comparison, if there is no error in recording on the track 11A, the next block of data is recorded as the track 11B during the following period Ta by the head 1-1. Further, in the subsequent period Tb, the track 11B is reproduced by the head 1-2 and is then compared with the original data.

Thus, in the period Ta, one block of data is recorded as the track 11 by the head 1-1, and in the subsequent period Tb, the track 11 recorded in the previous period Ta is reproduced by the 1-2. Then the state of recording of the track 11 is confirmed, and operation is repeated in the absence of any error in recording.

Meanwhile, if there is found an error in the records on track 11A as a result of this comparison during the period Tb, one block of data to be recorded on the track 11A is recorded on the track 11B during the next period Ta, and in the subsequent period Tb, this track 11B is reproduced to confirm the records.

In the absence of any error in the records of the track 11B, the next block of data is recorded on the track 11 in the next period Tc.

In the presence of any error in recording, the track 11 is skipped and the data are recorded on the track 11 in order as the latter is shifted.

As described above, data are progressively recorded on the tape 10 one block to another as the track 11 while recording and conformation of the recording are conducted alternately.

During this recording, the frequency-division pulse from the frequency dividing circuit 18 is further supplied to a frequency dividing circuit 45 so as to be a ½ frequency pulse (having a frequency which is ½ the rotational frequency of the head 1-1, 1-2). This pulse is supplied to a head 47 via a recording amplifier 46 and the junction R of the switch 35 and is recorded on the tape 10 as the track 12.

During reproducing, the bimorph plate 3-1, 3-2 is rendered to assume a reference voltage by the switch 36, 37 so that the head 1-1, 1-2 is fixed at a reference position. By the system control circuit 15, the tape 10 is continuously fed at a speed double the speed during recording.

At that time, a pulse (a control pulse) having a frequency equal to the rotational frequency of the head 1-1, 1-2 is reproduced from the track 12 by the head 47. This pulse is supplied to the phase comparing circuit 25 via the junction P of the switch 35, a reproducing amplifier 48 and the junction P of the switch 34.

The output of the phase comparing circuit 25 is supplied to the motor 8 via the amplifier 27; that is, by the result of phase comparison of the pulses in the comparing circuit 25, the motor 8 is controlled.

Thus, the tracking servo control of the head 1-1, 1-2 with respect to the track 11 is performed, and the heads 1-1, 1-2 alternately scan the track 11, so that reproducing signals can be obtained alternately from the heads 1-1, 1-2.

The reproducing signal of the head 1-1 is supplied to the switch circuit 44 via the junction P of the switch 33 and a reproducing amplifier 49. On the other hand, the reproducing signal of the head 1-2 is supplied to the switch circuit 44 via the reproducing amplifier 43. From the switch circuit 44, reproducing signals of the track 11 are taken out successively. The reproducing signal is supplied to the CPU 16 via the interface circuit 30, and is stored in, for example, the memory 38.

With this prior art, for one second, for example, only the signal whose quantity corresponds to 30 field periods of the brightness signal can be processed. Therefore it is impossible to process, with real time, signals such as television signals that continue 60 fields in one second.

(2) Second Prior Art

FIG. 46 shows another prior art magnetic recording and reproducing apparatus disclosed in, for example, Japanese Patent Laid-Open Publication No. 133573/1985. In FIG. 46, 101-1 and 101-2 designate a pair of magnetic heads, and 102 designates a rotary drum. The magnetic heads 101-1, 101-2 are mounted on the peripheral edge of the rotary drum 102 and are angularly spaced from each other by 180°.

110 designates a magnetic tape, and 114 designates a mechanism control circuit. The mechanism control circuit 114 controls the number of rotations of the rotary drum 102 and the feeding of the magnetic tape 110.

A low-pass filter (hereinafter called "LPF") makes a band restriction for sampling the inputted recording video signal. An A/D converter 151 samples the band-restricted recording video signal. An encoder 152 encodes digitized recording video data so that an error which occurred when the data are magnetically recorded and reproduced can be corrected. A modulator 153 encodes the encoded recording video data so as to be optimum data suitable for magnetic recording and reproducing. A head amplifier 142 amplifies the recording video data signal during recording and drives the magnetic heads 101-1, 101-2.

A reproducing head amplifier 143 amplifies the reproducing signal reproduced by the magnetic heads 1-1, 1-2 during reproducing. A demodulator 154 decodes the reproducing signal in the manner reverse to the encoding in the modulator 153. A decoder 155 detects and corrects any error in the decoded data. A D/A convecter 156 reproducing video data whose error has been corrected by the decoder 155 in an analog form. An LPF 157 restricts the reproducing video signal to a video signal band and outputs the restricted signal.

A self-recording-and-reproducing/dubbing change-over switch (hereinafter called "change-over switch") 158 is disposed between the encoder 152 and the modulator 153. The change-over switch 158 makes a change-over between the self-recording-and-reproducing mode and the dubbing mode and is controlled by a change-over signal. By this change-over action of the change-over switch 158, the dubbing input signal or the output of the encoder 152 is inputted to the modulator 153. In the meantime, the output of the demodulator 155 is supplied to the D/A converter 156 and is outputted to the exterior as a dubbing output signal.

A synchronizing signal from an external apparatus is inputted to the mechanical control circuit 114 to synchronize the mechanical control circuit 114 with the external apparatus. The mechanical control circuit 114 outputs an exterior synchronizing signal. This exterior synchronizing signal is a reference signal for controlling the number of rotations of a rotary drum and the feed of a tape.

FIG. 47 is a data diagram showing one example of operation of the error correcting encoder 152. In FIG. 47, D(1, 1), D(1, 2), D(2, 1), D(2, 2), . . . D(8, 1), D(8, 2) designate information data; C(1, 1), C(1, 2), c(1, 3), c(2, 1), c(2, 2), c(2, 3), . . . c(9, 1), c(9, 2), C(9, 3,), error detection data; $P_H(1, 3)$, $P_H(2, 3)$ . . . $P_H(9, 3)$, horizontal parity data; and $P_V(9, 1)$, $P_V(9, 2)$, vertical parity data.

FIG. 48 shows, of the data shown in FIG. 47, the data in which errors occurred. Here assume that the error data exist in the second of D(2, 1), the fifth of D(2, 1), the fifth of D(2, 2), the fifth of D(6, 1) and the fifth of $P_H(6, 3)$.

Figure 49:
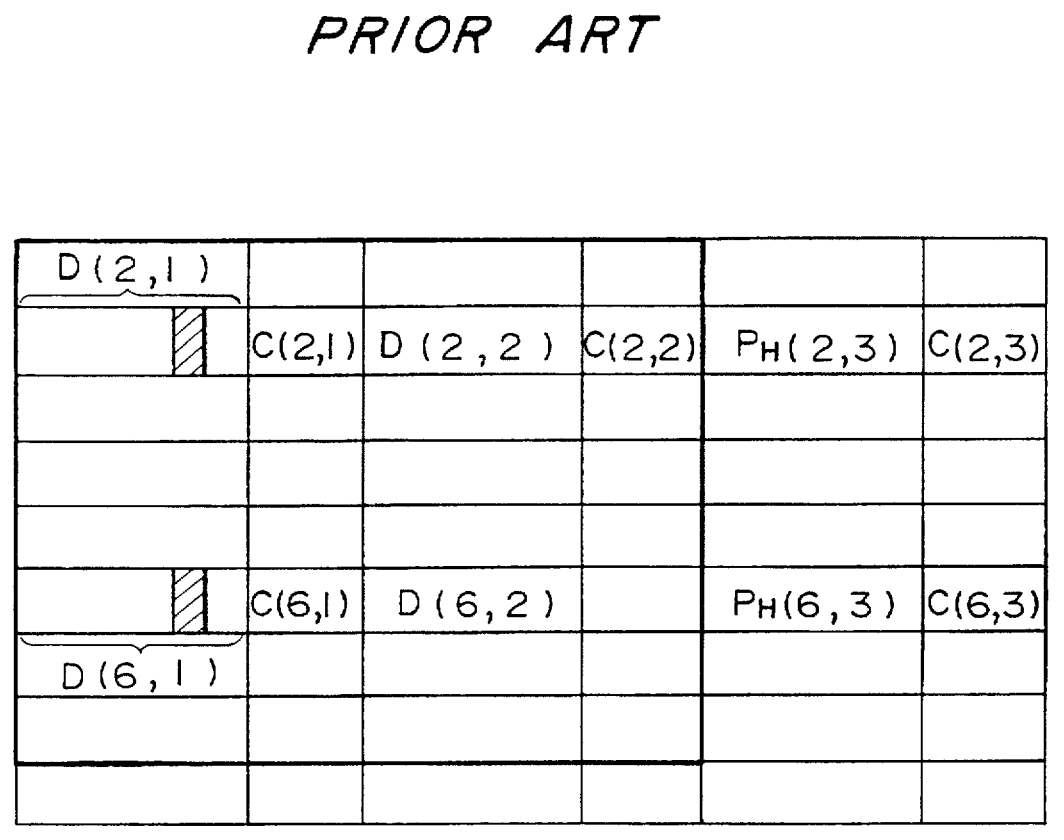

FIG. 49 shows the data in which errors occurred as shown in FIG. 48 were not corrected by the decoder 155. Namely, assume that the errors about the fifth of D(2, 1) and fifth of D(6, 1) of the data shown in FIG. 49 could not be corrected also by the decoder 155.

FIG. 50 is a wiring diagram showing the dubbing operation in which a pair of prior art magnetic recording and reproducing apparatus are used. In FIG. 50, 159 designates a master magnetic recording and reproducing apparatus (hereinafter called "master deck"), and 160 designates a slave magnetic recording and reproducing apparatus (hereinafter called "slave deck").

In operation, in the ordinary self-recording-and-reproducing mode, a recording video signal is supplied to the LPF 150 where its band is restricted, and the band-restricted recording video signal is sampled by a frequency two times higher than the video signal band by the A/D converter 151. Generally, in NTSC system, the video signal band is about 4.5 MHz, and it is necessary to sample the video signal by a frequency higher than 9 MHz according to Nyquist's theorem. Since a color signal is transmitted as a carrier of 3.58 MHz is perpendicular-two-phase modulated, it is customary to set the sampled frequency as a multiple integer of 3.58 MHz in view of beat interference with the sampled frequency. From these relations, very occasionally the sampled frequency is set to $3 \cdot f_{sc}$ ($f_{sc}$ stands for a carrier frequency of 3.58 MHz, and $3 \cdot f_{sc}$ stands for about 10.7 MHz) and $4 \cdot f_{sc}$ (about 14.3 MHz).

Digitized recording video data are encoded by the encoder 152 so that errors occurred during magnetic recording and reproducing can be corrected, and the data are then transferred to the change-over switch 158.

The change-over switch 158 here assumes the self-recording-and-reproducing mode and hence is connected to the self-recording-and-reproducing side, namely, the side of the encoder 152.

Therefore, the encoded data are encoded by the modulator 153 so as to be the optimum data suitable for magnetic recording and reproducing. This encoding system is exemplified by NRZ and NRZI systems. The modulated recording video data are amplified by the recording head amplifier 142 and are then recorded on the magnetic tape 110 by the magnetic heads 101-1, 101-2. The mechanism control circuit 114 controls the number of rotation of the rotary drum 102 at a constant rate and controls the feed of the tape 110 at a constant rate. As a result, the recording video data are recorded on the magnetic tape 110 by helically scanning.

In reproducing, the signal reproduced by the magnetic heads 101-1, 101-2 is amplified by the reproducing head amplifier 143. The amplified signal is decoded by the demodulator 154, and the decoder 155 corrects and detects errors in the reproducing data. The data in which errors have been corrected and detected are converted to analog signals by the D/A converter 156, are restricted in band by the LPF 157, and are outputted as a reproducing video signal.

The error correcting method by using the encoder 152 and the decoder 155 will now be described with reference to FIGS. 47 through 49. The encoder 152 forms error detection data C(m, n) (where m and n are integers satisfying 1<m<8, and 1<n<2) as redundant data, from which errors are to be detected, with respect to information data D(m, n) digitalized by the A/D converter 151.

The horizontal parity $P_H(1, 3)$ is the parity composed of D(1, 1) and D(1, 2). The parity of l-th data of D(1, 1), and l-th data of D(1, 2) is #-th data of $P_H(1, 3)$. Likewise, $P_H(m, 3)$ is the parity composed of D(m, 1) and D(m, 2), and C(m, 3) is the error detection data of $P_H(m, 3)$.

The vertical parity $P_V(9, 1)$ is the parity composed of D(1, 1), D(2, 1) . . . D(8, 1). l-th data of $P_V(9, 1)$ are the parity composed of l-th data of D(1, 1), D(2, 1) . . . D(8, 1). Likewise, PV(9, 2) is the parity composed of D(1, 2), D(2, 2) . . . D(8, 2).

$P_H(9, 3)$ is the parity composed of $P_V(9, 1)$ and $P_V(9, 2)$, and C(9, 1), C(9, 2) and C(9, 3) are the respective error detection data of $P_V(9, 1)$, $P_V(9, 2)$ and $P_H(9, 3)$. In this example, each of D(m, n), $P_H(m, 3)$ and $P_V(9, n)$ is composed of 6 bits, and C(m, n) is composed of 2 bits.

As shown in FIG. 48, in the presence of errors respectively occurred in the reproducing data D(2, 1), D(2, 2), D(6, 1), $P_H(6, 3)$, when a horizontal parity is formed from the reproduced D(2, 1) and D(2, 2), an error exists in the second bit of D(2, 1). Therefore the second bit of the formed horizontal parity is different from the second bit of $P_H(2, 3)$. However, since the fifth bit of D(2, 1) and the fifth bit of D(2, 2) have errors, the formed horizontal parity and the fifth bit of $P_H(2, 3)$ are equal to each other. As the result of detection of errors in D(2, 1) and D(2, 2), only errors are corrected from the $P_H(2, 3)$ and the formed horizontal parity.

Likewise, an error is detected in D(6, 1), and no error is detected in D(6, 2). Therefore, if a horizontal parity is formed from the reproduced D(6, 1) and D(6, 2), there is a difference in the fifth bit from the original $P_H(6, 3)$, since the fifth bit of $P_H(6, 3)$ also has an error, no error can be corrected.

Then, when a vertical parity is formed from the reproduced D(1, 1), D(2, 1), D(3, t) . . . D(8, 1), both D(2, 1) and D(6, 1) have errors at their fifth bits. Therefore, this vertical parity will be identical with the fifth data of $P_V(9, 1)$ so that correction is impossible.

If the vertical parity is formed from the reproduced D(1, 2), D(2, 2), D(3, 2) . . . D(8, 2), the fifth data are different from the fifth data of $P_V(9, 2)$ due to the error. As a result of this and the error detection of D(2, 2), the error is corrected. Similarly, the error in $P_H(6, 3)$ is also corrected. But the errors in the fourth data of D(2, 1) and D(6, 1) will remain uncorrected, as shown in FIG. 49.

The manner of dubbing by using this magnetic recording and reproducing apparatus will now be described.

In FIG. 50, the dubbing output signal (the output of the decoder 155) of the master deck 159 is inputted to the dubbing-side terminal of a change-over switch 258 as a dubbing input signal. Further, the external synchronizing signal, which is the output of the mechanism control circuit 114 of the master deck 159, is inputted to the mechanism control circuit 214 of the slave deck 16 as a synchronizing signal.

From the master tape 110 mounted on the master deck 159, recording video data are reproduced by the magnetic heads 101-1, 101-2. The reproduced data are demodulated by the demodulator 154, and any error in the reproduced data is detected and corrected by the decoder 155. The data in which errors have been corrected are transferred to the slave deck 160 as the dubbing output signal in the form of digital video data. The slave deck 160 again encodes the transferred digital video data to a modulator 253 and records the encoded data on a slave tape 210. Thus dubbing from the master tape 110 to the slave tape 210 has been performed.

Assume that the errors such as shown in FIG. 48 occurred during reproducing the master tape 110, that dubbing was performed with part of the errors uncorrected and that no error occurred during reproducing the slave tape 210. At that time, the encoder of the slave deck 160 detects that the errors occurring in D(2, 1) and D(6, 1) so that the horizontal parity formed from the reproduced D(2, 1) and D(2, 2) will be different from the fifth data of $P_H(2, 3)$. Therefore, the error of D(2, 1) will be corrected from $P_H(2, 3)$ and from the horizontal parity formed from the reproduced D(2, 1) and D(2, 2), and likewise, the error of D(6, 1) also will be corrected.

In editing and dubbing, assuming that no new error occurs after the second generation, correction in the horizontal parity and correction in the vertical parity will be repeated as the generation is transferred from the second to the third generation. Therefore the errors occurring in the first generation will continue to be reduced to a predetermined rate. Practically, however, a new error would occur everytime the generation is transferred, thus reducing the rate of minimizing the rate of error occurrence.

Generally, in recording and reproducing video signals for self-recording-and-reproducing, dubbing, etc., data will be processed in blocks, such as units of video signal fields or frames so that the data will be recorded on the track of the magnetic tape in units of blocks.

With this prior magnetic recording and reproducing apparatus, in order to maintain a low rate of error occurrence, dubbing can be performed only at the rate of ordinary recording and reproducing, thus taking a long period of time.

(3) Third Prior Art

FIG. 51 shows the location of magnetic heads in a prior art magnetic recording and reproducing apparatus exemplified by Japanese Patent Laid-Open Publication No. 165801/1986. FIG. 52 shows a track pattern of recording onto a magnetic tape by the magnetic heads.

In FIG. 51, a pair of first magnetic heads 301-1, 301-2 are arranged on the peripheral edge of a rotary drum 302 and are angularly spaced from each other by 180°, and likewise, a pair of second magnetic heads 301-3, 301-4 are arranged on the peripheral edge of the rotary drum 302 and are angularly spaced from each other by 180°. The second magnetic heads 301-3, 301-4 are angularly spaced from the first magnetic heads 301-1, 301-2, respectively, by 90°.

In FIG. 52, the magnetic tape 310 is fed in the direction of an arrow R. 311-1 designates a track recorded by the first magnetic head 301-1; 311-2, a track recorded by the second magnetic head 301-3; 311-3, a track recorded by the first magnetic head 301-2; and 311-4, a track recorded by the second magnetic head 301-4. These four recording tracks 311-1 through 301-4 constitute one frame of recording data.

FIG. 53 is a block diagram showing recording signal processing system when digitally recording 2-channel video signals simultaneously in the arrangement and track pattern of the magnetic heads of FIGS. 51 and 52.

A first low-pass filter (hereinafter called "first LPF") 350 performs a band restriction to sample a first video signal. A second LPF 350-2 performs a band restriction of a second video signal.

A first A/D converter 351-1 samples the first video signal, and a second A/D converter 351-2 samples the second video signal.

A first encoder 352-1 encodes digital data from the first A/D converter 351-1 by adding an error correcting code thereto. A second encoder 352-2 encodes digital data from the second A/D converter 351-2 in the same manner. A first memory 338-1 is used in encoding by the first encoder 352-1, and a second memory 338-2 is used in encoding by the second encoder 352-2. A first modulator 353-1 encodes the digital data, which were encoded by the first encoder 352-1, into optimum recording codes suitable for magnetic recording and reproducing. A second modulator 353-2 encodes the digital data, which were encoded by the second encoder 352-2, into optimum recording codes suitable for magnetic recording and reproducing.

A first recording head amplifier 342-1 drives the first magnetic heads 301-1, 301-2 based on the output of the first modulator 353-1. A second recording head amplifier 342-2 drives the second magnetic heads 301-3, 301-4 based on the output of the second modulator 353-2.

FIG. 54 is a diagram showing the arrangement of magnetic heads and the operating period of each magnetic head for recording, with respect to the first and second channel recording data. The first and second channels correspond to the respective outputs of the first and second modulators 353-1, 353-2.

In operation, in two-channel recording and reproducing, the magnetic tape 310 is fed at a speed two times higher than ordinary. At that time, the first magnetic heads 301-1, 301-2, which are arranged on the rotary drum 302 and are angularly spaced from each other by 180°, record and reproduce a video signal. Meanwhile, the second magnetic heads 301-3, 301-4 record and reproduce an audio signal, a different video signal or the like.

In this case, the recording track pattern on the magnetic tape 310 by the first and second magnetic heads 301-1, 301-2, 301-3, 301-4 is shown in FIG. 52. Specifically, the track 311-1 is recorded by one (301-1) of the first magnetic heads 301-1, 301-2, and the track 311-2 is recorded by one (301-3) of the second magnetic heads 301-3, 301-4. Likewise, the track 311-3 is recorded by the other (301-2) of the first magnetic heads 301-1, 301-2, and the track 311-4 is recorded by the other 301-4 of the second magnetic heads 301-3, 301-4.

Accordingly, two pieces of information are recorded at every rotation of the rotary drum 302.

The mode of operation of the recording signal processing system for, for example, digitally recording two-channel video signals will now be described. Although there is no illustration of the audio signal processing system, audio signals like the video signals are digitally recorded.

In FIG. 53, the first and second channel video signals are restricted in band so that the first and second LPFs 350-1, 350-2 allow the video signal band to pass. Then, the video signals are sampled at a frequency more than two times higher than the video signal band by the first and second A/D converters 351-1, 351-2.

Generally, a NTSC system, the video signal band is about 4.5 MHz, and it is necessary to sample the video signal by a frequency higher than 9 MHz according to Nyquist's theorem. Since a color signal is transmitted as a carrier of 3.58 MHz is perpendicular-two-phase modulated, it is customary to set the sampled frequency multiple by an integer over 3.58 MHz in view of beat interference with the sampled frequency. From these relations, very occasionally the sampled frequency is set to $3 \cdot f_{sc}$ ($f_{sc}$ stands for a carrier frequency of 3.58 MHz, and $3 \cdot f_{sc}$ stands for about 10.7 MHz) and $4 \cdot f_{sc}$ (about 14.3 MHz).

The thus digitized recording video data are encoded by the first and second encoders 352-1, 352-2 such that the errors occurring during magnetic recording and reproducing can be corrected. Here the first and second memories 338-1, 338-2 are used in encoding.

Then the encoded data are encoded by the first and second modulators 353-1, 353-2 so as to be the optimum data suitable for magnetic recording and reproducing. This encoding system is exemplified by NRZ and NRZI systems.

Subsequently, the modulated recording video data are recorded on the magnetic tape 310. Specifically, the first and second channel digital data are recorded by the first magnetic heads 301-1, 301-2 and the second magnetic heads 301-3, 301-4 via the first and second recording head amplifiers 342-1, 342-2, respectively.

Here the arrangement of the magnetic heads of the two-channel recording data are shown in FIG. 54. Specifically, DATA1-1 of the first channel is recorded on the track 311-1 by the first magnetic head 301-1, while DATA1-2 of the first channel is recorded on the track 311-3 by the first magnetic head 301-2. Likewise, DATA2-1 of the second channel is recorded on the track 311-2 by the second magnetic head 301-3, while DATA2-2 of the second channel is recorded on the track 311-4 by the second magnetic head 301-4.

By the foregoing operation, two-channel video signals can be recorded simultaneously. Also in reproducing, two-channel video signals can be reproduced simultaneously by tracing the track.

With this prior art magnetic recording and reproducing apparatus, in order to record two-channel video signals, it is necessary to add two magnetic heads. Also, two signal processing circuits are necessary. Further, it is impossible to do one channel recording while reproducing at the other channel.

(4) Fourth Prior Art

Insert editing is writing and editing a part of an already recorded track with a different signal and is an effective function in VTR (video tape recorder) for recording and reproducing video and audio signals. A four-frequency pilot method is adopted for the servo method of 8 mm video using an 8 mm tape. This prior art insert editing method is exemplified by Japanese Patent Laid-Open Publication No. 79550/1985.

In the prior magnetic recording and reproducing apparatus using the pilot signal method, in addition to two ordinary magnetic heads arranged on the peripheral edge of the rotary drum and angularly spaced from each other by 180°, at least one magnetic head is used so that the track pattern will be continuous and uniform during insert editing.

The arrangement and construction of the heads of this fourth prior art is similar to those of the third prior art.

FIG. 55 shows a circuit of a rotary-head-type VTR to which the magnetic recording and reproducing apparatus is incorporated. In FIG. 55, a first circulating frequency generator 461 generates four signals of different frequencies one for each field, circulating four fields as one cycle, according to the head switching pulses inputted to an input terminal 462.

For example, in recording video signals by NTSC (National Television System Committee) method, these four frequencies should be selected as follows: $f_1=f_{osc}/58$, $f_2=f_{osc}/50$, $f_3=f_{osc}/36$, and $f_4=f_{osc}/40$, where $f_{osc}=378$ fh (fh: frequency of horizontal synchronizing signal). The output of this frequency generator 461 is inputted to the input terminal 463 and is superposed with the modulated video signal by an adding circuit 464. This superposed signal is applied to the magnetic heads 401-1, 4-1-2 via a recording amplifier 442, a switch 465 and a rotary transformer 406, and is recorded on the magnetic tape. The recording pattern is circulating from F1 to F4, as shown in FIG. 56.

Then the ordinary reproducing will now be described.

Regarding the output of the reproducing amplifier 443, a low-pass filter (hereinafter called "LPF") 467 cancels video signal components and extracts pilot signal components. The pilot signal components extracted by the LPF 467 and the output of the circulating frequency generator 461 are inputted to a mixer 468. The output of this mixer 468 are passed a first band-pass filter (hereinafter called "BPF") 11 or a second BPF 12 to obtain a differential frequency signal component between the signal frequency of the output of the circulating frequency generator 461 and the frequency of pilot signal component of the output of the LPF 467.

In the case of video signals in NTSC method, since $f_{osc} \cong 5.95$ MHz, $f_1 \cong 102$ KHz, $f_2 \cong 119$ KHz, $f_3 \cong 165$ KHz, and $f_4 \cong 149$ KHz. Therefore $f_2-f_1 \cong f_3-f_4 \cong 16.5$ KHz, and $f_4-f_1 \cong f_3-f_2 \cong 46.5$ KHz. Consequently, the pass band of the first BPF 469-1 and the pass band of the second BPF 469-2 are selected to be around 16.5 KHz and around 46.5 KHz, respectively.

As shown in FIG. 56, when the magnetic head 401-1 is tracking the track F2, a signal having an amplitude proportional to the largeness of the pilot signal (frequency $f_2$) component of the track F1 will be obtained from the first BPF 469-1, and a signal having an amplitude proportional to the largeness of the pilot signal (frequency $f_4$) component of the track F4 will be obtained from the second BPF 469-2.

The outputs of the first and second BPFs 469-1, 469-2 are envelope-detected by first and second detectors 470-1, 470-2, respectively. The outputs of the first and second detectors 470-1, 470-2 are supplied to a subtracter 471 so that a voltage level corresponding to the amount of lateral displacement of the magnetic head 401-1 from the center of the track in FIG. 56 is obtained as the output of the subtractor 471.

As is apparent from the frequencies $f_1$, $f_2$, $f_3$, $f_4$ and the recording pattern of FIG. 56, the polarity of the output of the subtractor 471 with respect to the displacement of the magnetic head 401-1 from the center of the track when the magnetic head 401-1 is tracking F1 or F3 will be opposite to that when the magnetic head 401-1 is tracking F2 or F4. Therefore, by selectively synchronizing the output of the subtractor 471 or the signal, which is obtained by inverting the output of the subtractor 471 to an inverting amplifier 472, with the head switching pulses by a switch 473, an output voltage proportional to the amount of displacement of the magnetic head 201-1 can be obtained from an output terminal 474. The signal obtained from the output terminal 474 is feedbacked by a capstan motor (not shown) so that good tracking can be achieved.

The construction and operation of this prior apparatus for insert editing will now be described.

A switch 475 serves to allow the reproducing output of the magnetic head 201-3 or 201-4 to be supplied to the reproducing amplifier 443 during insert editing. A delay circuit 476 shifts the head switching pulses in phase by 90°. A second circulating frequency generator 477 generates signals of the above described frequencies $f_1$, $f_2$, $f_3$ and $f_4$ based on the output of the delay circuit 476. A switch 478 serves to allow the output of the second circulating frequency generator 477 to be supplied to the mixer 468 during insert editing. A switch 479 serves to selectively allow the output of the first or second detector 470-1, 470-2 to be supplied to an amplifier 480 for every field based on the output of the delay circuit 476. A switch 481 serves to allow the output of the amplifier 480 to be supplied to the output terminal 474 during insert editing.

During insert editing, the output of the first circulating frequency generator 461 is superposed over a video signal inputted from the input terminal 463. This signal is applied to the magnetic heads 401-1, 401-2 via the recording amplifier 442, the switch 465 and a rotary transformer 466 and is recorded on the magnetic tape 410.

On the other hand, the signal on the magnetic tape 410 is reproduced by the magnetic head 401-3, 401-4 and is supplied to the reproducing amplifier 443 via the rotary transformer 466 and the switch 475.

For starting the signal recording in insert editing, first the tape feed in ordinary reproducing is controlled, and after entering the synchronizing control, it is switched to the insert editing mode at a desired recording starting point. At that time, the positional relation between the recording pattern on the magnetic tape 410 and each magnetic head 401-1 through 401-4 is shown in FIG. 56, for example. Specifically, the magnetic head 401-1 is disposed on the leading end of the track F1, and the magnetic head 401-2 is disposed on the trailing end of the track F4. Therefore, the magnetic head 401-3 is located centrally of the track and on the boundary line between the track F4 and the track F1.

The delay circuit 476 shifts the head switching pulses in phase by 90° so that the switching position of the magnetic head 401-3 or 401-4 will be aligned with the head switching position of the magnetic head 401-1 or 401-2 laterally of the tape. Further, the delay circuit 476 generates the signals of frequencies $f_1 f_2$, $f_3$ and $f_4$ in a predetermined order from the second circulating frequency generator 477.

In the magnetic head position of FIG. 56, assume that the frequency $f_4$ is generated from the second circulating frequency generator 477. During that time, the first circulating frequency generator 461 generates a frequency, changing over from the frequency $f_4$ to the frequency $f_1$.

The signal reproduced from the magnetic head 401-3 includes the pilot signal component of the frequency $f_1$ corresponding to ½ of the head width, and the component of the frequency $f_4$ corresponding to ½ of the head width. In the LPF 467, the two pilot components are extracted and are supplied to the mixer 468.

On the other hand, since the second circulating frequency generator 477 generates the frequency $f_4$, the signal such that the differential frequency component has an amplitude corresponding to ½ of the head width is obtained from the second BPF 469-1.

When the magnetic head 401-4 is located on the boundary line between the track F1 and the track F2 in FIG. 56, namely, when the magnetic head 401-1 is located above the track F1 of the tape or when the magnetic head 401-2 is located under the track F2 of the tape, the second circulating frequency generator 477 generates the signal of the frequency $f_1$. At that time, the signal of an amplitude proportional to the head width on the track F2 with a differential frequency between $f_1$ and $f_2$ is obtained from the first BPF 469-1.

By controlling the frequency from the second circulating frequency generator 477 by the signal, which is obtained by shifting the head switching pulse (from the delay circuit 476) in phase by 90°, when the magnetic head 401-3 is located on the boundary line between the track F4 and the track F1 or on the boundary line between the track F2 and the track F3, the signal of an amplitude proportional to the displacement of the magnetic head 401-3 from the boundary line can be obtained from the second BPF 469-2. Further, when the magnetic head 401-4 is located on the boundary line between the track F1 and the track F2 or on the boundary between the track F3 and the track F4, the signal of an amplitude proportional to the displacement of the magnetic head 401-4 can be obtained from the first BPF 469-1.

Therefore, by selecting the output of the first detector 470-1 or the second detector 470-2 by operating the switch 479 according to the output of the delay circuit 476, a voltage proportional to the displacement of the magnetic head 401-3 or 401-4 from the boundary line can be obtained. This voltage equivalently represents a voltage value proportional to the displacement of the magnetic head 401-1 or 401-2 from the track. This signal is supplied to the amplifier 480 where a suitable DC offset and an amplification gain are given to the signal, and the resulting signal is supplied to the output terminal 474 via the switch 481.

Assuming that the output of the second circulating frequency generator 477 is fixed at the frequency $f_1$, the output voltage of the output terminal 474 with respect to the displacement of the magnetic held 401-4 in the longitudinal direction of the tape varies as shown in FIG. 57. In FIG. 57, as this output voltage is integrated in the longitudinal direction of the tape, an integration value will be $V_1$. The output voltage at a desired tracking position is $V_0$ so that a lock range when a control loop is provided will apparently be subjected to a large restriction. Consequently, if synchronization is taken in the ordinary reproducing mode before starting the insert editing, the control ability for small signal components is adequate even when entered the insert editing mode. Therefore, if synchronization is taken in the ordinary reproducing mode, a uniform, continuous recording pattern can be obtained also during insert editing.

With this prior art magnetic recording and reproducing apparatus, it is necessary to provide at least one magnetic head in addition to the ordinary recording and reproducing heads, thus increasing the cost of production and making it difficult to reduce the size of the rotary drum.

(5) Fifth Prior Art

FIG. 58 shows one example of a tape format for a magnetic recording reproducing apparatus which enables reciprocating reproducing, the tape format being described in, for example, a book "NHK Home Video Description" (page 213) issued from Japan Broadcasting Association (Nippon Hoso Kyokai).

A magnetic tape 510 is ½ inch wide, on which surface each track is formed in the following format. Specifically, a video track 511-V1 is a track on and from which video signals are to be recorded and reproduced in the direction of forward tape feed; an audio track 511-A1 is a track on and from which audio signals are to be recorded and reproduced in the direction of forward tape feed; a video track 511-V2 is a track on and from which video signals are to be recorded and reproduced in the direction of reverse tape feed; and an audio track 511-A2 is a track on and from which audio signals are to be recorded and reproduced in the direction of reverse tape feed.

The object of this prior art apparatus using such a tape format is to enable long-time recording and recording and reproducing band of audio signals by reciprocatingly using the magnetic tape 510.

By multiplying the rate of magnetic tape feed about two times, the tape format of FIG. 58 can be formed within a width (¼ inch) which is a half of the magnetic tape 510 having a ½-inch width as used in the VHS method or such. The formed tape format includes the video tracks 511-V1, 511-V2 for recording and reproducing in the helically scanning method and the audio tracks 511-A1, 511-A2 for recording and reproducing on linear tracks.

For example, using the lower half (¼ inch) of the magnetic tape 510 during forward tape feed, the video signals are recorded on the video track 511-V1, and the audio signals are recorded on the audio track 511-A1.

Then, When the direction of the magnetic tape feed becomes relatively reversed by turning the magnetic tape 510 inside out, the video signals and the audio signals are recorded on the video track 511-V2 and the audio track 511-A1, using the lower half (¼ inch) of the magnetic tape 510.

Concerning the recording and reproducing of video signals, this prior system is equivalent to only one-way recording and reproducing of the VHS method, but the audio signals for recording and reproducing to the linear track is increased in relative speed to improve the recording and reproducing band of the audio signals.

With this prior magnetic recording and reproducing apparatus, it is necessary to turn the magnetic tape inside out when the direction of tape feed is switched from the forward to the reverse and vice versa. Also it is impossible to switch the tape feed direction instantly.

SUMMARY OF THE INVENTION

With the foregoing prior art problems in view, following are objects of this invention:

(1) to enable simultaneous monitoring real time signals (e.g., 6 fields/sec) with simple construction;

(2) to enable high-speed dubbing;

(3) to enable recording through one channel and, at the same time, reproducing through the other channel, without adding to the number of magnetic heads, increasing the number of circuit components and hence increasing the cost of production;

(4) to enable a continuous and uniform track pattern during insert editing, without adding additional magnetic heads; and (5) to enable instant switching from forward tape feed to reverse tape feed and vice versa and to keep signals in high quality.

According to a first aspect of the invention, there is provided a magnetic recording and reproducing apparatus comprising:

(a) a rotary drum drivable at a rotational frequency selected from a standard speed and a speed m (m stands for an integer larger than 1) times as much as the standard speed, the rotary drum having an outer periphery which is frictionally engageable with a magnetic tape in such a manner that the axis of rotation of the rotary drum is disposed at a predetermined angle with respect to the moving direction of the magnetic tape;

(b) a magnetic head disposed on the outer periphery of the rotary drum for performing scanning on the magnetic tape so as to record on a predetermined-width track on the magnetic tape a recording signal to be applied during recording, and so as to pick up a reproducing signal from the predetermined-width track on the magnetic tape during reproducing; and (c) a track following and scanning means for controlling the position of the magnetic head such that the magnetic head scans the same track while the rotary drum makes m rotations as driven at the speed m times as much as the standard speed.

With this first arrangement, the period in which the rotary drum makes one rotation at a standard speed is equal to the period in which the rotary drum makes m rotations at a speed by m times.

Therefore, when the rotary drum makes m rotations at a speed m times, the magnetic head scans an m-fold number of tracks in the period needed for this rotation.

The track following and scanning means controls the position of the magnetic head. This control is performed such that the magnetic head scans the common track in the period in which the rotary drum makes m rotations at a speed m times.

As a result, in the case of the m-fold speed, recording and reproducing can be repeated with respect to the common track in the period of m rotations, and so-called simultaneous monitoring of more real-time signals, with simple construction.

The track following and scanning means may include means for supplying a track following signal, means for extracting a track following signal, and a following signal generating means.

The track following signal supplying means supplies a track following signal to the magnetic head. The track following signal extracting means extracts a track following signal from the reproducing signal. The following signal generating means generates a track following signal and supplies the signal to the track following signal supplying means. This generation occurs based on the result of discrimination of the next scanning start position of the magnetic head based on the track following signal extracted by the track following signal extracting means.

If the magnetic head is moved depending on the applied voltage, a voltage having a value such that the scanning start position of the magnetic head is set at the position of the previously scanned track may be used as a track following signal.

Further, the apparatus may include means for controlling the rotational frequency of the drum, and means for controlling an operation mode of the magnetic head. The rotational frequency controlling means controls the rotational frequency of the rotary drum to a predetermined value. The operation mode controlling means controls the operation mode of the magnetic head in such a manner that, in the period of one rotation of the rotary drum, the magnetic head scans at least one time for recording and then scans at least one time for reproducing.

According to a second aspect of the invention, there is provided a magnetic recording and reproducing apparatus comprising:

(a) a rotary drum drivable at a rotational frequency selected from a standard speed during self-recording and -reproducing and a speed m (m stands for an integer larger than 1) times as much as the standard speed during dubbing-recording dubbing-reproducing, the rotary drum having an outer periphery which is frictionally engageable with a magnetic tape such that the axis of rotation of the rotary drum is disposed at a predetermined angle with respect to the moving direction of the magnetic tape;

(b) a number of magnetic heads disposed on the outer periphery of the rotary drum for performing scanning on the magnetic tape so as to record on a predetermined-width track on the magnetic tape a recording signal to be applied during recording, and so as to pick up a reproducing signal from the predetermined-width track on the magnetic tape during reproducing;

(c) a magnetic head drive and control means for causing one of the magnetic heads to perform scanning on the magnetic tape during self-recording and self-reproducing, and for all the magnet heads to perform scanning on the magnetic tape during dubbing-recording and dubbing-reproducing;

(d) a time axis compressing means for compressing the time axis of a recording signal by 1/m times and supplying the compressed time axis to the magnetic heads during self-recording;

(e) a time axis expanding means for expanding the time axis of a reproducing signal and supplying the expanded time axis to the magnetic heads during self-reproducing;

(f) a dubbing input means for fetching the recording signal, whose time axis is compressed by 1/m times, from a master deck and supplying the same recording signal to the magnetic heads during dubbing-recording; and (g) a dubbing output means for fetching the reproducing signal, whose time axis is compressed by 1/m times, from the magnetic heads and outputting the same reproducing signal to a slave deck.

With this second arrangement, during self-recording and self-reproducing, the rotary drum rotates at a standard speed, and one of the magnetic heads records on and reproduces from the magnetic tape.

At that time, a signal with its time axis compressed by 1/m times is recorded on the magnetic tape. As a result, a signal including information, which is conventionally recorded on m tracks, is recorded in only one track. For reproducing, it is necessary to release this compression. Accordingly the time axis expanding means expands the time axis of the reproducing signal by m times.

During dubbing recording and reproducing, the rotary drum is rotated at an m-fold speed, all of the magnetic aheads are driven. As a result, recording and reproducing can be performed at an m-fold speed.

The target of dubbing reproducing here is a signal recorded on the magnetic tape, with its time axis compressed by m times. For example, for self-recording, a signal with its time axis compressed by the time axis compressing means and a signal taken by the dubbing inputting means and recorded on the magnetic tape in the previous dubbing recording will be the target of dubbing reproducing.

The dubbing-reproduced signal is supplied to the slave deck via the dubbing outputting means. In the Slave deck, the signal (with its time axis compressed by 1/m times) supplied from the apparatus is processed, and typically, magnetic recording is performed. Assuming that the slave deck has the above construction, a signal with its time axis compressed by 1/m times is recorded at an m-fold rate.

In the case of dubbing recording, reverse to dubbing reproducing, the apparatus takes a signal with its time axis compressed by 1/m times. At that time, the signal with its time axis compressed by 1/m times is supplied to the magnetic head as a recording signal, and is recorded at high speed by the magnetic head which performs recording at an m-fold rate during self-recording and self-reproducing.

Accordingly, with the second arrangement, dubbing can be performed at high speed.

The drive for the magnetic head is controlled by using, for example, a dubbing synchronizing means. During dubbing recording, this dubbing synchronizing means causes the magnetic head to perform recording at the timing with the synchronizing signal from the master deck so as to be synchronized with the supply of the reproducing signal from the master deck. During dubbing reproducing, a synchronizing signal is supplied to the slave deck so as to synchronize the recording on the slave deck with the timing of self-reproducing.

Consequently, synchronous dubbing between the master and slave decks is possible.

Alternatively the driving for the magnetic head may be controlled by a tracking control means. This tracking control means controls the tracking of the magnetic head in such a manner that adjacent tracks can be continuously scanned by the magnetic head.

According to a third aspect of the invention, there is provided a magnetic recording and reproducing apparatus comprising:

(a) a rotary drum having an outer periphery which is frictionally engageable with a magnetic tape such that the axis of rotation of the rotary drum is disposed at a predetermined angle with respect to the moving direction of the magnetic tape;

(b) m (m stands for a integer larger than 1) number of magnetic heads disposed on the outer periphery of the rotary drum for performing scanning on the magnetic tape so as to record on a predetermined-width track on the magnetic tape a recording signal to be applied during recording, and so as to pick up a reproducing signal from the predetermined-width track on the magnetic tape during reproducing; and (c) track scanning means for causing the magnetic head to scan n (n stands for an integer equal to or smaller than m) number of tracks during one channel recording/reproducing of n channel recording/reproducing for one cycle of information to be recorded on the magnetic tape.

With this third arrangement, a plurality of channels can be dealt with simultaneously; this is, n-channel recording and reproducing is possible.

During n-channel recording and reproducing, the magnetic head scans n tracks during one-channel recording and reproducing under the control by the scanning control means. As a result, n-channel recording signals can be recorded on n tracks, or n-channel reproducing signals can be reproduced from n tracks.

With the third arrangement, it is unnecessary to provide an additional magnetic head and signal processing circdit for each channel. Accordingly, multi-channel signal can be dealt a simple construction.

The apparatus may include a channel composing and separating means. This channel composing and separating means composes recording signals of the individual channels during recording, and separates reproducing signals of the individual channels during reproducing.

Therefore, for example, n-channel recording signals can be distributed and recorded on n tracks during recording, and reproducing signals to be reproduced from n tracks can be outputted as distributed to channels.

Since the recording and reproducing by the magnetic head is conducted in units of tracks, recording and reproducing through a plurality of channels to be dealt with simultaneously; e.g., one channel for recording and another for reproducing; can coexist.

The channel composing and separating means may include a tape speed control means, an identification code adding means and an identification code separating means.

The tape speed control means controls the speed of feed of the magnetic tape. The identification code adding means adds to a recording signal an identification code indicating the speed of feed of the magnetic tape and causes the magnetic head to record the identification code in a predetermined portion of the track on the magnetic tape during recording. The identification code separating means separates and detects an identification code from a reproducing signal and instructs the tape speed control means to control the feed speed of the magnetic tape to a target feed speed during reproducing.

As a result, it is possible to use the space of the magnetic tape effectively, irrespective of the speed of feed of the tape.

Preferably, the identification codes should include those indicating the feed speeds of the individual tapes, and those indicating that the magnetic tape is in a transitional position where the feed speed of the tape is being switched. Specifically, during the transitional period in which the feed speed of the magnetic tape is being switched by the tape speed control means, the identification code adding means adds to the recording signal the identification code of this content (i.e., the content different from that when the tape is being fed at a constant speed), and the resulting signal is recorded on the magnetic tape. The identification code separating means detects the identification codes during reproducing and instructs to change the feed speed of the tape.

As a result, it is possible to make shift between n-channel recording and reproducing and one-channel recording and reproducing smoothly and reliably.

n-Channel recording and reproducing may be such that the timing of supplying and taking out the signals to and from the magnetic head depends on the channel.

By providing a recording timing control means for supplying the recording signals to the magnetic head at a different timing for every channel, a plurality of channels can be dealt with simultaneously, for example, one channel for reproducing and another channel for recording.

According to a fourth aspect of the invention, there is provided a magnetic recording and reproducing apparatus comprising:

(a) a rotary drum having an outer periphery which is frictionally engageable with a magnetic tape such that the axis of rotation of the rotary drum is disposed at a predetermined angle with respect to the moving direction of the magnetic tape;

(b) m number of magnetic heads disposed on the outer periphery of the rotary drum for performing scanning on the magnetic tape so as to record on a predetermined-width track on the magnetic tape a recording signal to be applied during recording, and so as to pick up a reproducing signal from the predetermined-width track on the magnetic tape during reproducing;

(c) a pilot signal adding means for adding a pilot signal to a recording signal;

(d) a pilot signal extracting a pilot signal from a reproducing signal;

(e) a tracking determining means for determining, from the extracted pilot signal, a tracking position to be scanned by the magnetic head for the next time; and (f) a tracking control means for controlling the scanning position of the magnetic head based on the decided tracking position.

With this fourth arrangement, the next scanning position is determined by the pilot signal extracted by the reproducing. For example, in insert editing, a continuous and uniform track can be formed or scanned.

The tracking control is performed by controlling the scanning position of the magnetic head based on an offset by a tracking control means. Here the offset is obtained by using a storage means and an offset control means. The storage means stores, in the period of one track scanning, the tracking position determined by a tracking determining means. Then the offset control means obtains, as an offset, a difference between the present tracking position determined by the tracking determining means and the tracking position stored in the storage means.

It is thereby possible to detect an offset ocurring by one scanning so that the scanning position can be controlled accurately.

Preferably, a pilot signal should occur depending on the drum rotation pulses synchronous with the rotation of the rotary drum. Using such method, accurate control of the scanning position can be achieved by a simple means. By using the gates operable by the drum rotation pulses, simultaneous supply of an offset can be achieved.

Further, using a mixing means for mixing the reproducing signal with the next recording signal and for supplying the resulting signal to the magnetic head, so-called punch-in-and-out editing can be realized.

According to a fifth aspect of the invention, there is provided a magnetic recording and reproducing apparatus comprising:

(a) a rotary drum having an outer periphery which is frictionally engageable with a magnetic tape such that the axis of rotation of the rotary drum is disposed at a predetermined angle with respect to the moving direction of the magnetic tape;

(b) a pair of magnetic heads disposed adjacent to each other on the outer periphery of the rotary drum for performing scanning on the magnetic tape so as to record on a predetermined-width track on the magnetic tape a recording signal to be applied during recording, and so as to pick up a reproducing signal from the predetermined-width track on the magnetic tape during reproducing;

(c) a tape feed direction control means for reciprocating and inverting the direction of feed of the magnetic tape; and (d) a track designating means for selectively actuating one of the pair of magnetic heads to perform recording and reproducing on one track of two tracks during forward recording and forward reproducing and for actuating one of the magnetic heads for the tracks other than a target track of the forward recording and forward reproducing during backward recording and backward reproducing.

With this fifth arrangement, the direction of feed of the magnetic tape is reciprocated and inverted by a tape feed direction control means.

During forward recording, one track of every two-track space is formed on the magnetic tape. Namely, by selectively driving the magnetic head, a half space is used for recording.

Then during backward recording, a space other than the space used for recording during the forward recording is used for recording. Namely, recording is performed between the tracks formed by the forward recording.

During forward reproducing, by selectively driving the magnetic head, a half track is scanned for reproducing.

Then during backward reproducing, a track other than the track scanned for reproducing during the forward reproducing is scanned for reproducing. Namely, reproducing is performed between the tracks scanned by the magnetic head during the forward reproducing.

As a result, it is possible to make an instantaneous shift from forward recording/reproducing to backward recording/reproducing, without forcing the user to reset the magnetic tape as conventional. Also, adequate quality cannot be achieved.

The track designating means may include a tracking control means for controlling the tracking position of the magnetic head and fixing the scanning direction of the magnetic head which is now performing recording and reproducing, thus improving the quality.

The tracking control means may include a forward track detecting means, a tracking storage, and a scanning direction adjusting means.

The forward track detecting means detects the position of the target track of backward recording and backward reproducing by one of the magnetic heads which is not performing recording and reproducing. The tracking storage stores the detected position of the track. The scanning direction adjusting means adjusts the scanning direction of one of the magnetic heads which is associated with the backward recording and backward reproducing based on the position stored in the tracking storage.

Each of the foregoing five arrangements may additionally include the following.

An A/D converter and a D/A converter; the former converts analog recording signals into digital recording signals, and the latter converts digital reproducing signals into analog reproducing signals.

Using these converters, it is possible to cope with the case in which signals to be exchanged between this apparatus and the exterior must be analog. Therefore digital signals can be recorded and reproduced on and from the magnetic tape.

Further, a time axis compressing means for compressing the time axis of the recording signal by 1/m times, and a time axis expanding means for expanding the time axis of the reproducing signal by m times. Some of the foregoing five arrangements need both of the two means, and also to the remaining arrangements, these two means are effective in recording all of information contained in the signals supplied from the exterior.

In recording and reproducing digital signal accurately, the apparatus should preferably include means for encoding the digital recording signal for error correction, and means for decoding the digital reproducing signal for error correcting.

Further, in recording and reproducing the digital recording signal in code suitable for recording and reproducing on and from the magnetic tape, the apparatus should preferably include means for encoding the digital recording signal for recording, and means for decoding the digital reproducing signal for reproduction.

Finally, for using the magnetic head commonly in recording and reproducing, the apparatus should preferably include a recording/reproducing switching means.

The above and other advantages, features and objects of this invention will be manifest to those versed in the art upon making reference to the following detailed description and the accompanying drawings in which several preferred embodiments incorporating the principles of this invention are shown by way of illustrative example.

BRIEF DESCRIPTION OF THE DRAWINGS

FIG. 47 is a diagram showing one example of error correcting codes in the second prior art;

FIG. 48 is a diagram showing error occurrences in the second prior art;

FIG. 49 is a diagram showing data when errors cannot be corrected in the second prior art;

DETAILED DESCRIPTION

(1) First Embodiment

Figure 1:
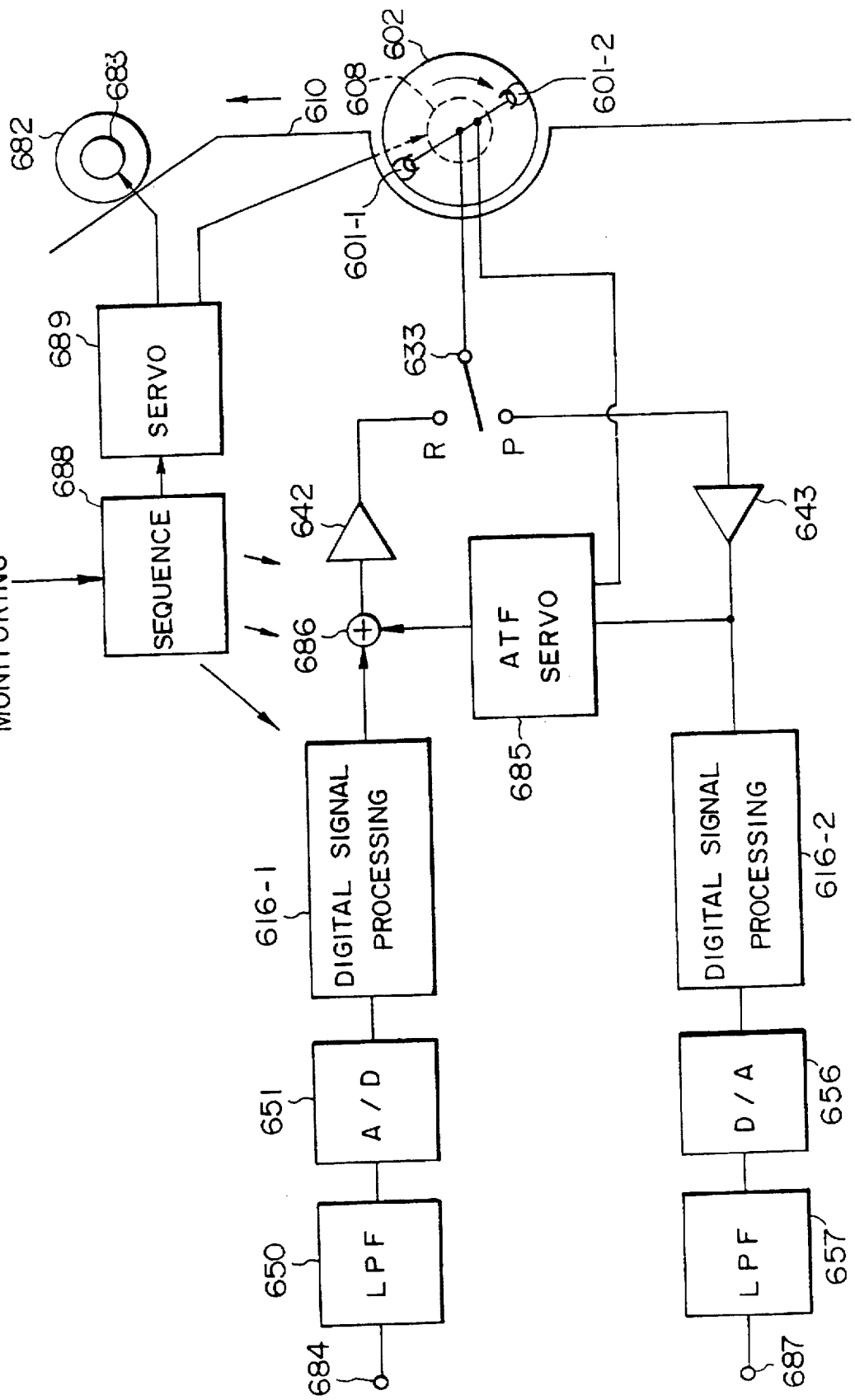
FIG. 1 is a block diagram showing a magnetic recording and reproducing apparatus according to a first embodiment of this invention.

FIG. 1 is a system diagram showing a digital signal recording and reproducing apparatus according to a first embodiment of this invention.

In FIG. 1, magnetic heads 601-1, 601-2 have adequate range of movement with respect to the track pitch and are usable for both recording and reproducing. FIG. 1 also shows a tape 610, a rotary drum 602, a drum motor 608, a capstan 682 for feeding the tape 610, and a capstan motor 683.

The operation of the apparatus, along with the flow of signals, will now be described.

During recording, an analog video signal is first introduced into the apparatus from an input terminal 684, and is then supplied to an analog/digital (hereinafter called "A/D") converter 651 via a recording-side low-pass filter 650. In the A/D converter 651, the analog video signal is connected into a digital video signal and is then inputted to a recording-side digital signal processing circuit 616-1. In the recording-side digital signal processing circuit 616-1, the digital video signal is processed by encoding for error correction, compressing the time axis, modulating and such. To the processed data, an ATF (Auto Track Following) signal, which was caused to occur by an ATF servo circuit 685 and which is to be used for the magnetic heads to follow the track during scanning, is added at an adder 686. A signal obtained as the result of this adding is amplified by a recording amplifier 642 and is then supplied, as recording data, to a recording/reproducing change-over switch 633. At that time, the recording/reproducing change-over switch 633 is normally turned to R side. As a result, the recording data are recorded on the tape 610 by the magnetic head 601-1 or 601-2.

During reproducing, the recording/reproducing change-over switch 633 is turned to P side. The signals read from the tape 610 by the magnetic heads 601-1, 601-2 are amplified by a reproducing amplifier 643 and are then inputted to the reproducing-side digital signal processing circuit 616-2.

At that time, only the ATF signal is taken out from the amplified reproducing data by the ATF servo circuit 685. Using this signal, the ATF servo circuit 685 controls the heads 601-1, 601-2 in such a manner that their scanning positions do not deviate from the track. The reproducing-side digital signal processing circuit 616-2 performs processes such as by demodulating the reproducing data, expanding the time axis and encoding for error correction. The processed data are converted into analog video signals by a digital/analog (hereinafter called "D/A") 656, and then the resulting analog data are outputted from an output terminal 687 via a reproducing-side low-pass filter 657.

In increasing the number of rotations of the drum to perform simultaneous monitoring, a sequence circuit 688 produces various kinds of clocks and control signals, according to a signal indicating the simultaneous monitoring mode, and supplies the control signals to a servo circuit 689. The servo circuit 689 causes the drum motor 683 to rotate at a higher speed and with stability based on the control signals.

Figure 2:
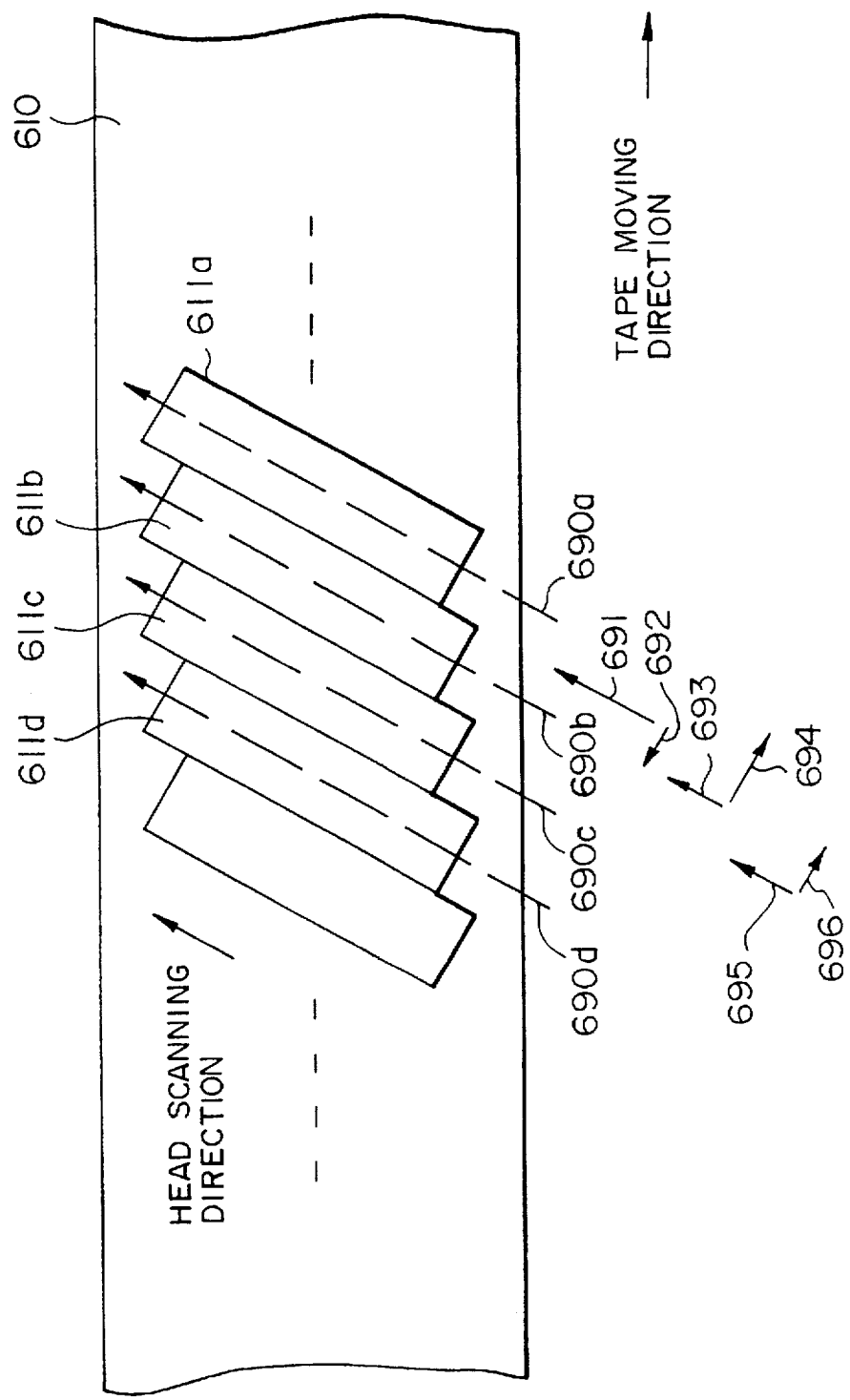
FIG. 2 is a diagram showing a track pattern on a magnetic tape in the first embodiment and also showing the direction of movement of a magnetic head relative to the magnetic tape.

FIG. 2 is a diagram showing a recording track pattern of digital video signals on the tape 610. In FIG. 2, 611a, 611b, 611c, 611d designate video tracks.

In this embodiment, the number of rotation of the drum during recording is 3600 rpm and the number of rotation of the drum during reproducing is 1800 rpm. The reason why 1800 rpm was selected here for the number of rotation of the drum during reproducing is that for example, a publication entitled "TV Technique V.R 87 - 33", Vol. 11, No. 24, pages 31–36 discloses a digital video tape recorder of the NTSC composite method using a pair of two-channel heads and a drum rotatable at 1800 rpm and that this invention is thought to be absolutely applicable to such a digital video tape recorder. In this case, a data rate is compressed to 32 Mbps.

In this embodiment, to form a track pattern of FIG. 2, the magnetic heads 601-1, 601-2 record a signal equivalent to two fields on two tracks, as the rotary drum 602 makes one complete rotation, and reproduces the signal, as the rotary drum 602 makes the next complete rotation. This recording and reproducing are repeated.

Specifically, the magnetic head 601-1 first scans on the magnetic tape 610 in the direction of a dotted arrow 690a as the rotary drum 602 makes a half rotation, i.e., for 1/120 second, thus forming a video track 611a on the magnetic tape 610. On this track 611a, a signal of one field with its time axis compressed by ½ times is recorded.

The scanning start position of the magnetic head 601-2 is located in the position indicated by an arrow 691 as the rotary drum 602 makes a half rotation, i.e. for 1/120 second. The head 601-2, with a constant voltage applied to a support member (i.e., bimorph plate), is moved in the direction of an arrow 692 and scans on the magnetic tape 610 in the direction of a dotted arrow 690b to form a video track 611b. On this track 611b, a signal of one field, with its time axis compressed by ½ times, is recorded by the magnetic head 601-2.

Here assume that the magnetic heads 601-1 and 601-2 are in opposite azimuth to each other to prevent cross-talk between tracks. Therefore, also when reproducing the recorded signals, the video tracks 611a, 611b should be scanned by the magnetic heads 601-1, 601-2, respectively.

As the rotary drum 602 makes one complete rotation for 1/60 second, the magnetic heads 601-1, 601-2 record a signal of two fields on the video tracks 611a, 611b completely. At that time, the magnetic head 601-1 is oriented in the direction of the arrow 693. In this case, the magnetic head 601-1, with a constant voltage applied thereto, is moved in the direction of an arrow 694. As the result of this moving, as the rotary drum 602 makes a half rotation for a subsequent 1/120 second, the magnetic head 601-1 scans right on the video track 611a in the direction of a dotted arrow 690a to read the signal recorded on the track 611a.

Upon termination of this reading, the head 601-2 is oriented in the direction of an arrow 695, and a constant voltage is applied to the head 601-2 to move the same in the direction of an arrow 696. As the rotary drum 602 makes a half rotation for a subsequent 1/120 second, the magnetic head 601-2 scans the video track 611 in the direction of a dotted arrow 690b to read the recorded signal.

Thus as the rotary drum 602 makes two complete rotations for 1/120×4 second=1/30 second, the signals of two tracks (=two fields) are recorded and reproduced on and from the video tracks 611a, 611b, after which the magnetic head 601-1 comes over to the position of a dotted arrow 690c. Then the same recording and reproducing processes are repeated on and from the video tracks 611c, 611d and their subsequent video tracks 611a, 611b.

At that time, the dotted arrows 690a, 690b, 690c, 690d in FIG. 2 represent respective references for scanning during recording, and a constant voltage is applied to the magnetic heads 601-1, 601-2 for controlling in such a manner that the magnetic heads 601-1, 601-2 comes to these positions when recording.

By the foregoing actions, simultaneous monitoring also for real time television signals can be achieved during recording. Assuming that the number of rotations is 1800 rpm during ordinary reproducing, the signals can be reproduced directly without controlling the movement of the magnetic heads.

In this embodiment, the number of rotations of the drum during recording is two times (m=2) larger than that during reproducing. The number of rotations of the drum during recording is optional and should preferably be two or more times larger than during reproducing, giving the same result as this embodiment.

Further, in this embodiment, the number of magnetic heads is two. But the number, construction and arrangement of magnetic heads may be selected at option.

Moreover, in this embodiment, the recording signals are digital video signals. Alternatively the recording signals may be other digital signals, guaranteeing the same result as this embodiment.

As mentioned above, according to this invention, partly since the number of rotations of the drum during recording is m (m>2) times larger than during reproducing, partly since a digital signal is recorded on a medium during at least one scanning of the m scannings, and partly since the recorded digital signal is reproduced from the medium during at least one scanning of the m scannings, it is possible to conduct simultaneous monitoring also for real time signals during recording.

(2) Second Embodiment

Figure 3:
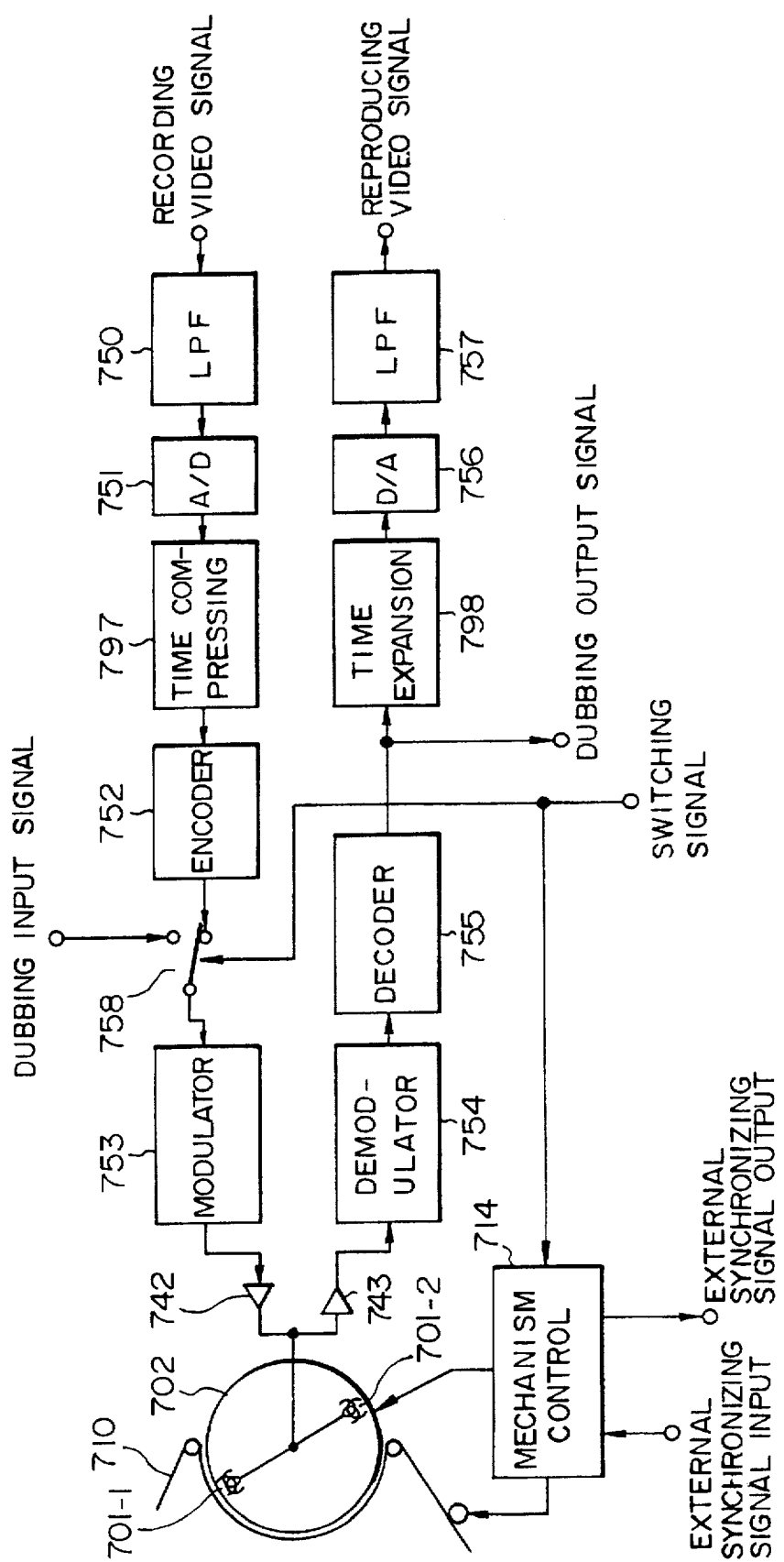
FIG. 3 is a block diagram showing a magnetic recording and reproducing apparatus according to a second embodiment.

FIG. 3 shows a digital signal recording and reproducing apparatus according to a second embodiment. In FIG. 3, a time compressing circuit 797 compresses the time axis of A/D converted video signal data block by block, and a time expanding circuit 798 expands the time axis of video signal data block by block after decoded by a ratio reverse to the time axis compression ratio of the time compressing circuit 797.

Figure 4:
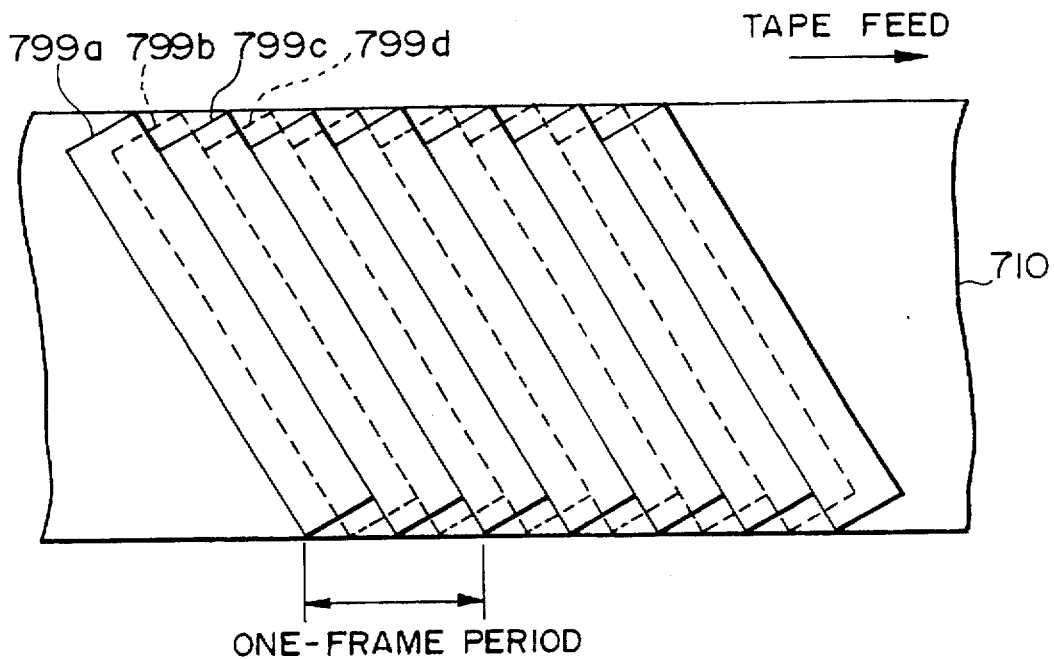
FIG. 4 is a diagram showing a track pattern on the magnetic tape during self-recording and self-reproducing in the second embodiment.

FIG. 4 shows a scanning pattern of magnetic heads 701-1, 701-2 during self-recording and self-reproducing. Of tracks shown in FIG. 4, a track 799a is a track oh which the magnetic head 701-1 scans during the first complete rotation of the rotary drum 702 to do recording and reproducing, a track 799b is a track on which the magnetic head 701-2 scans during the same period not to do either recording or reproducing, a track 799c is a track on which the magnetic head 701-1 scans during the second rotation of the rotary drum 702 to do recording and reproducing, and a track 799d is a track on which the magnetic head 701-2 scans during the same period not to do either recording or reproducing.

Figure 5:
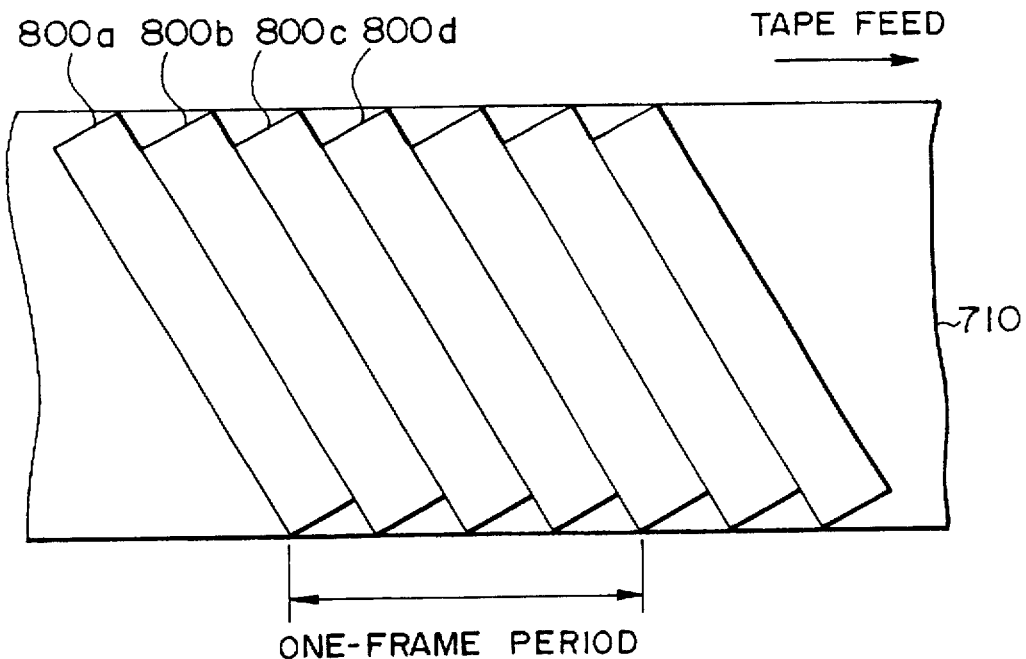
FIG. 5 is a diagram showing a track pattern on the magnetic tape during dubbing in the second embodiment.

FIG. 5 shows a scanning pattern of the magnetic heads 701-1, 701-2 during dubbing. Of tracks shown in FIG. 5, a track 800a is a track on which the magnetic head 701-1 scans during the first complete rotation of the rotary drum 702 to do recording and reproducing, a track 800b is a track on which the magnetic head 701-2 scans during the same period to do recording and reproducing, a track 800c is a track on which the magnetic head 701-1 scans during the second rotation of the rotary drum 702 to do recording and reproducing, and a track 800d is a track on which the magnetic head 701-2 scans during the same period not to do recording and reproducing.

In operation, during self-recording and self-reproducing, the rotary drum 702 is controlled by a mechanism control circuit 714 so as to make two rotations during the period of one frame of the video signal. Therefore, the pattern of the tracks on which the magnetic heads 701-1, 701-2 scan is such as shown in FIG. 4.

During self recording, the recording video data sampled by an A/D converter 751 are divided into blocks of units of fields of, for example, video signal by the time compressing circuit 797. The time axis of the data is compressed, block by block, by ½ or less times. This block data are encoded by giving error detection data D whose content is similar to that shown in FIG. 47, horizontal parity data $P_H$ and vertical parity data $P_V$, by an encoder 752, and are further encoded, for recording, by modulator 753 via a change-over switch 758. After this encoding for recording, the block data are intermittent signals which are recorded on the tracks 799a, 799c, which are shown in solid lines in FIG. 4, via a recording head amplifier 742 by the magnetic head 701-1. In this case, since no signal is applied to the magnetic head 701-2, data of one frame of video signals are recorded on the two tracks 799a, 799c during two rotations of the rotary drum 702.

During self reproduction, the magnetic head 701-1 scans the tracks 799a, 799c with the magnetic tape being fed at the same feed speed as that during recording and with the rotary drum 702 being driven at the same rate of rotation as that during recording. The reproduced signal is decoded via a head amplifier 743 by a demodulator 753 in the same manner as in the prior art. The demodulated data are subjected to error correction and error detection of reproducing data by a decoder 755 based on error detection data, horizontal parity and vertical parity. The decoded reproducing data are intermittent signals in blocks and hence are time-expanded at a ratio reverse to the time compression ratio, by a time expanding circuit 798 to become original continuous video signal data. Then the data are converted to analog data by a D/A converter 756 and are band-restricted by an LPF 757, thereby becoming a reproducing video signal.

Figure 50:
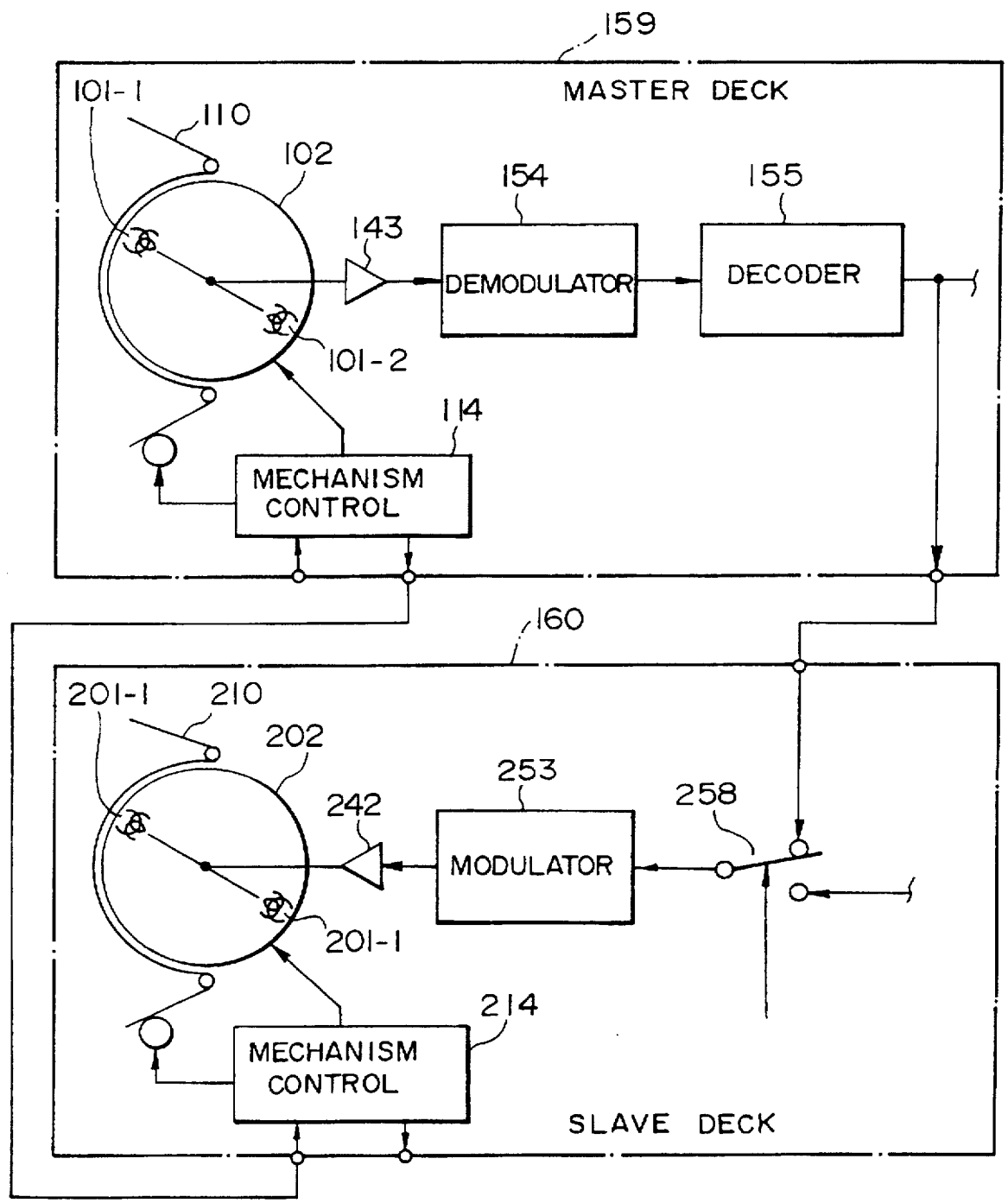
FIG. 50 is a block diagram showing the manner in which a master deck and a slave deck are connected when dubbing is performed by using the magnetic recording and reproducing apparatus of the second prior art.
Figure 51:
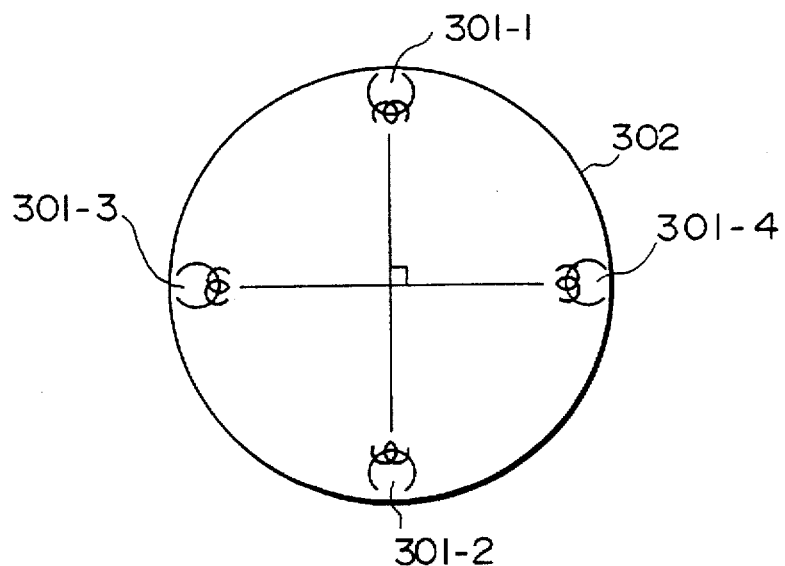
FIG. 51 is a diagram showing the arrangement of magnetic heads in a magnetic recording and reproducing apparatus according to a third prior art.
Figure 52:
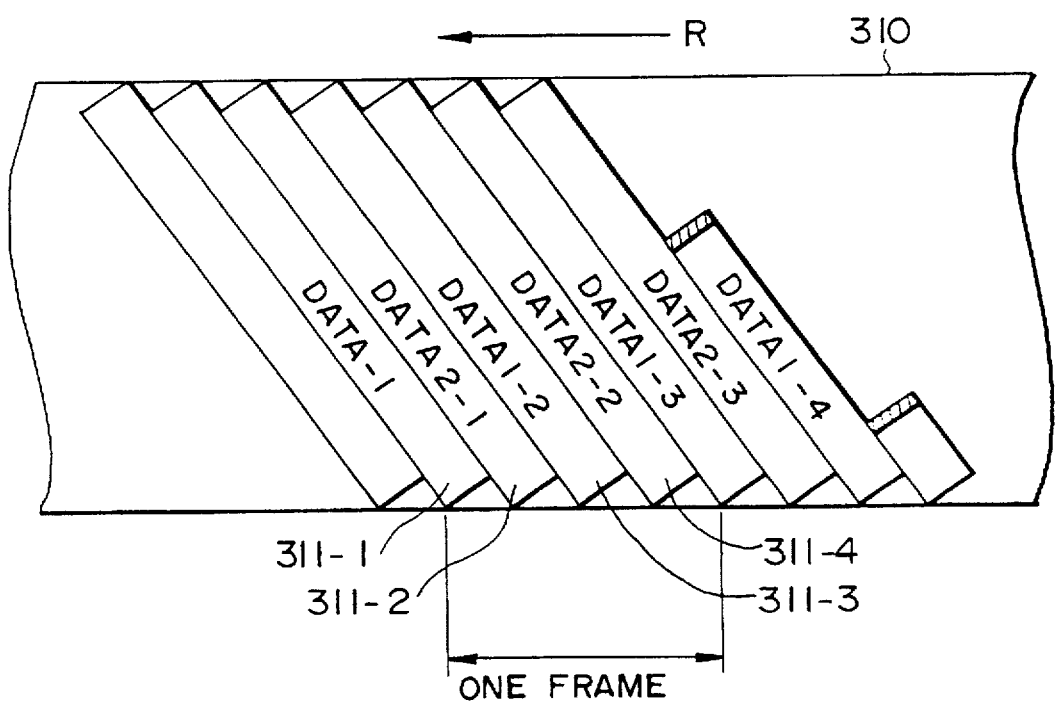
FIG. 52 is a diagram showing a track pattern on the magnetic tape in the third prior art.

The mode of operation during dubbing will now be described. The master deck and the slave deck are interconnected in the same manner as in the prior art (FIG. 50).

In this case, the mechanical control circuit of the two decks controls the rotary drum in such a manner that the rotary drum make two rotations during the period of one frame of the video signal. At the same time, upon receipt of a switching signal instructing the dubbing mode, the mechanical control circuit controls the feed speed of the magnetic tape to double.

Therefore, the track pattern on which the magnetic heads scan the magnetic tape serving as the master tape is as shown in FIG. 5. Specifically, during the period of one frame of the video signal, each of the rotary drums of the two decks makes two rotations. During the first rotation of the rotary drum, one of the magnetic heads 701-1, for example, scans the track 800a, and the other magnetic head 701-2, for example, scans the track 800b. During the second rotation of the rotary drum, the magnetic ahead 701-1 scans the track 800c, and the magnetic head 701-2 scans the track 800d. As a result, the reproducing signal will be reproducing data which are a succession of block data. In the master deck, the reproducing data are demodulated by the demodulator and are decoded by the decoder, whereupon the video signal data with the time axis remaining compressed are transferred to the slave deck. In the slave deck, the inputted reproducing data are encoded, for recording, by the modulator and are recorded on two tracks during every rotation of the rotary drum by scanning the tracks in the same manner as in the master deck. Since recording is performed by reproducing the block data successively, it is possible to perform dubbing at a data rate two times larger than that during self-recording and self-reproducing.

The reproducing of the magnetic tape dubbed recorded at high speed by the foregoing operation is performed at a tape feed speed which is a half of that during dubbing recording. Since the tape feed speed during dubbing recording is two times larger than ordinary, deviation would occur between the slant of the trace formed on the slave tape and that on the master tape. But this deviation can be definitely overcome by a tracking servo using movable magnetic heads, so that the slave tape can be adequately reproduced.

In this embodiment, the time axis of the block data is compressed by ½ times during recording, and the time axis of the reproducing data is expanded by two times during reproducing. More particularly, during dubbing reproducing, the data whose time axis compressed by ½ times are reproduced by a pair of magnetic heads to become a continuous signal by increasing the feed speed of the magnetic tape by two times. During dubbing recording, recording is performed by a pair of magnetic heads so as to form a track pattern same as that on the master tape. Generally, in an apparatus for recording data of one field period on n tracks, it is preferable to determine the rate of compressing the time axis to 1/n; the rate of expanding the time axis, n times; and the feed speed of the tape, n times and the rotation speed of the rotary drum, n times.

In this embodiment, the signals to be processed are video signals. Alternatively, the signals to be processed may be audio signals, or may be other signals having a different periodicity for helical scanning recording.

According to this embodiment, high-speed dubbing an be realized.

(3) Third Embodiment

Figure 6:
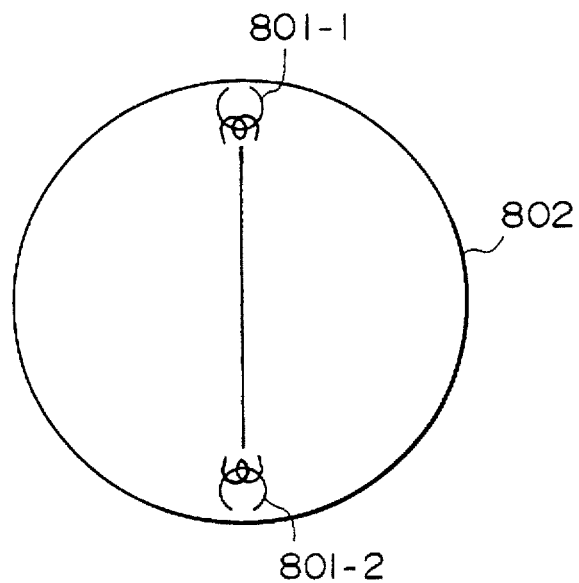
FIG. 6 is a diagram showing the arrangement of magnetic heads in a magnetic recording and reproducing apparatus according to a third embodiment.
Figure 7:
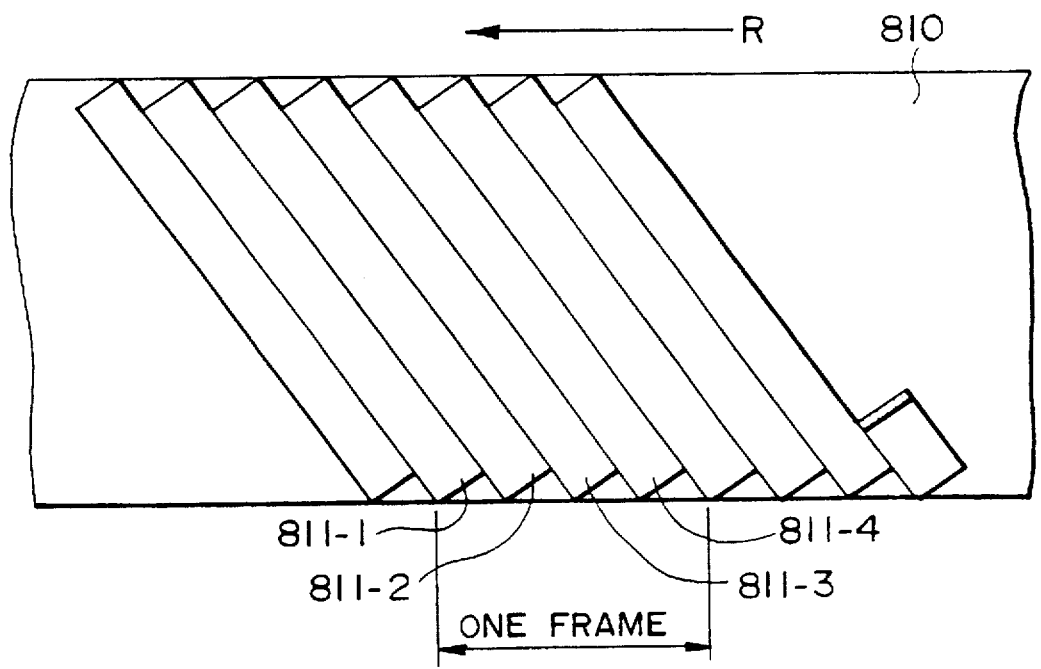
FIG. 7 is a diagram showing a track pattern on the magnetic tape in the third embodiment.

FIG. 6 shows the arrangement of magnetic heads in a magnetic recording and reproducing apparatus according to a third embodiment. FIG. 7 shows a track pattern in which signals are recorded on a magnetic tape by the magnetic heads.

In FIG. 6, the first and second magnetic heads 801-1, 801-2 are disposed on the peripheral surface of a rotary drum 802 and are angularly spaced from each other by 180°.

Of tracks constituting the track pattern of FIG. 7, a track 811-1 is a track on which the first magnetic head 801-1 scans during the first rotation of the rotary drum 802, a track 811-2 is a track on which the second magnetic head 801-2 scans during first rotation of the rotary drum 802, a track 811-3 is a track on which the first magnetic head 801-1 scans during the second rotation of the rotary drum 802, and a track 811-4 is a track on which the second magnetic head 801-2 scans during the second rotation of the rotary drum 802.

Figure 8:
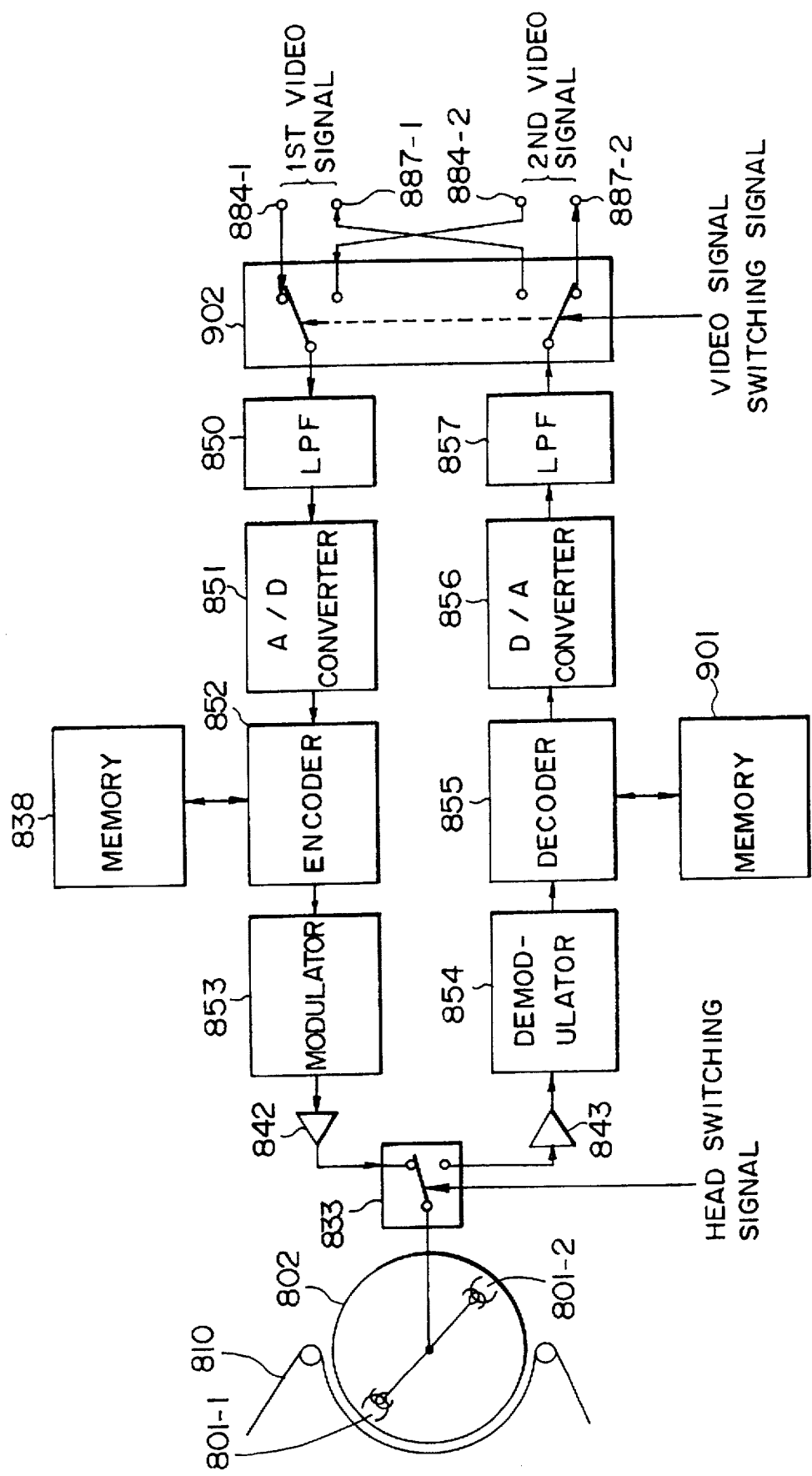
FIG. 8 is a block diagram showing a circuit construction according to the third embodiment.

FIG. 8 is a block diagram showing a signal processing system in which when the magnetic heads are arranged as shown in FIG. 6 and when the tracks are formed in the pattern shown in FIG. 7, two-channel video signals can be reproduced while digitally recorded on the tracks.

A reproducing head amplifier 843 amplifies reproducing signals from the magnetic heads 801-1, 801-2. A demodulator 854 decodes, in the manner reverse to the encoding, by a modulator 853. A decoder 855 performs error correction and detection by decoding the data to which error correcting codes were added by an encoder 852. A memory 901 is used in decoding by the decoder 855. A D/A converter 856 produces analog reproducing video data in which errors have been corrected. An LPF 857 restricts the reproducing video signals to a video signal band.

A head changeover switch 833 changeovers from the recording head amplifier 842 to the reproducing head amplifier 843 and vice versa for connection to the magnetic heads 801-1, 801-2, based on the head changeover signal. The video signals of the first and second channels are inputted to the respective input terminals 884-1, 884-2 during recording. The video signals of the first and second channels are outputted from the respective output terminal 887-1, 887-2 during reproducing. A video signal changeover switch 902 changeovers the input/output signals of the first and second channels based on the video signal changeover signals.

Figure 9:
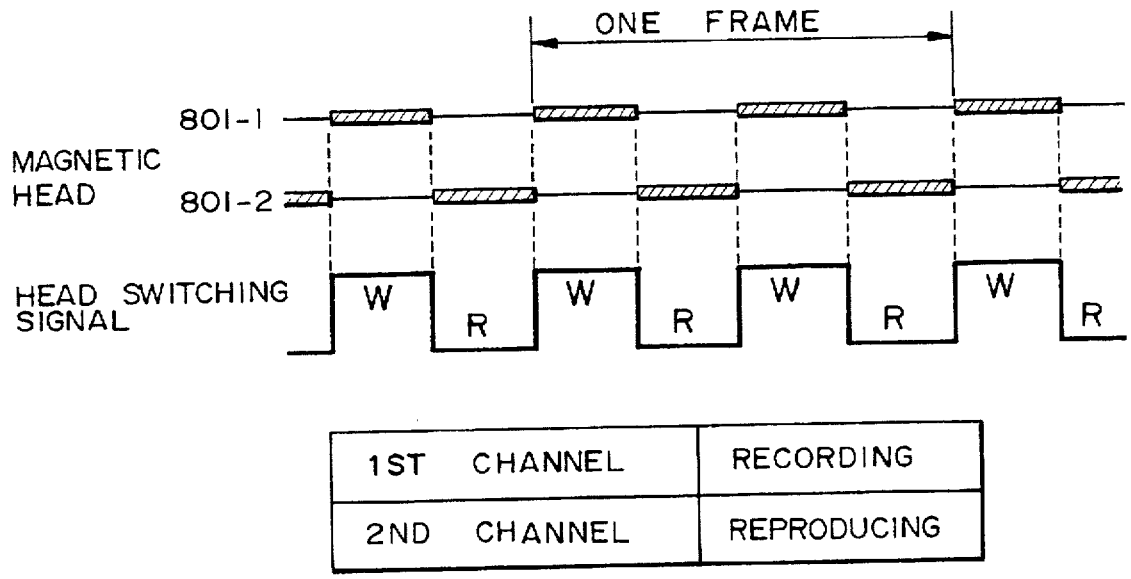
FIG. 9 is a diagram showing the recording of a first channel and the reproducing of a second channel, of recording/reproducing of the magnetic heads in the third embodiment.
Figure 10:
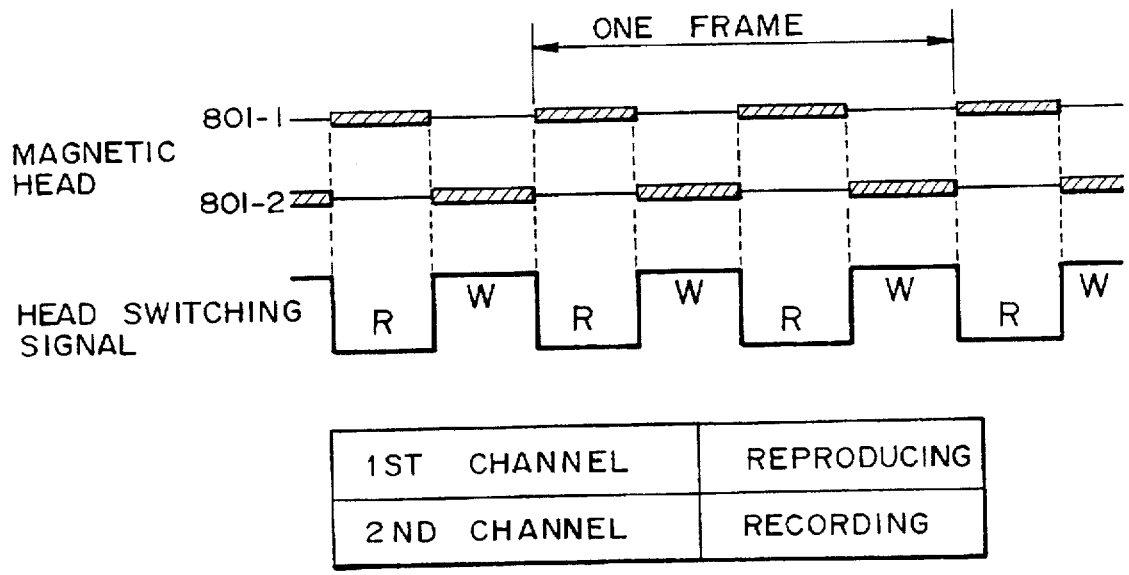
FIG. 10 is a diagram showing the reproducing of the first channel and the recording of the second channel, of the recording/reproducing of the magnetic heads in the third embodiment.

FIGS. 9 and 10 show the manner in which the first and second magnetic heads 801-1, 801-2 are switched by the head changeover signal. Each magnetic head 801-1, 801-2 records (W) at the high level of the head changeover signal and reproduces (R) at the low level. Each of the hatched portions on a line, which show the posture of the individual magnetic head 801-1, 801-2, represents a magnetic tape tracing period.

Figure 11:
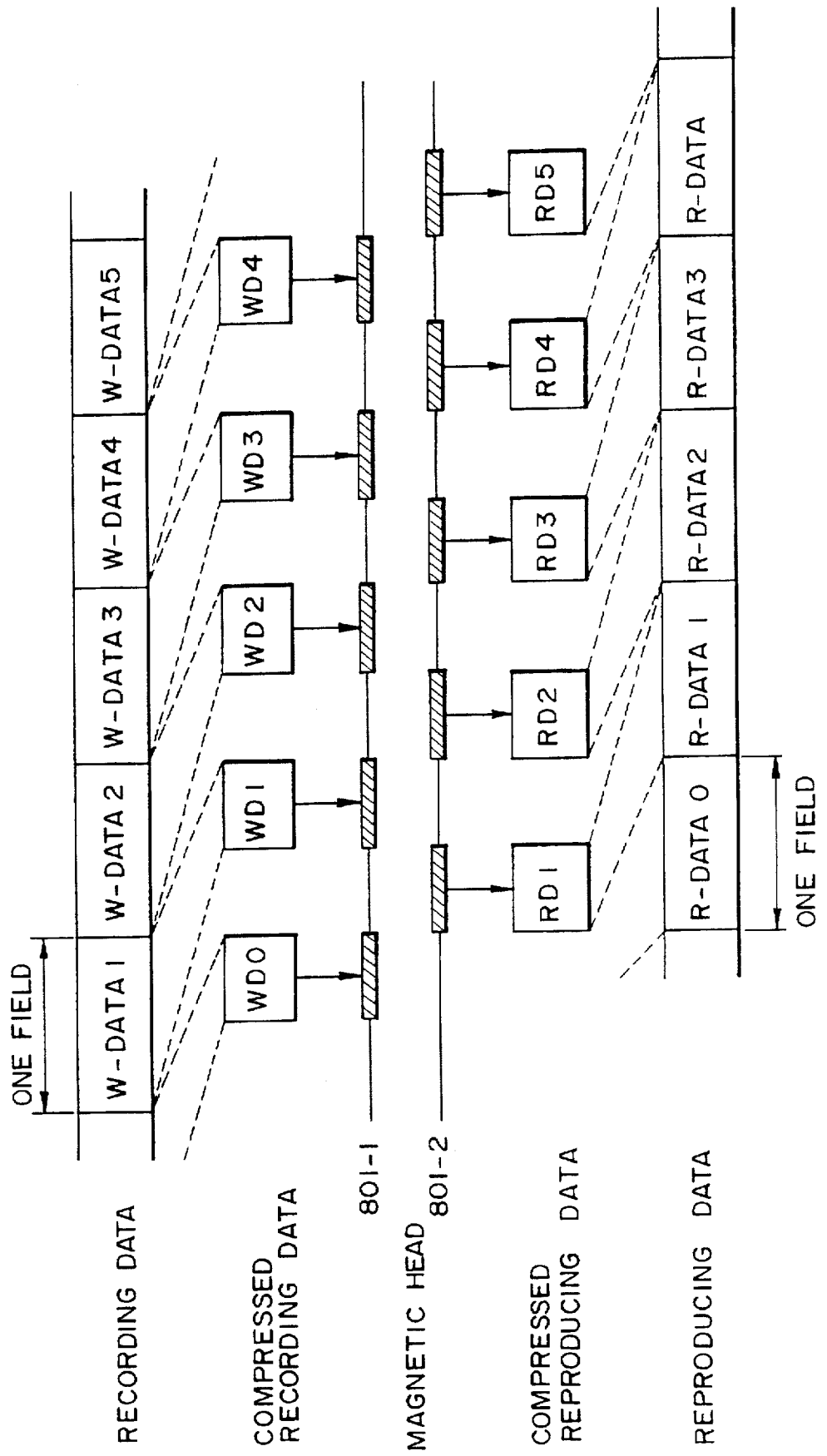
FIG. 11 is a diagram showing data to be recorded/ reproduced and the movement of the magnetic head during the recording of the first channel and the reproducing of the second channel in the third embodiment.

FIG. 11 shows data to be recorded/reproduced and the movement of the magnetic head during the recording of the first channel and the reproducing of the second channel.

In FIG. 11, the recording data obtained by digitizing the video signal of one channel are represented by W-DATAi (i=0, 1, . . . ); and the recording compressed data obtained by compressing the time axis of the recording data are represented by WDi (i=1, 0, . . . ). Likewise, the reproducing compressed data obtained by reproducing the second channel data are represented by R-DATAi (i=1, 2, . . . ); and the reproducing data obtained by expanding the time axis of the reproducing compressed data are represented by RDi (i=1, 2, . . . ). Further, each of the hatched portions on a line, which indicate the posture of individual magnetic heads 801-1, 801-2, shows a magnetic tape tracing period.

In operation, the rotary drum 802, on which a pair of magnetic heads 801-1, 801-2 is supported with an angular space by 180°, is rotated at a rotational frequency two times higher than conventional, and the magnetic tape 810 is fed at a speed two times higher than conventional. On the magnetic tape 810, four tracks are thereby formed/scanned during two rotations of the rotary drum 802. The rotary drum 802, which rotates at a speed two times higher than conventional, makes two rotations during the period needed for one rotation of the rotary drum in the prior art. Therefore, tracks are formed/scanned at the same speed as conventional. During the first rotation of the rotary drum 802, the first magnetic head 801-1 scans the track 811-1, and the second magnetic head 801-2 scans the track 811-2.

During the next rotation of the rotary drum 802, the first magnetic head 801-1 scans track 811-3, and the second magnetic head 801-2 scans the track 811-4.

In these four tracks, the tracks 811-1, 811-3 are associated with one channel, and the tracks 811-2, 811-4 are associated with the other channel.

The mode of operation in which recording of one channel and reproducing of the other channel are performed simultaneously will now be described with reference to FIG. 8.

Firstly, in the recording signal processing system, the video signal changeover switch 902 is operable in response to the inputting of the video signal changeover signal. As a result, the input terminal 884-1 of the first channel video signal or the input terminal 884-2 of the second channel video signal is selected and the video signal to be inputted to the selected terminal is inputted to the LPF 850.

Figure 53:
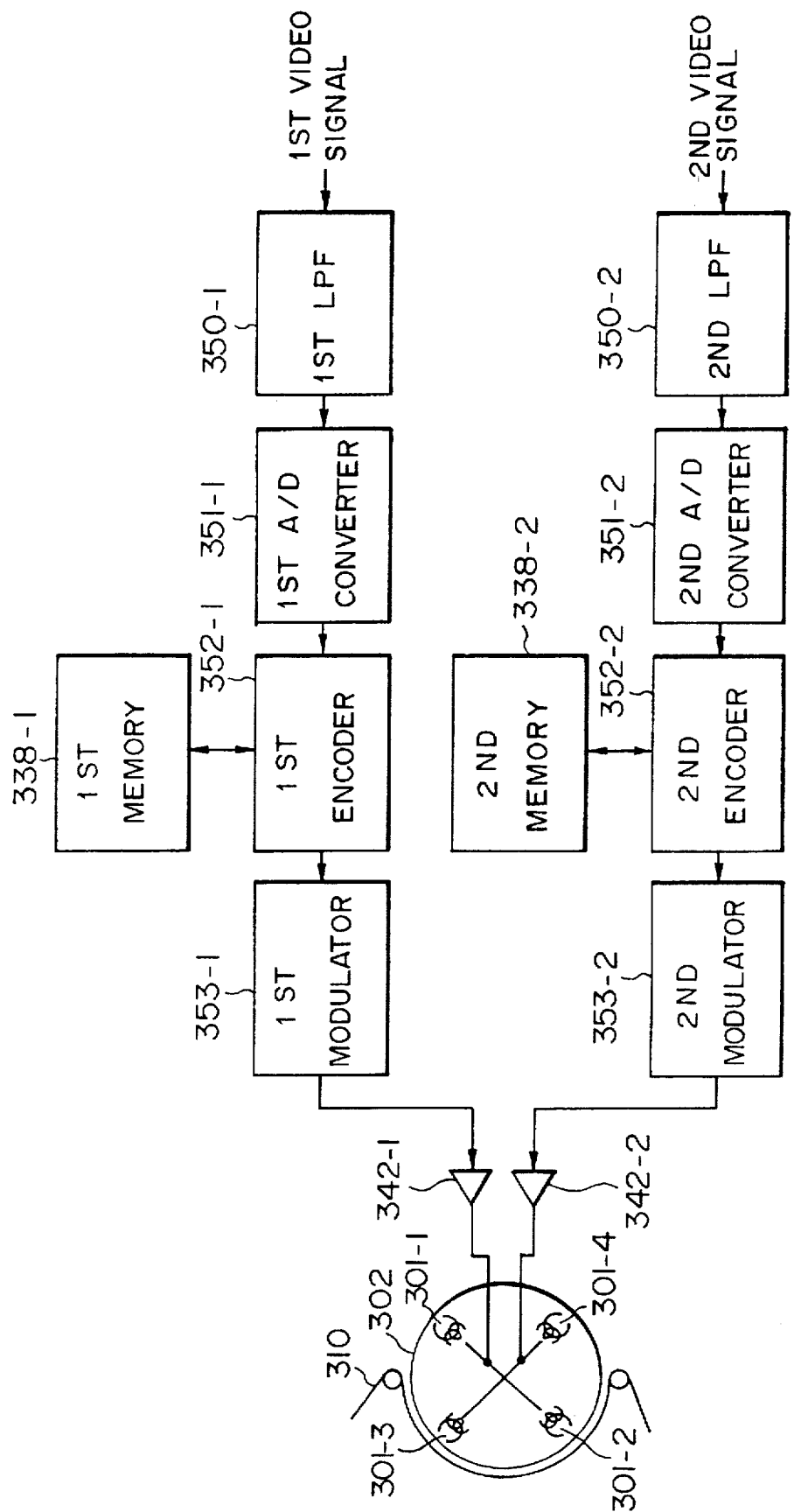
FIG. 53 is a block diagram showing a circuit construction of the third prior art.
Figure 54:
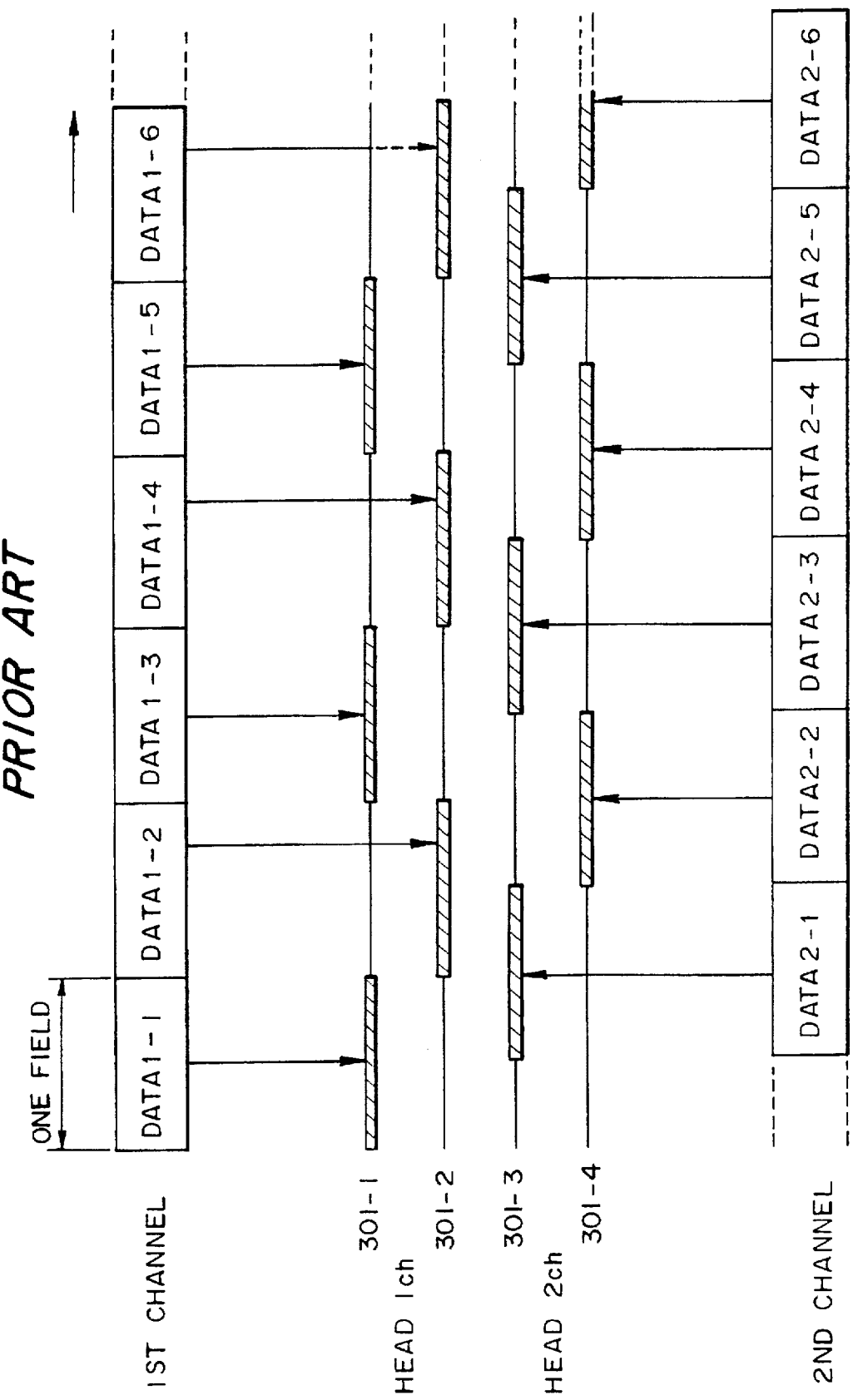
FIG. 54 is a diagram showing data to be recorded and the movement of the magnetic heads when the magnetic tape is fed in the backward or reverse direction in the third prior art.

The video signal inputted to the LPF 850 is restricted in band by the LPF 850 likewise the prior art of FIG. 53 and is then digitized by the A/D converter 851. The digitized video signal is encoded by the encoder 852 with use of the memory 838, is encoded, for recording, by the modulator 853, and is recorded on the magnetic tape 810. Further, the signal encoded for recording is recorded by the first magnetic head 801-1 or the second magnetic head 801-2 via the head changeover switch. At that time, the head changeover switch 833 is turned to the side of the recording head amplifier 842.

In the reproducing signal processing system, the reproducing signal reproduced from the first magnetic head 801-1 or the second magnetic head 801-2 is decoded, by the demodulator 854 via the head changeover switch 833. Using the memory 901, error correction, detection and interpolation are made by the decoder 855. At that time, the head changeover switch 855 is turned to the side of the reproducing head amplifier 843.

Subsequently, the reproducing video signal is converted to an analog signal by the D/A converter 856 is band-restricted by the LPF 857. At that time, by the action of the video signal changeover switch 902, the output terminal 887-1 of the first channel video signal or the output terminal 887-2 of the second channel video signal is selected, and the reproducing video signal is outputted to the selected output terminal.

Here, to the head changeover switch 833, the head changeover signal such as shown in FIGS. 9 and 10 is supplied. Thereby, the recording signal is supplied to the first magnetic head 801-1 and the second magnetic head 801-2, or the reproducing signal is taken out or switched from these magnetic heads 801-1, 801-2. Namely, recording at the high level of the head changeover signal or reproducing at the low level is selected.

FIG. 9 shows a head changeover signal in recording the first channel by the first magnetic head 801-1 and in reproducing the second channel by the second magnetic head 801-2. FIG. 10 shows a head changeover signal in reproducing the first channel by the first magnetic head 801-1 and in recording the second channel by the second magnetic head 801-2.

Here, the case in which recording of the first channel video signal and reproducing of the second channel video signal are performed simultaneously will be described. In FIG. 11, the first channel data digitized by the A/D converter 851 are recording data divided into blocks W-DATA1, W-DATA2 . . . , for example, in units of fields.

The recording data are encoded by adding an error correcting code by the encoder 852 and are time-compressed simultaneously, thus becoming recording compressed data WD0, WD1, WD2, . . . .

Then, as the result of changeover of the head changeover switch 833 by the head changeover signal, the recording compressed data are recorded on the tracks 811-1, 811-3 while the first magnetic head 801-1 is scanning the magnetic tape 810.

Meanwhile, in synchronism with the termination of scanning of the magnetic tape 810 by the first magnetic head 801-1, the head changeover switch 833 is switched to the side of the reproducing head amplifier by the head changeover signal. Until the head changeover switch 833 is switched again, namely, until the second magnetic head 801-2 scans the track 811-2 or 811-4 on the magnetic tape 810 completely, the second magnetic head 801-2 reproduces the tracks 811-2, 811-4 on which the second channel video signal is recorded. This reproducing signal, which is time-compressed during recording, is reproduced as reproducing compressed data RD1, RD2, . . . .

Subsequently, the reproducing compressed data are decoded by the decoder 855 to correct the error and are time-expanded simultaneously, thus becoming reproducing data divided into blocks R-DATA0, R-DATA1, . . . , in units of fields. The reproducing data are converted to analog data by the D/A converter 856 and are reproduced and outputted as the second channel video signal.

As mentioned above, during the period, one of the magnetic heads 801-1, 801-2 scans the magnetic tape 810 two times as the rotary drum 802 makes two rotations during the period of one frame of the video signal, the data of one frame video signal of one channel are time-compressed and recorded for every field. As a result, recording one channel and reproducing the other channel can be performed simultaneously.

In this embodiment, the tracks 811-1, 811-3 are associated with one channel, and the tracks 811-2, 811-4 are associated with the other channel. Alternatively, the tracks 811-1, 811-2 may be associated with one channel, and the tracks 811-3, 811-4 may be associated with the other channel, giving the same result as this embodiment.

Further, in this embodiment, one cycle of information is defined as one frame, and one cycle of information is recorded on two tracks. Alternatively, one cycle of information may be one field, or one frame plus an integral number of fields. The number of tracks on and from which one cycle of information is to be recorded and reproduced should not be limited to any specific number.

As mentioned above, since rotary drum makes two or more rotations within the period of one cycle of information to increase the number of tracks to be scanned within the same period, it is possible to record and reproduce the data in terms of time. Consequently, with the construction for only one channel, it is possible to record one channel and, at the same time, to reproduce the other channel. There are only a few modifications required to a one-channel recording and reproducing apparatus, thus lowering the rate of production.

(4) Fourth Embodiment

Figure 12:
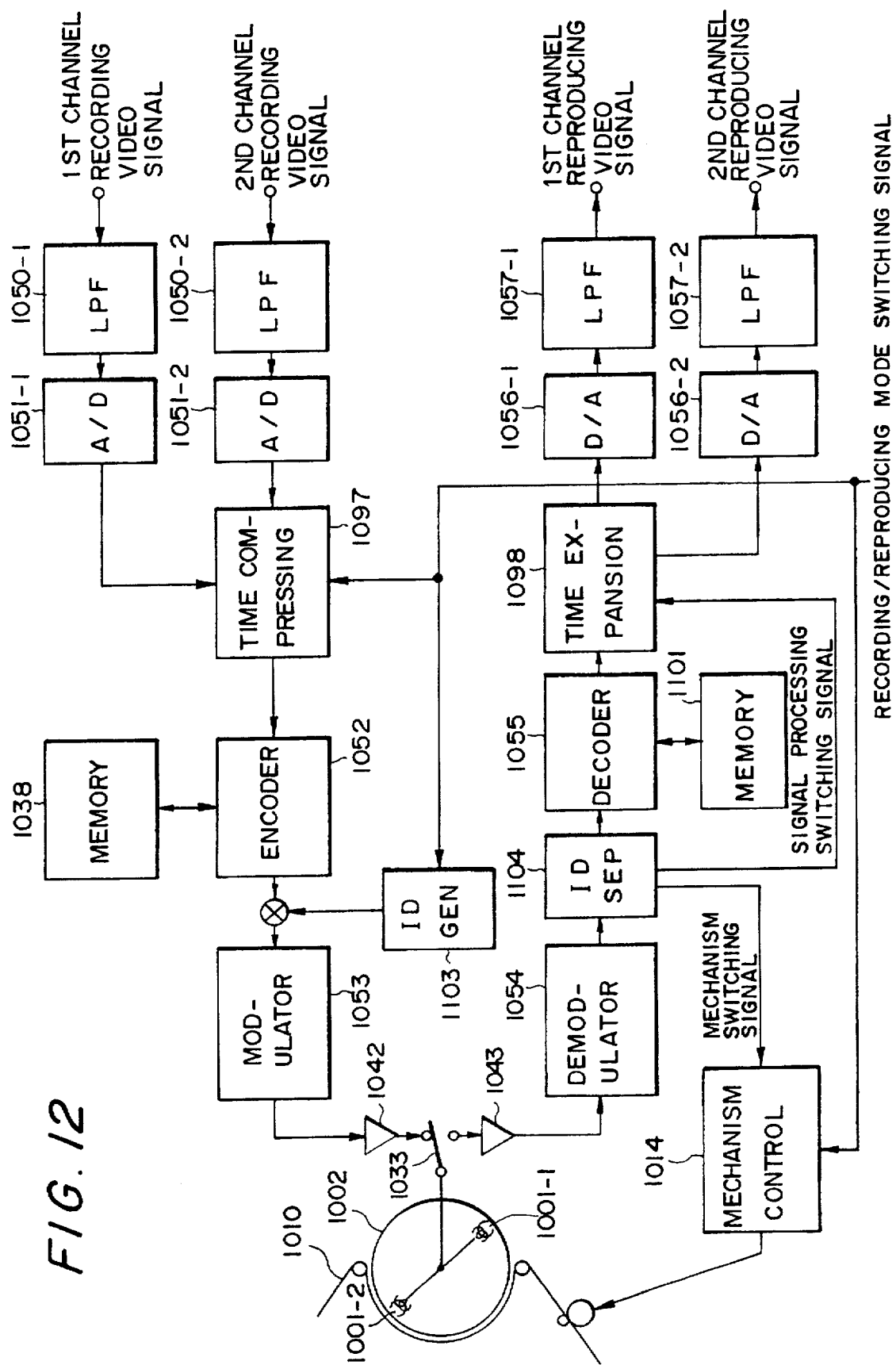
FIG. 12 is a block diagram showing a magnetic recording and reproducing apparatus according to a fourth embodiment.

FIG. 12 shows a digital recording and reproducing apparatus according to a fourth embodiment.

In FIG. 12, a time compressing circuit 1097 compresses the time axis of every block of data obtained by digitizing first and second channel recording video signals. An ID generating circuit 1103 generates, independently of video data, an identification data (hereinafter called "ID") signal to be recorded on one track. An ID detecting circuit 1104 separates an ID signal from reproducing video signal data. A time expanding circuit 1098 expands the time axis of every block of data after decoded at the same rate as that of the time axis compression by a time compressing circuit 1097. A mechanism control circuit 1014 controls the feed speed of the tape. A recording and reproducing mode changeover signal is a signal for switching the mode from the recording mode to the reproducing mode and vice versa. The ID detecting circuit 1104 produces a signal process changeover signal by the detected ID signal to changeover the signal processing system by this signal process changeover signal. Further, the ID detecting circuit 1104 produces a mechanism changeover signal by the detected ID signal and supplies the same signal to the mechanism control circuit 1014 to changeover the feed speed of the magnetic tape.

Figure 13:
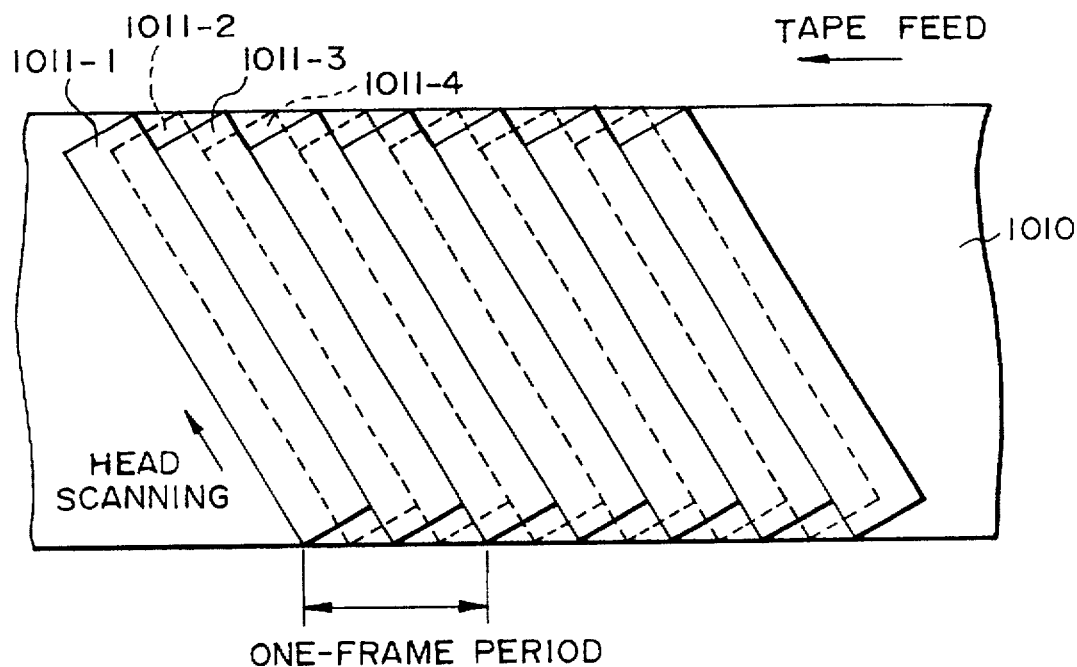
FIG. 13 is a diagram showing a track pattern on the magnetic tape during one-channel recording and reproducing in the fourth embodiment.

FIG. 13 shows a track pattern during one-channel recording and reproducing mode in this embodiment. The track 1011-1 is a track on which a magnetic head 1001-1 records during the first rotation of a rotary drum 1002, a track 1011-2 is a track on which a magnetic head 1001-2 scans during the first rotation of the rotary drum 1002, a track 1011-3 is a track on which the magnetic 1001-1 records during the second rotation of the rotary drum 1002, and a track 1011-4 is a track the magnetic head 1001-2 scans during the second rotation of the rotary drum 1011-4.

Figure 14:
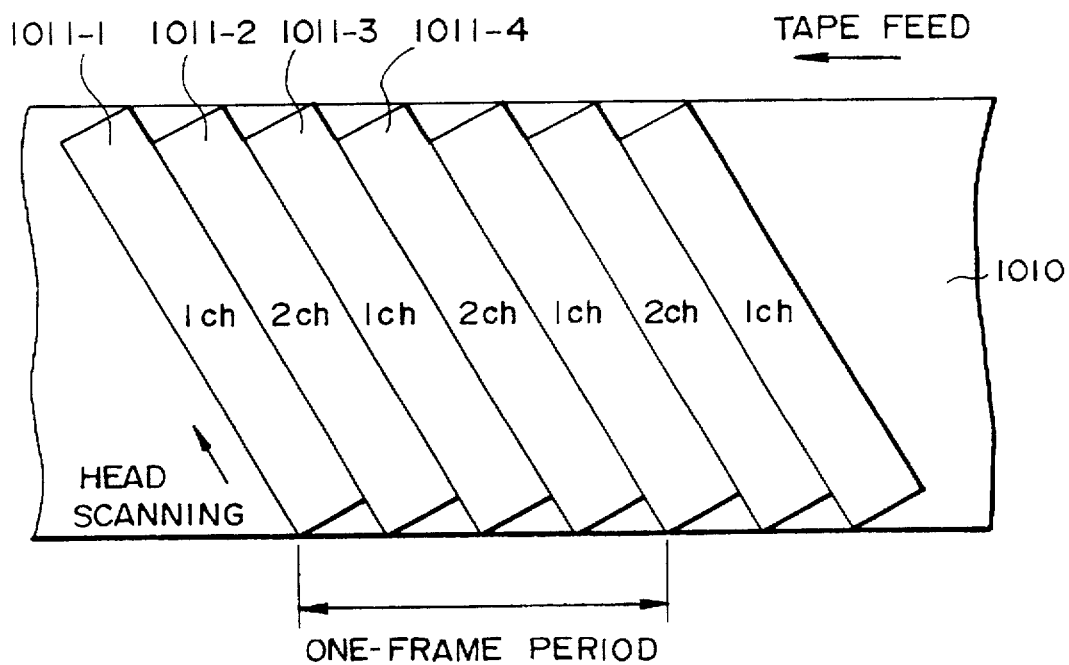
FIG. 14 is a diagram showing a track pattern on the magnetic tape during two-channel recording and reproducing in the fourth embodiment.

FIG. 14 shows a track pattern during two-channel recording and reproducing mode.

Figure 15:
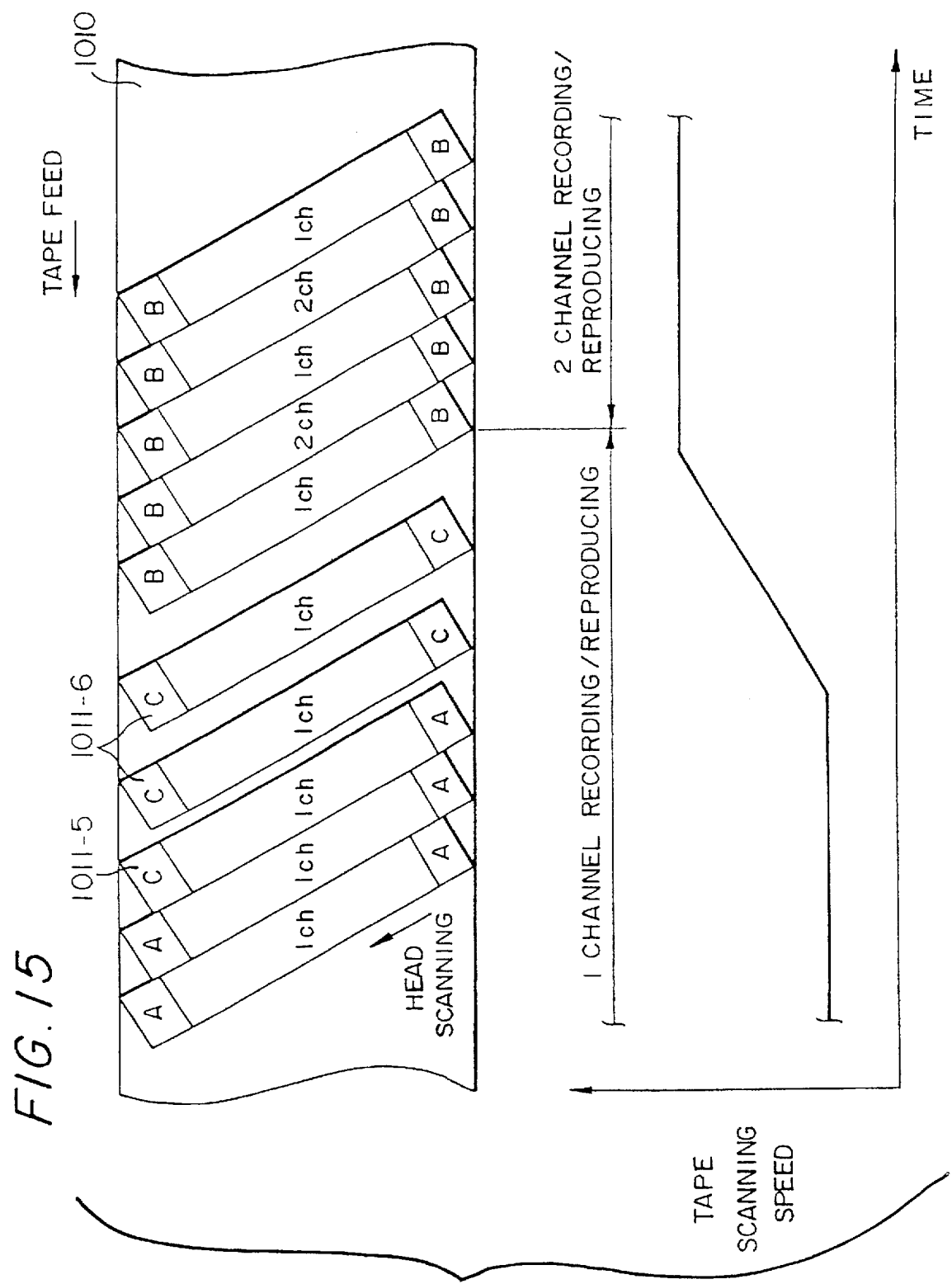
FIG. 15 is a diagram showing a track pattern when operation is shifted from one-channel recording and reproducing to two-channel recording and reproducing in the fourth embodiment, and also showing the change of feed speed of the magnetic tape.

FIG. 15 is a diagram showing a track pattern when operation is shifted from one-channel recording and reproducing to two-channel recording and reproducing, and also showing the change of feed speed of the magnetic tape. A track 1011-5 is scanned soon after switching the feed speed of the tape, and a track 1011-6 on which recording and reproducing are performed during the period of switching the feed speed of the tape.

Figure 16:
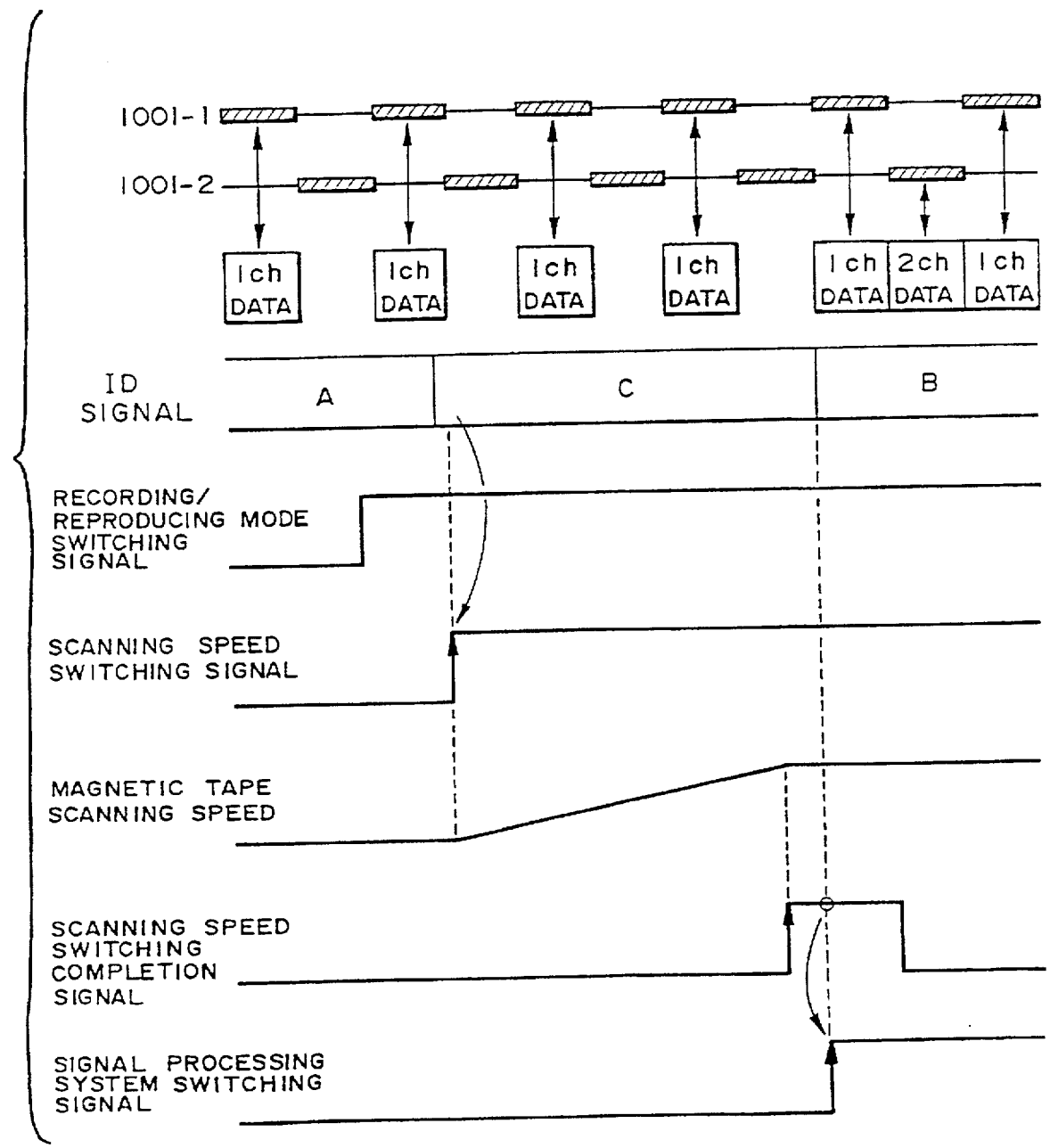
FIG. 16 is a timing diagram showing the operation when it is shifted from one-channel recording and reproducing to two-channel recording and reproducing in the fourth embodiment.

FIG. 16 is a timing diagram showing the operation when it is shifted from one-channel recording and reproducing to two-channel recording and reproducing. The scanning periods of the individual magnetic heads 1001-1, 1001-2 is represented by hatched portions. The data of each channel to be recorded and reproduced are represented by a box right under the individual hatched portion. The ID signals to be recorded and detected are designated by A, B and C. The recording and reproducing mode changeover signal corresponds at the low level to one-channel recording and reproducing mode and at the high level to two-channel recording and reproducing mode. A feed speed changeover signal corresponds at the low level to an ordinary speed and at the high level to a double speed. Further, also shown in FIG. 16 are the feed speed of the magnetic tape, the feed speed changeover completion signal and the signal processing system changeover signal. The signal processing system changeover signal corresponds at the low level to one-channel recording and reproducing and at the high level to two-channel recording and reproducing.

Figure 17:
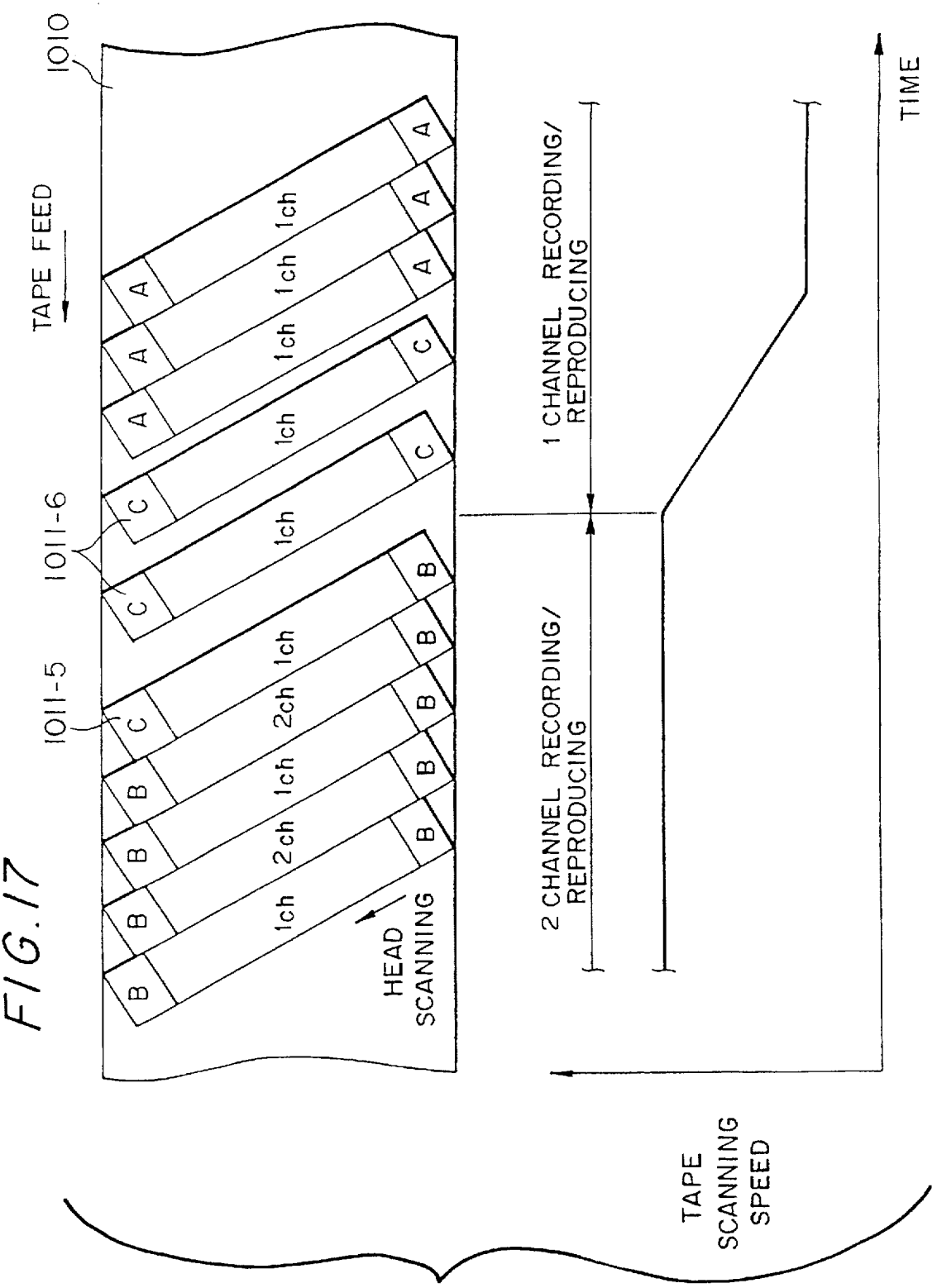
FIG. 17 is a diagram showing a track pattern when operation is shifted from two-channel recording and reproducing to one-channel recording and reproducing in the fourth embodiment, and also showing the change of feed speed of the magnetic tape.

FIG. 17 is, reverse to FIG. 15, a diagram showing a track pattern when operation is shifted from two-channel recording and reproducing to one-channel recording and reproducing, and also showing the change of feed speed of the magnetic tape.

Figure 18:
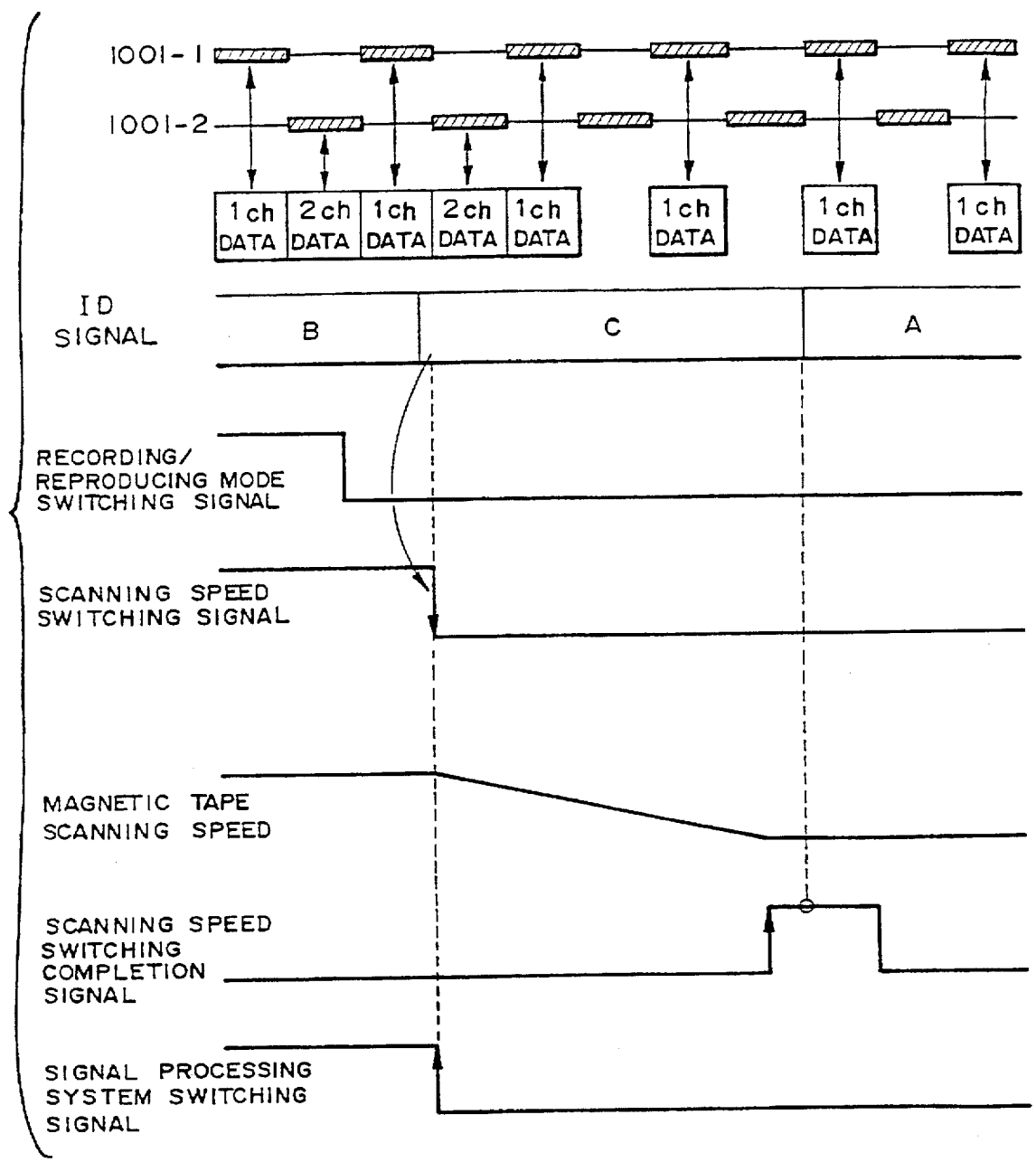
FIG. 18 is a timing diagram showing the operation when it is shifted from two-channel recording and reproducing to one-channel recording and reproducing in the fourth embodiment.

FIG. 18 is, reverse to FIG. 16, a timing diagram showing the operation when it is shifted from two-channel recording and reproducing to one-channel recording and reproducing.

In operation, a pair of magnetic heads 1001-1, 1001-2 are supported on the peripheral surface of the rotary drum 1002 and are angularly spaced from each other by 180°. During two-channel recording and reproducing in this embodiment, the rotary drum 1002 is rotated at a speed two times higher than conventional.

Therefore, during the period needed for two rotations of the rotary drum 1002, the four tracks 1011-1 through 1011-4 shown in FIG. 14 are formed/scanned. Specifically, within the time needed for one rotation of the prior art rotary drum (within the period of one frame), the rotary drum 1002 of this embodiment makes two rotations. During the first rotation of the rotary drum 1002, the magnetic ahead 1001-1 scans the track 1011-1, and the magnetic head 1001-2 scans the track 1011-2. During the next rotation of the rotary drum 1002, the magnetic ahead 1001-1 scans the track 1011-3, and the magnetic head 1001-2 scans the track 1011-4. During recording of only the first channel, only the tracks 1011-1, 1011-3 indicated in solid lines in FIG. 13 are recorded by the magnetic head 1001-1.

The one-channel recording and reproducing mode will now be described. Like the prior art, the first channel recording video signal is band-restricted by an LPF 1050-1 and is digitized by an A/D converter 1051-1. The data are divided into blocks, for example, in units of fields, and the time axis of the data is compressed, for every block, by ½ or less by the time compressing circuit 1097. The time-compressed data of every block are encoded by an encoder 1052 like the prior art, using the memory 1038. And the same data are composed with an ID signal from the ID generating circuit 1103. The composed data are further encoded, for recording, by the modulator 1053.

The recording data here are intermittent data for every period of one field and are recorded on the tracks 1011-1, 1011-3 of FIG. 13 via the recording amplifier 1042. Therefore, only during the scanning period of the magnetic head 1001-1, recording on the magnetic tape 1010 is performed, and during the scanning period of the magnetic head 1001-2, no recording is performed.

During reproducing, the data to be reproduced during the scanning period of the magnetic head 1001-1 decoded, by a decoder 1054 via a reproducing head amplifier 1043. An ID detecting circuit 1104 separates ID signal and reproducing video signal data composed during recording. The separated reproducing video data are error-corrected, error-detected and interpolated by an decoder 1055, using the memory 1011.

The time expanding circuit 1098 expands the time axis of the reproducing video data at the same rate as the time axis compression by the time compressing circuit 1097 during recording. Here the reproducing video data, in the form of a succession of blocks, are converted into an analog signal by a D/A converter 1056-1 and are band-restricted by an LPF 1057-1. Thus a first channel reproducing video signal has been obtained.

The two-channel recording and reproducing mode in which the first and second channels are recorded and reproduced simultaneously. In this mode, the magnetic tape 1010 is fed at a speed two times higher than that of the one-channel recording and reproducing mode.

Therefore, likewise during the one-channel recording and reproducing, four tracks of the magnetic tape 1010 are scanned during two rotations of the rotary drum 1002. However, in this mode, the individual tracks do not overlap one another to form a track pattern shown in FIG. 14.

During recording, the magnetic heads 1001-1, 1001-2 record four tracks within the period of one frame. In the signal processing system, the first and second channel recording video signals are band-restricted by the respective LPFs 1050-1, 1050-2. The band-restricted signals are digitized respectively by A/D converters 1051-1, 1051-2 and are time-compressed by the time compressing circuit 1097.

This time compression here is performed in every block for both channels, and the compressed data of two channels are arranged alternately in blocks. As a result, a succession of data has been produced. The successive data are encoded, for error correction, by an encoder 1052 and are encoded, for recording, by a modulator 1053 after composed with ID signals. The data encoded for recording are recorded on the magnetic tape 1010 via a recording head amplifier 1042 and a head changeover switch 1033. At that time, the magnetic head 1001-1 records first channel recording data, and the magnetic head 1001-2 records second channel recording data.

During reproducing, the magnetic heads 1001-1, 1001-2 reproduce data of the respective channels. At that time, like the one-channel reproducing mode, decoding by a demodulator 1054 ID detection by an ID detecting circuit 1104, error correction by a decoder 1055, and interpolation. Further, in the time expanding circuit 1098, the reproducing data of two channels are separated for every block and are respectively time-expanded, thus obtaining the reproducing video data of the first and second channels.

The reproducing video data of the individual channels are converted into analog signals by the respective D/A converters 1056-1, 1056-2 and are band-restricted by the respective LPFs 1057-1, 1057-2. As a result, first and second channel reproducing video signals have been obtained.

As mentioned above, in the one-channel recording and reproducing mode, signal processing after time compression during recording until time expansion during reproducing is intermittent processing of compressed data of one channel. In the two-channel recording and reproducing mode, the compressed data of two channels are successively processed.

An ID signal to be added at an ID generating circuit 1103 includes data which discriminate these two kinds of recording and reproducing modes. The data are recorded on the magnetic tape as ID signals during recording of each mode.

Here, for example, the ID signal is recorded at two positions on opposite end of the track as A in the one-channel recording and reproducing mode and as B in the two-channel recording and reproducing mode.

The case in which one of one-channel and two-channel recording and reproducing modes is switched to the other mode during operation in the former mode.

Firstly, the case in which the one-channel recording and reproducing mode is switched to the two-channel recording and reproducing mode during operation in the first mode. When a recording and reproducing mode changeover signal is generated during recording of one channel, the mechanism control circuit 1014 changeovers, in response to this signal, the feed speed of the magnetic tape from a one-fold speed to a two-fold speed. However, because of followability of the motor, the feed speed of the magnetic tape 1010 cannot be instantaneously increased to a two-fold speed. For this reason, when the feed speed of the magnetic tape is detected as actually having increased to a two-fold speed, the signal processing system should necessarily be switched to the two-channel recording mode. FIG. 15 shows a track pattern recorded on the magnetic tape 1010 during the period needed for shifting the feed speed of the magnetic tape, namely, the mode changeover period. During this period, no track can be formed. To this end, for distinguishing this track from an ordinary track, an ID signal C, independent from A and B indicating two kinds of modes, is used as the ID signal of the track 1011-6 during this period. Further, to detect the feed speed switching period reliably, C is also recorded on an ID signal on the trailing end of the track 1011-5 right before switching the feed speed of the magnetic tape is started.

In operation, as shown in FIG. 16, firstly when the recording mode changeover signal rises, an ID signal C is recorded at the trailing end of the succeeding track formed as the magnetic head 1011-1 scans. At the timing of switching from the magnetic head 1001-1 to the magnetic head 1001-2, the feed speed of the magnetic tape is started switching. The mechanism control circuit 1014 is detected that the tape is being fed at a two-fold speed, whereupon the signal processing system will be shifted to the two-channel recording mode at the timing of switching from the magnetic head 1001-2 to the magnetic head 1001-1.

For reproducing the track thus recorded, in response to the recording and reproducing mode changeover signal during one-channel reproducing, or in response to the detection of shifting from the ID signal A to the ID signal C by the ID detecting circuit 1104, both the feed speed of the magnetic tape and the signal processing system are switched to the two-channel reproducing mode at the same timing as that during recording.

Then, the case in which the two-channel recording and reproducing mode is switched to the one-channel recording and reproducing mode during operation in the former mode will be described. During recording, in response to the recording and reproducing mode changeover signal, the mechanism control circuit 1014 switches the operation of the drive system so as to changeover the feed speed of the magnetic tape from a two-fold speed to a one-fold speed. Also regarding the signal processing system, in response to the recording and reproducing mode changeover signal, the two-channel recording mode is switched to the one-channel recording mode. The resulting recording track pattern is shown in FIG. 17. The ID signal here also will be regarded as C at the trailing end of the track 1011-6 during the feed speed switching and of the track 1011-5 right before the feed speed switching is started.

In operation, as shown in FIG. 18, during recording, when the recording and reproducing mode changeover signal rises, an ID signal at the trailing end of the succeeding track to be recorded by scanning by the magnetic head 1001-1 will be recorded as C. At the timing of switching from the magnetic head 1001-1 to the magnetic ahead 1001-2, switching the feed speed of the magnetic tape will be started, at which time the signal processing system is the one-channel recording mode.

For reproducing, when the recording and reproducing mode changeover signal rises during two-channel reproducing, or when the change of the ID signal from B to C is detected, both the feed speed of the magnetic tape and the signal processing system will be switched to the one-channel reproducing mode at the same timing as during recording.

In this embodiment, the ID signal is recorded on a helical track. The ID signal may be recorded and reproduced on and from a linear track.

Further, in this embodiment, one cycle of information is defined as one frame, and one cycle of information is recorded on two tracks. Alternatively, one cycle of information may be one field, or one frame plus an integral number of fields. The number of tracks on and from which one cycle of information is to be recorded and reproduced should not be limited to any specific number.

As mentioned above, partly since the rotary drum makes two or more rotations during the period of one cycle of information, and partly since the feed speed of the magnetic tape is switchable, it is possible to switch the operation mode from one-channel recording and reproducing mode to two-channel recording and reproducing mode and vice versa even while the magnetic tape is being fed.

(5) Fifth Embodiment

Figure 19:
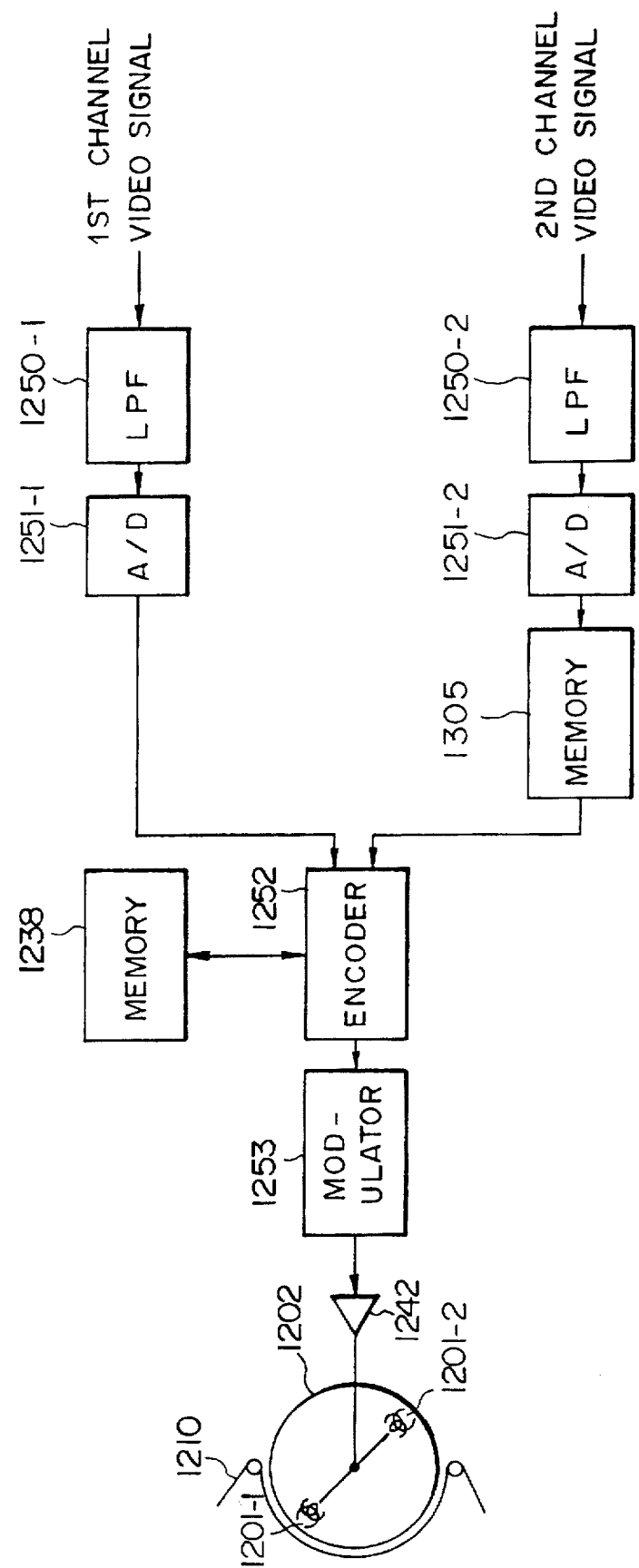
FIG. 19 is a block diagram showing a magnetic recording and reproducing apparatus according to a fifth embodiment.

FIG. 19 shows a recording signal processing system according to a fifth embodiment. This recording signal processing system digitally records two-channel video signals simultaneously. An encoder 1252 is operable at a higher rate than conventional. A buffer memory 1238 is capable of writing and reading at high rate to perform high-speed encoding. Responsive to this, a modulator 1253 also is capable of encoding at a higher rate than conventional. Also a head amplifier 1242 covers a higher band than conventional. Further, a buffer memory 1305 is used for synchronizing two-channel video digital data.

Figure 20:
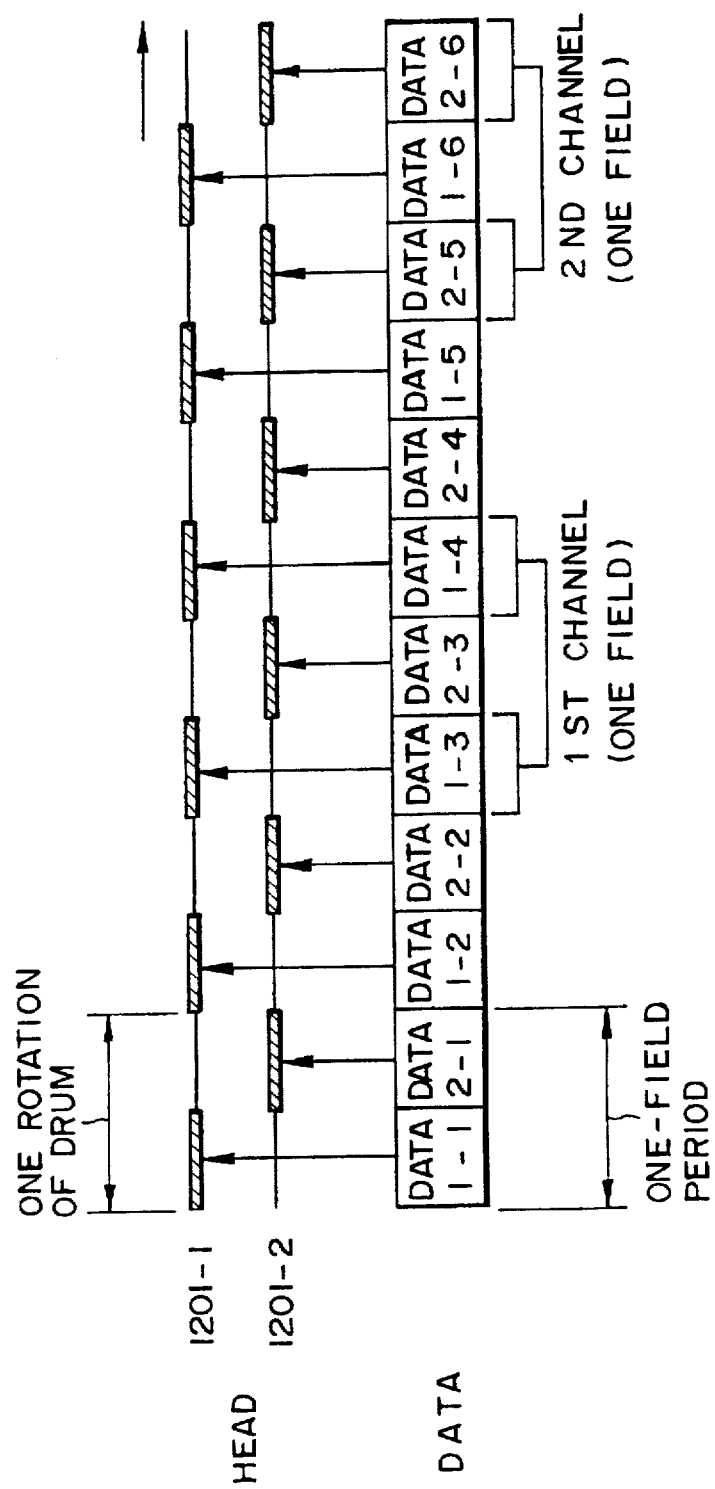
FIG. 20 is a diagram showing data to be recorded/ reproduced and the movement of the magnetic heads in the fifth embodiment.

FIG. 20 shows the data distribution to be recorded/reproduced and the movement of the magnetic heads. The data DATA1-1, DATA2-1, . . . represent the recording data to be outputted from the modulator 1253. Further, each of the hatched portions on a line, which indicate the movement of each magnetic head, represents a period of tracing the magnetic tape.

In operation, a pair of magnetic heads 1201-1, 1201-2 are supported on the peripheral surface of a rotary drum 1202 and are angularly spaced from each other by 180°. When the rotary drum 1202 is rotated at a speed two times higher than conventional and the magnetic tape 1210 is fed at two-fold speed, a track will be formed on the magnetic tape 1210 in the same pattern as that in the fourth embodiment (FIG. 14). Specifically, the first and second channel video signals are band-restricted by the respective LPFs 1250-1, 1250-2 and are digitized by the respective A/D converters 1251-1, 1251-2. Of these two-channel video data, the second channel video data are shifted by ½ field by the buffer memory 1305. As a result, the preceding first channel data are encoded prior to the remaining data by the encoder 1252. However, encoding here is performed at a processing rate two or more times higher than convention by a buffer memory 1238. Therefore, partly since the period of time needed for encoding data of one frame of the preceding channel requires only a ½ field period, and partly since encoding of data of one field of the other channel also requires only a ½ field period, the former should be associated with ½ field and the latter should be associated with ½ field. The digital data of one field of high data rate including both channels are encoded, for recording, at high speed, by the modulator 1253.

The recording data arrangement will therefore be such as shown in FIG. 20. Specifically, during the first rotation of the rotary drum 1202, the data of one field of the first channel DATA1-1 are recorded on a track 1-A by the magnetic head 1201-1, and then the data of one field of the second channel DATA2-1 are recorded on a track 1-B by the magnetic head 1201-2. During the second rotation of the rotary drum 1202, the data of one succeeding field of the first channel DATA1-2 are recorded on a track 2-A by the magnetic head 1201-1, and then the data of one succeeding field of the second channel DATA2-2 are recorded on a track 2-B by the magnetic head 1201-2. Therefore, the magnetic head 1201-1 records the first channel, while the magnetic head 1201-2 records the second channel.

Thus within one field period, the data of one field of both channels can be recorded simultaneously. Also during recording, by separating rows of data for individual channels, it is possible to reproduce both channels.

As mentioned above, according to this embodiment, by rotating the rotary drum 1202 at a speed two or more higher than conventional, recording/reproducing of information of two channels is possible by a pair of magnetic heads 1201-1, 1201-2 angularly spaced from each other by 180°. Further, since the encoder 1252 and the modulator 1253 can be composed only elements of one channel, only a few modifications are necessary to manufacture from the starting one-channel magnetic recording and reproducing apparatus, thus realizing a two-channel magnetic recording and reproducing apparatus inexpensively.

In this embodiment, the first channel is recorded by the magnetic head 1201-1, and the second channel is recorded by the magnetic head 1202-2. Alternatively, the data of one field of the first channel may be recorded during the first rotation of the rotary drum 1202, and the data of one field of the second channel may be recorded during the second rotation of the rotary drum 1202.

Further, in this embodiment, one cycle of information is defined as one frame, and one cycle of information is recorded on two tracks. Alternatively, one cycle of information may be one field, or one field plus an integral number of frames. The number of tracks on and from which one cycle of information is to be recorded and reproduced should not be limited to any specific number. Assuming that 2N or more tracks are scanned during the period of one cycle scanning of the first information and that the first information and the second information are recorded/reproduced simultaneously, it is possible to record/reproduce two video signals simultaneously in two channels, without adding any magnetic head and increasing the size of the circuit. Accordingly a two-channel magnetic recording and reproducing apparatus can be achieved with low cost.

(6) Sixth Embodiment

Figure 21:
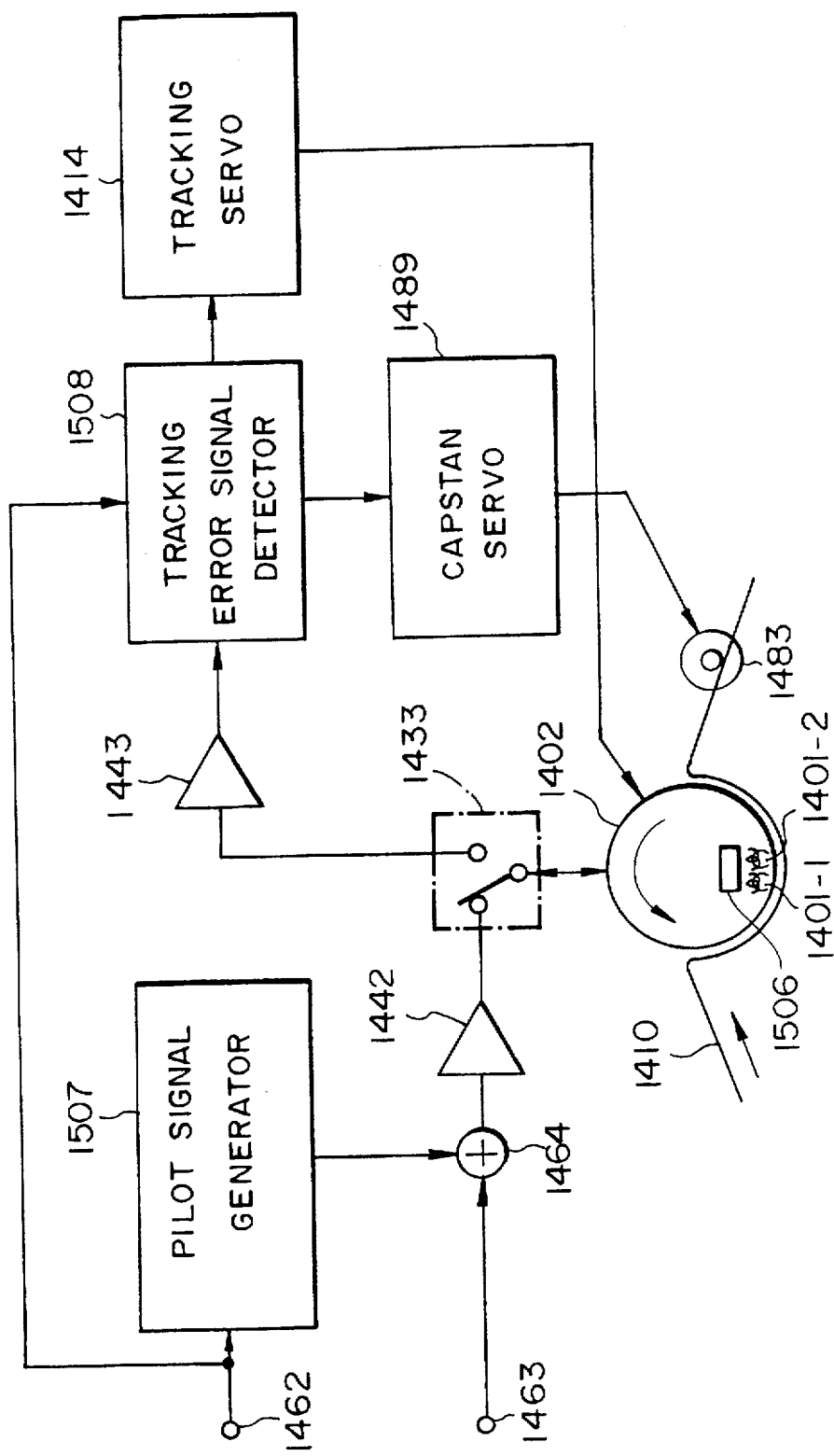
FIG. 21 is a block diagram showing a magnetic recording and reproducing apparatus according to a sixth embodiment.
Figure 22:
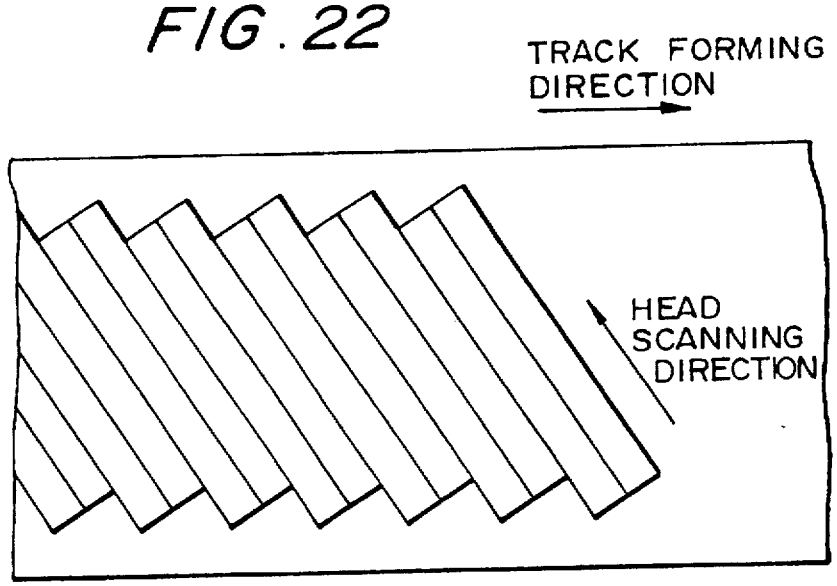
FIG. 22 is a diagram showing a track pattern on the magnetic tape during ordinary recording in the sixth embodiment.

FIG. 21 shows a digital recording and reproducing apparatus according to a sixth embodiment.

As shown in FIG. 21, the apparatus comprises a servo pilot signal generating circuit 1507, a recording/reproducing changeover switch 1433, two-channel magnetic heads 1401-1, 1401-2 having different azimuthal angles, and a tracking actuator 1506 for moving the magnetic heads 1401-1, 1401-2 perpendicularly to a sloping track.

The mode of operation will now be described with reference to FIGS. 22 through 25.

Figure 25:
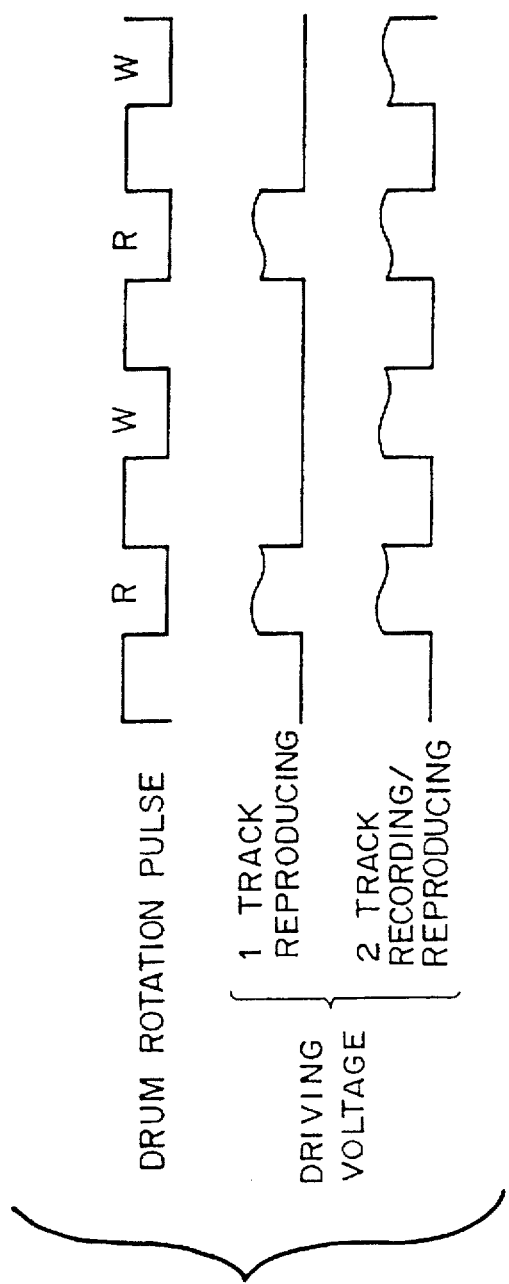
FIG. 25 is a timing diagram of servo signals in the sixth embodiment.

Assume that one cycle period defines one frame of image (about 1/30 second according to NTSC method) and that the data are to be recorded on two tracks. The video.audio signal inputted from an input terminal 1463, with using as a trigger a drum rotation pulse (here 60 Hz) of FIG. 25 inputted from an input terminal 1462, causes a pilot signal generating circuit 1507 to generate, for example, a 4-cycle pilot signal. In FIG. 25, W designates a recording period, and the magnetic heads 1401-1, 1401-2 are two-channel heads as described below so that F1, F2 and F3, F4 are alternately generated for every W.

After having been superposed with the video.audio signal by an adding circuit 1464, this pilot signal passes a recording amplifier 1442, a changeover switch 1433 and a rotary transformer (not shown) and is then recorded by the magnetic heads 1401-1, 1401-2.

Figure 23:
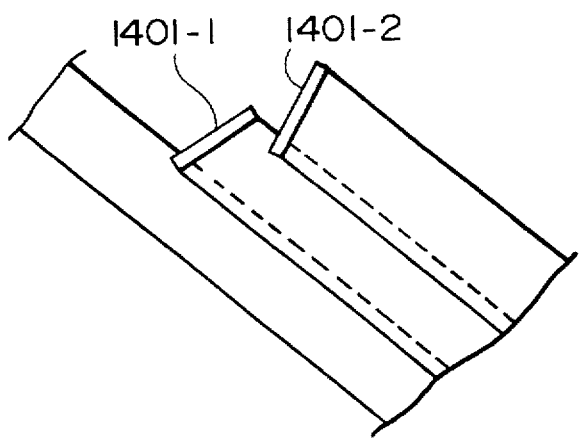
FIG. 23 is a diagram showing the arrangement and posture of the magnetic heads during recording on the magnetic tape in the sixth embodiment.
Figure 24:
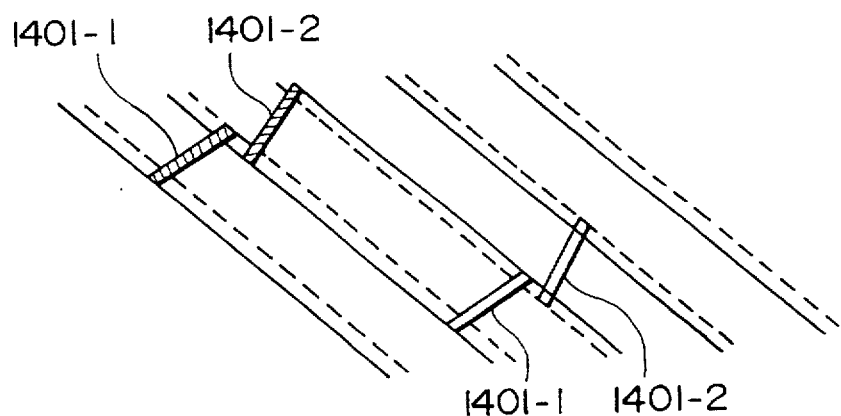
FIG. 24 is a diagram showing the recording and reproducing during insert editing in the sixth embodiment.

The magnetic heads of FIG. 21 are two-channel heads adjustably movable by the tracking actuator 1506. During ordinary recording, the tracking actuator 1506 is fixed in position. Thus the tracks are recorded in a pattern such as shown in FIGS. 23 and 24. FIG. 23 is a diagram showing such track pattern, and FIG. 24 shows the tracks being recorded.

As shown in FIG. 24, the two magnetic heads 1401-1, 1401-2 are different in azimuth angle from each other and have a slightly larger width than the track width.

The thus recorded magnetic tape is insert edited in the following manner.

Figure 55:
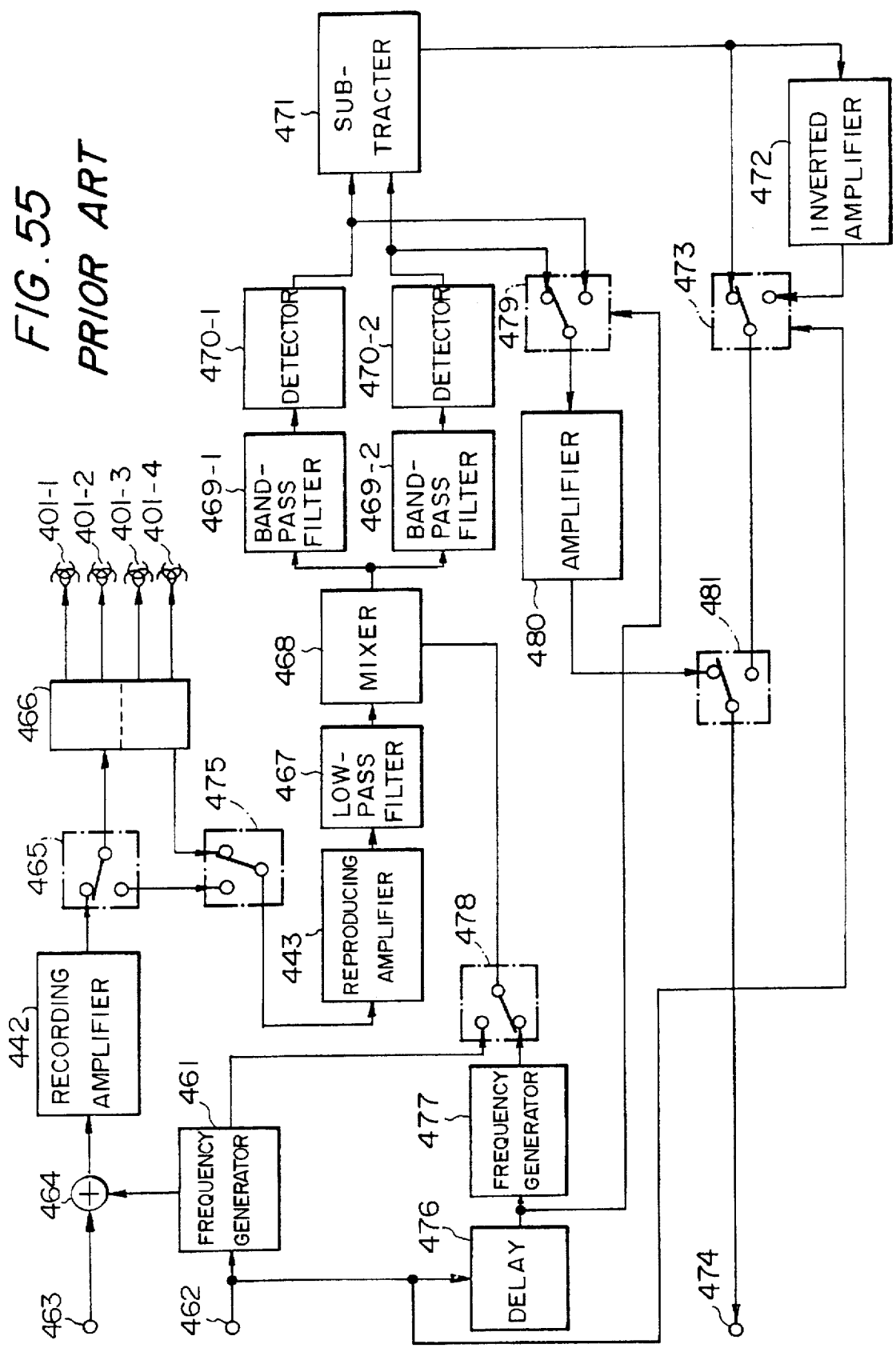
FIG. 55 is a block diagram showing a magnetic recording and reproducing apparatus according to a fourth prior art.
Figure 56:
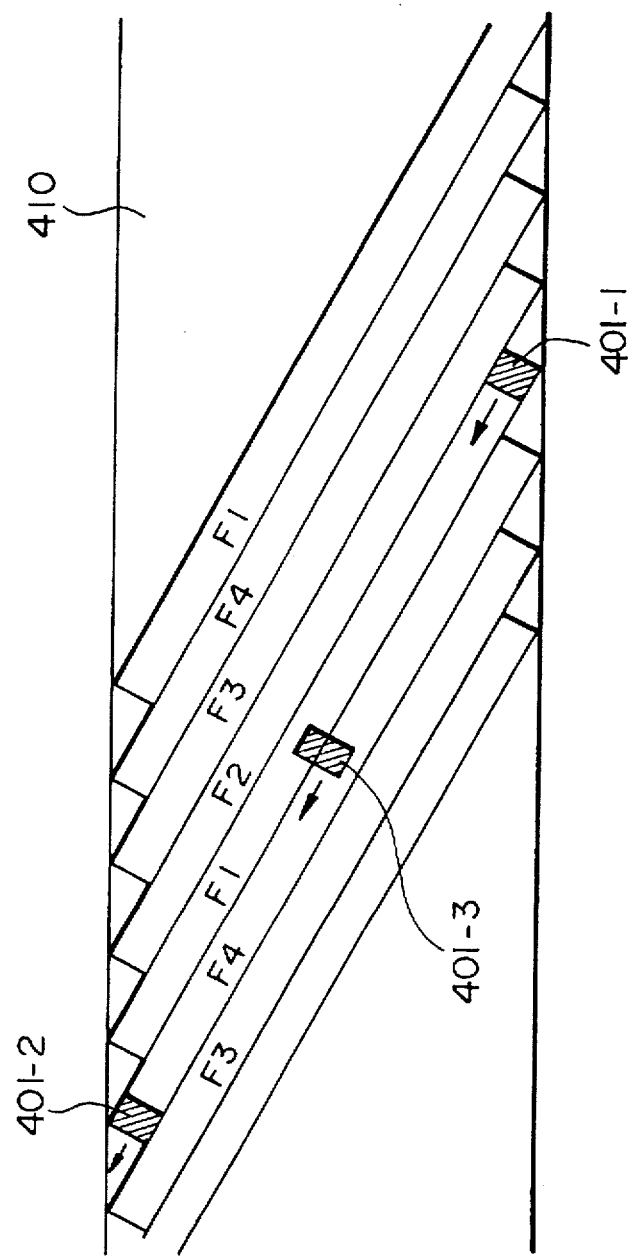
FIG. 56 is a diagram showing a track pattern on the magnetic tape and the movement of the magnetic heads in the fourth prior art.
Figure 57:
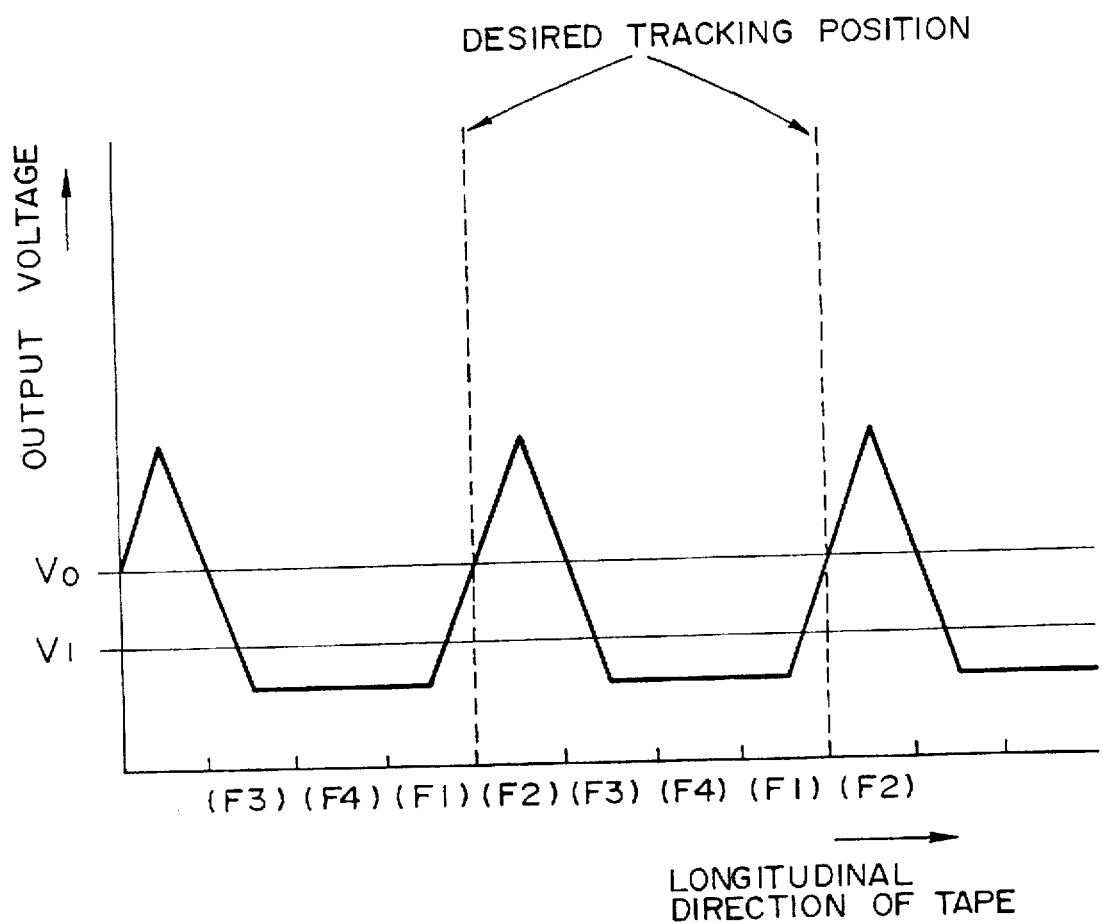
FIG. 57 is a diagram showing a waveform of the output voltage from the output terminal when the output of a circulating frequency generator is fixed to $f_1$.
Figure 58:
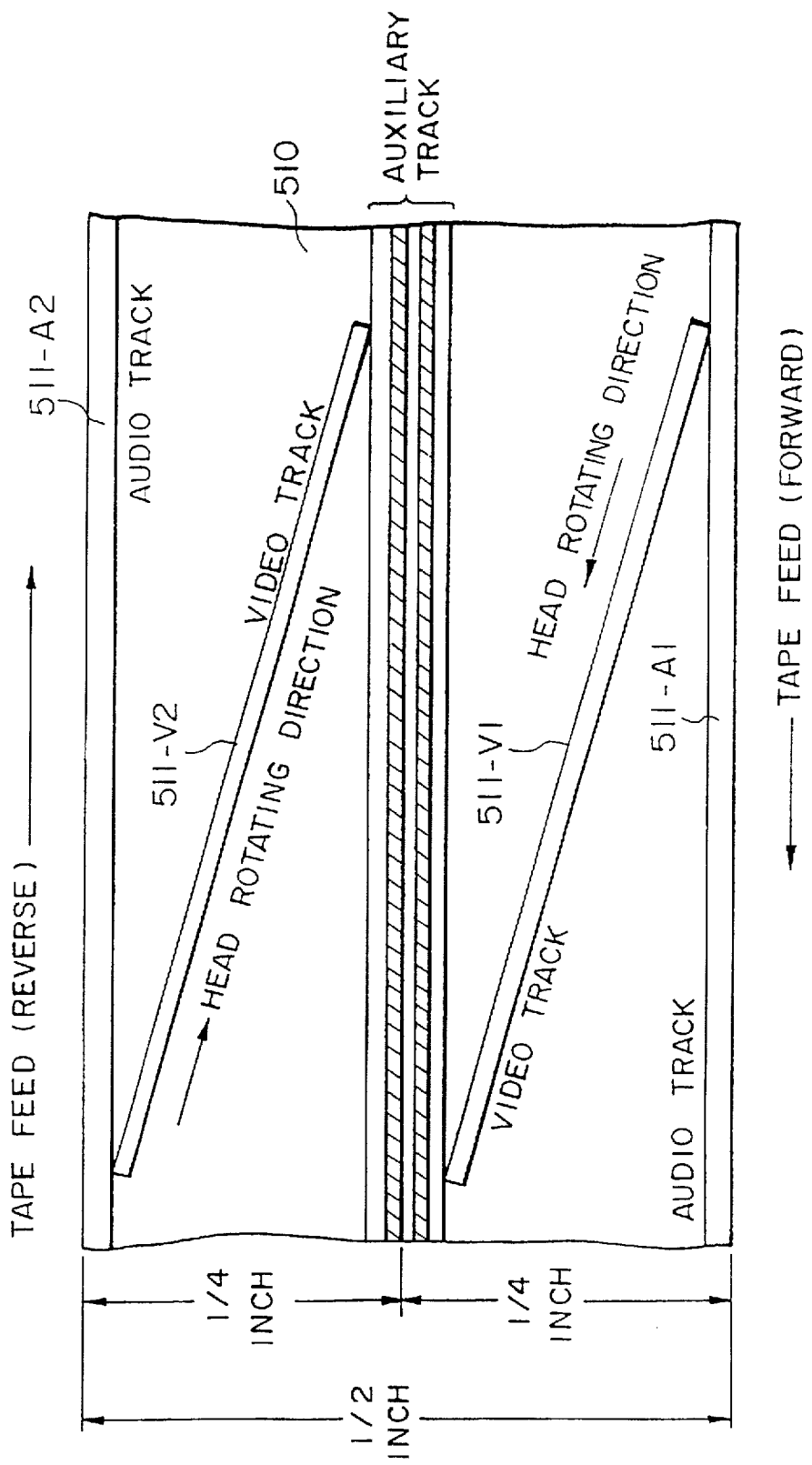
FIG. 58 is a diagram showing a track pattern on the magnetic tape in a magnetic recording and reproducing apparatus according to a fifth prior art.

First, the rotary drum makes two rotations during one cycle (here one frame). Specifically, assume that the drum rotation pulse of FIG. 25 is 60 Hz and that at least one track is reproduced during the first rotation. Here reproducing servo is provided by using the reproducing signal of the magnetic head 1401-2, which is inputted to a tracking error signal detecting circuit 1508 via the changeover switch 1433 and the reproducing amplifier 1443. The tracking error signal can be obtained in the prior technique of FIG. 55; a capstan servo circuit 1489 controls a capstan motor 1462 to thereby control the feed speed of the magnetic tape. Meanwhile, a signal such as shown in FIG. 25 is issued from the tracking servo circuit 1414 to drive a tracking actuator 1710 via a slip ring (not shown) so that the magnetic head follows a track curve.

During the second rotation, recording is performed on two tracks in the following manner. Since the tape feed is performed during the reproducing mode and hence is constant. If a driving voltage generated one rotation ago in the tracking servo circuit 1414 is generated again and recorded, a track pattern is successive and uniform, having a track curve similar to the reproducing track.

The magnetic heads in recording and reproducing and a track pattern are shown in FIG. 24. Since operation goes in the reproducing mode until it enters insert editing, the pattern in which data are recorded by the magnetic head 1401-1 will be reproduced by the magnetic head 1401-2. In this case, since the two magnetic heads have different azimuthal angles and the pilot signal is a low frequency signal, adequate signal level can be achieved.

In the insert portions, recording is performed by the magnetic heads 1401-1, 1401-2, which are represented by hatching, during the second rotation of the preceding cycle as shown in FIG. 24, and reproducing is performed during the first rotation of the next cycle. In this case, although the recording pattern of the magnetic head 1401-1 has a slightly small width in the area to be reproduced by the magnetic head 1401-2, there would be no adverse influence as the pilot signal has a low frequency. Further, a headside (1401-2) part of the signal reproduced by the magnetic head 1401-2 reproduces the recording pattern after insert editing, but, a pattern before insert editing is reproduced from the side opposite to the magnetic head 1401-1. With magnetic heads of three or more channels, it is possible to reproduce a pattern completely before insert editing.

In this embodiment, (2 channels X 1) magnetic heads are used. Alternatively the number of channels and magnetic heads may be any other than 2.

Further, in this embodiment, N tracks are scanned two times during one cycle. The number of scanning actions to be repeated may be 2 or more; one of them may be assigned for recording.

In addition, the magnetic heads used in this embodiment are movable. The magnetic heads may be fixed.

In general, partly since a signal of at least one track is reproduced during one cycle and a signal of N tracks is recorded during one cycle, it is possible to perform insert editing such that a track pattern is successive and uniform.

(7) Seventh Embodiment

Figure 26:
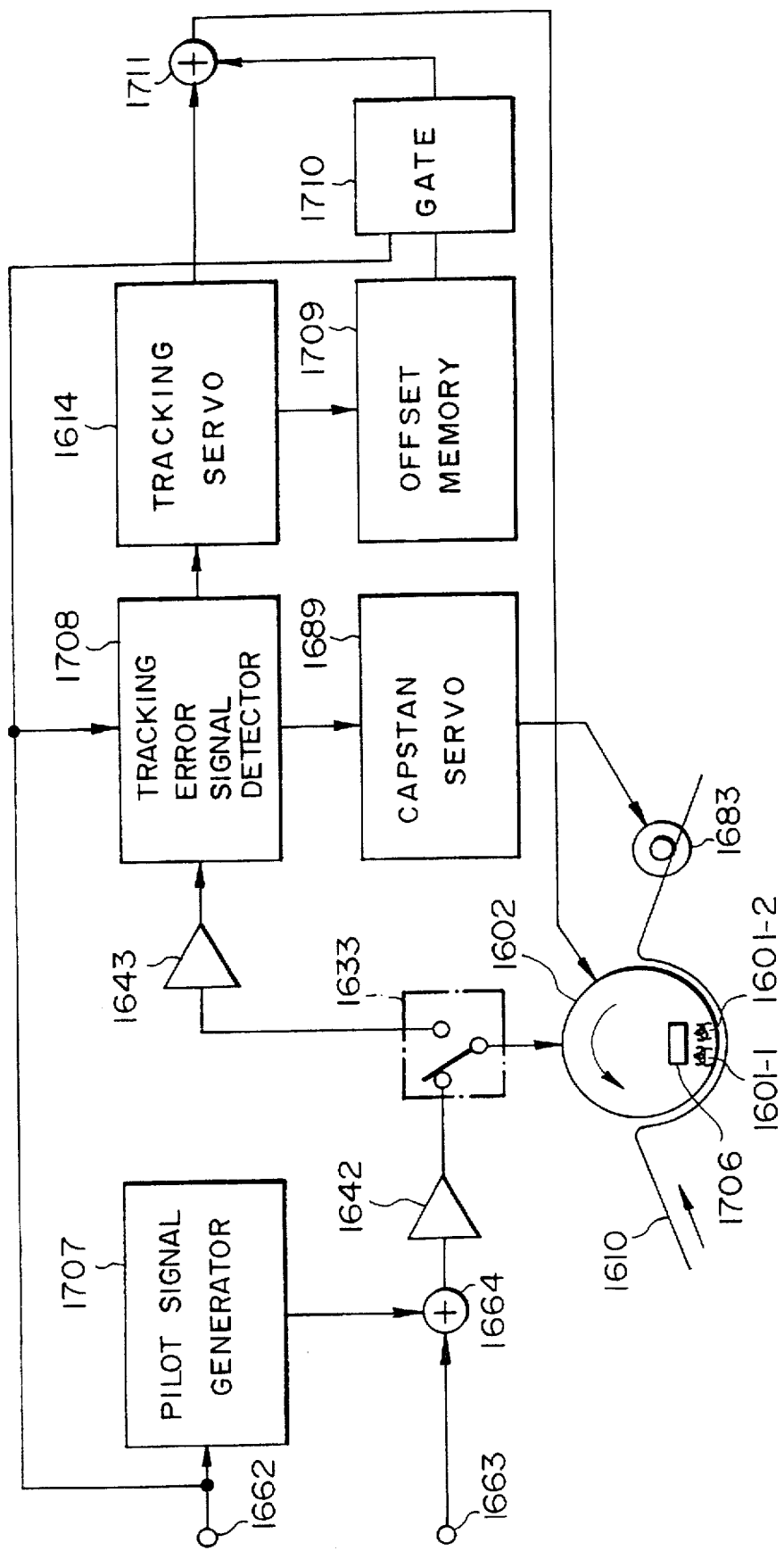
FIG. 26 is a block diagram showing a magnetic recording and reproducing according to a seventh embodiment.

FIG. 26 shows a magnetic recording and reproducing apparatus according to a seventh embodiment, which is similar to the sixth embodiment but additionally includes an offset memory circuit 1709, a gate circuit 1710 and an adding circuit 1711.

Figure 27:
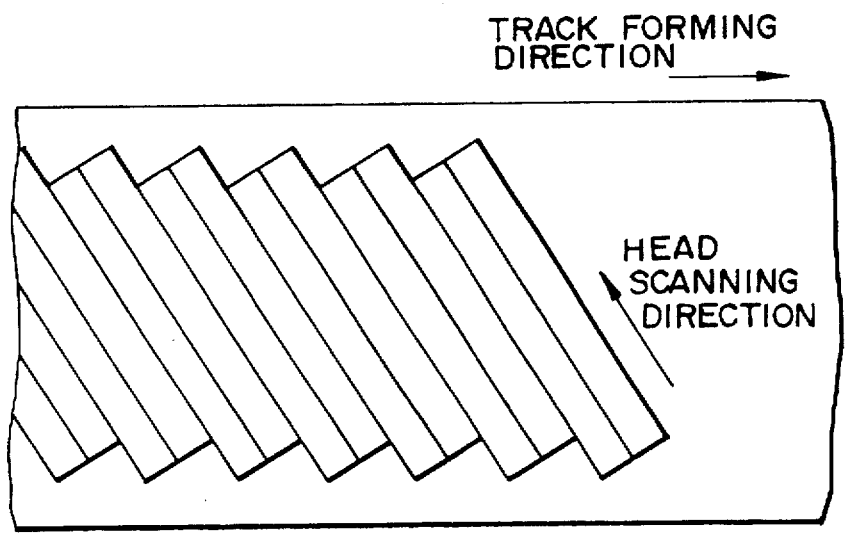
FIG. 27 is a diagram showing a track pattern on the magnetic tape during ordinary recording in the seventh embodiment.
Figure 28:
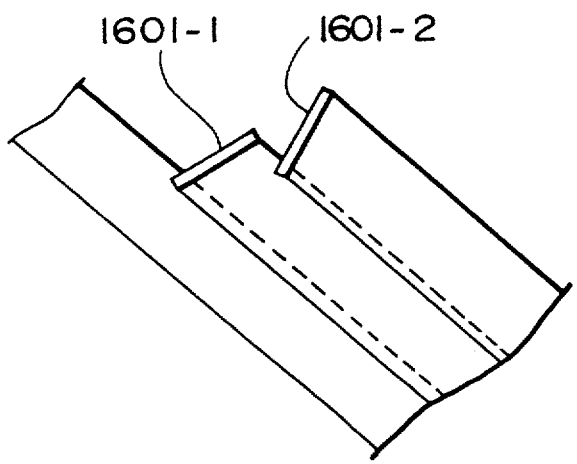
FIG. 28 is a diagram showing the arrangement and posture of the magnetic heads during recording on the magnetic tape in the seventh embodiment.
Figure 29:
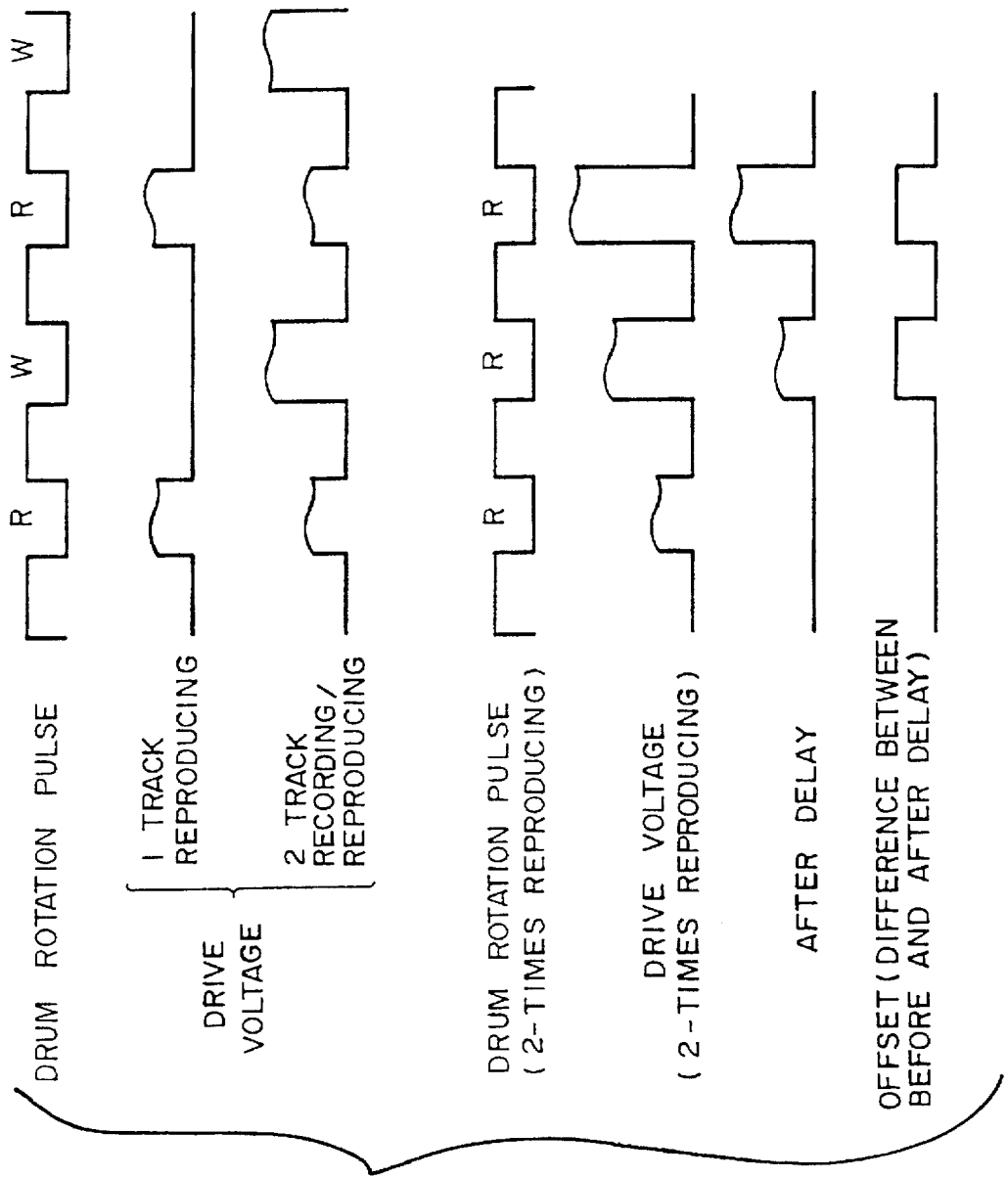
FIG. 29 is a timing diagram of servo signals in the seventh embodiment.

The mode of operation of this embodiment will now be described with reference to FIGS. 27 through 29.

A significant feature of this embodiment resides in the movement of the second rotation of a rotary drum 1602. Specifically, during the second rotation, recording is performed on the same track as the first rotation in the following manner. Tape feed is performed during the reproducing mode and hence is constant. The tracking servo circuit 1614 generates a driving voltage, which was generated one rotation ago, again. Further, a driving voltage corresponding to the amount of movement of the magnetic head during one rotation, namely, to the width of one track is outputted from the offset memory circuit 1709. The gate circuit 1710 opens during the period equal to W of FIG. 29, and a driving voltage outputted from the tracking servo circuit 1614 and a drive voltage outputted from the gate circuit 1710 are summed in the adding circuit 1711. As a result, a resulting driving voltage (two-track recording and reproducing) such as of FIG. 29 is applied to a tracking actuator 1706 via a slip ring (not shown), thus performing recording.

The driving voltage to be outputted from the offset memory circuit 1709 can be obtained in the following manner. In ordinary reproducing mode, the same track is reproduced two or more times. Assuming that with the above W section defined as R section like the drum rotation pulse of "twice reproducing" of FIG. 29, the same track is reproduced during the movement of the magnetic head for ordinary reproducing, a voltage ("twice reproducing") driving the tracking actuator 1706 can be obtained, right under the drum rotation pulse, as progressively increasing. When this voltage is delayed by a time equivalent to one rotation of the rotary drum 1602 to subtract a signal after delay from a signal before delay, an offset equivalent to the feed of one rotation can be obtained. Therefore, by summing the offset and the driving voltage one rotation ago, a driving voltage to be outputted from the offset memory circuit 1709 can be obtained. As a result, it is possible to accurately scan a track reproduced one rotation ago, enabling insert editing.

(8) Eighth Embodiment

Figure 30:
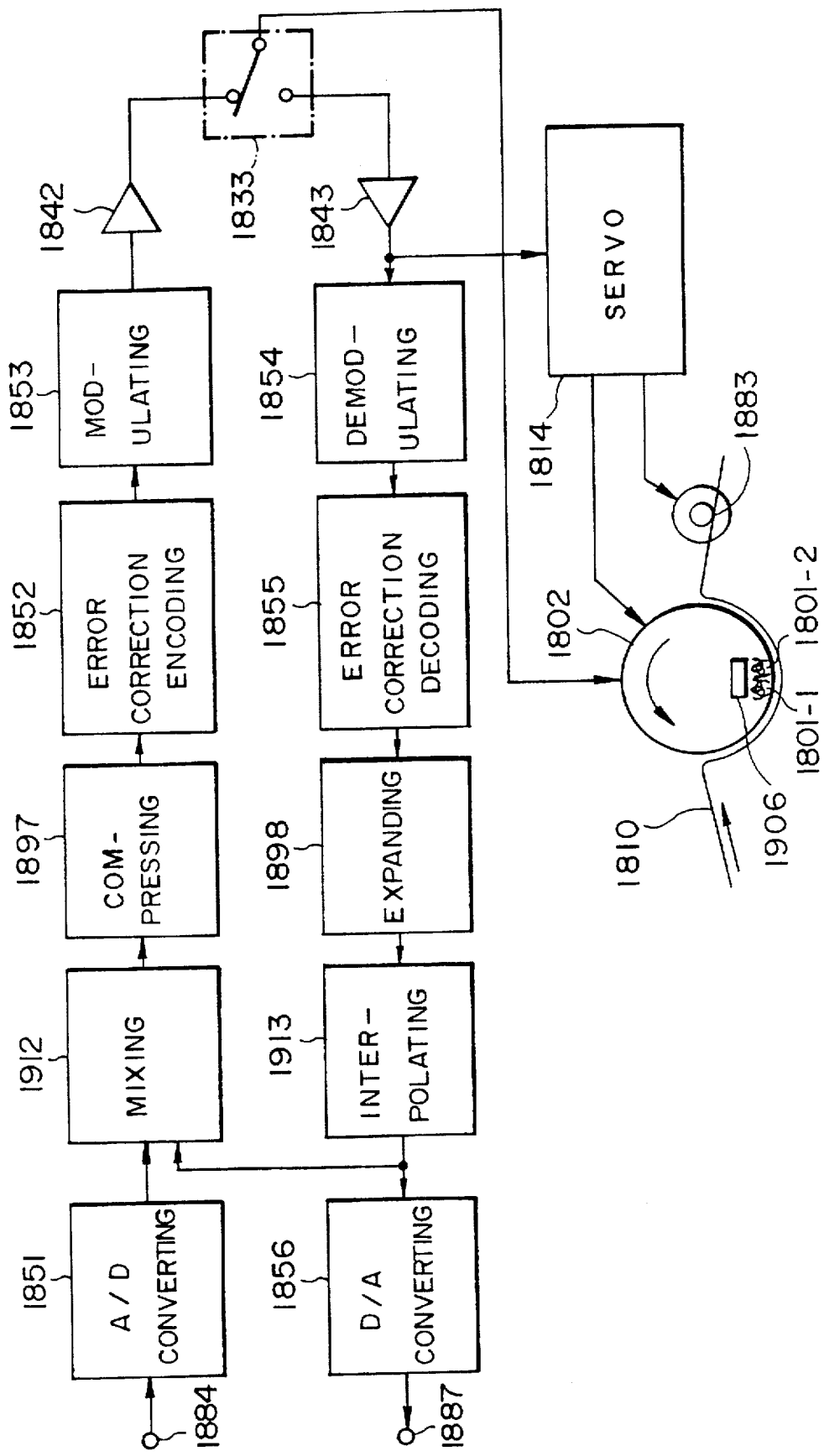
FIG. 30 is a block diagram showing a magnetic recording and reproducing apparatus according to an eighth embodiment.

FIG. 30 shows a digital recording and reproducing apparatus according to an eighth embodiment, which enables punch-in/out editing. The recording system of this embodiment comprises an input terminal 1884 for video.audio signals, an A/D converting circuit 1851, a mixing circuit 1912 for mixing a recording signal with an input signal, a compressing circuit 1897 for removing an unnecessary part of a video or audio signal and for performing high-efficiency encoding, an error correction encoding circuit 1852 for performing interleaving and error correction encoding, and a digital modulating circuit 1853. The reproducing system comprises a digital demodulating circuit 1854, and an error correction decoding circuit 1855 for performing error correction and deinterleaving. A time expanding circuit 1898 reproduces original digital video.audio data by a process reverse to the compressing circuit 1897. The data in which the error cannot be corrected are interpolated by an interpolating circuit 1913. The D/A converting circuit 1887 converts data into an analog signal and outputs the latter to an output terminal 1887. Designated by 1814 is a servo circuit having the same construction as that of FIG. 26.

Punch-in/out editing is to rewrite a track of a reproduced signal by mixing the reproduced signal with an input signal, which timing will now be described with reference to FIG. 31.

Figure 31:
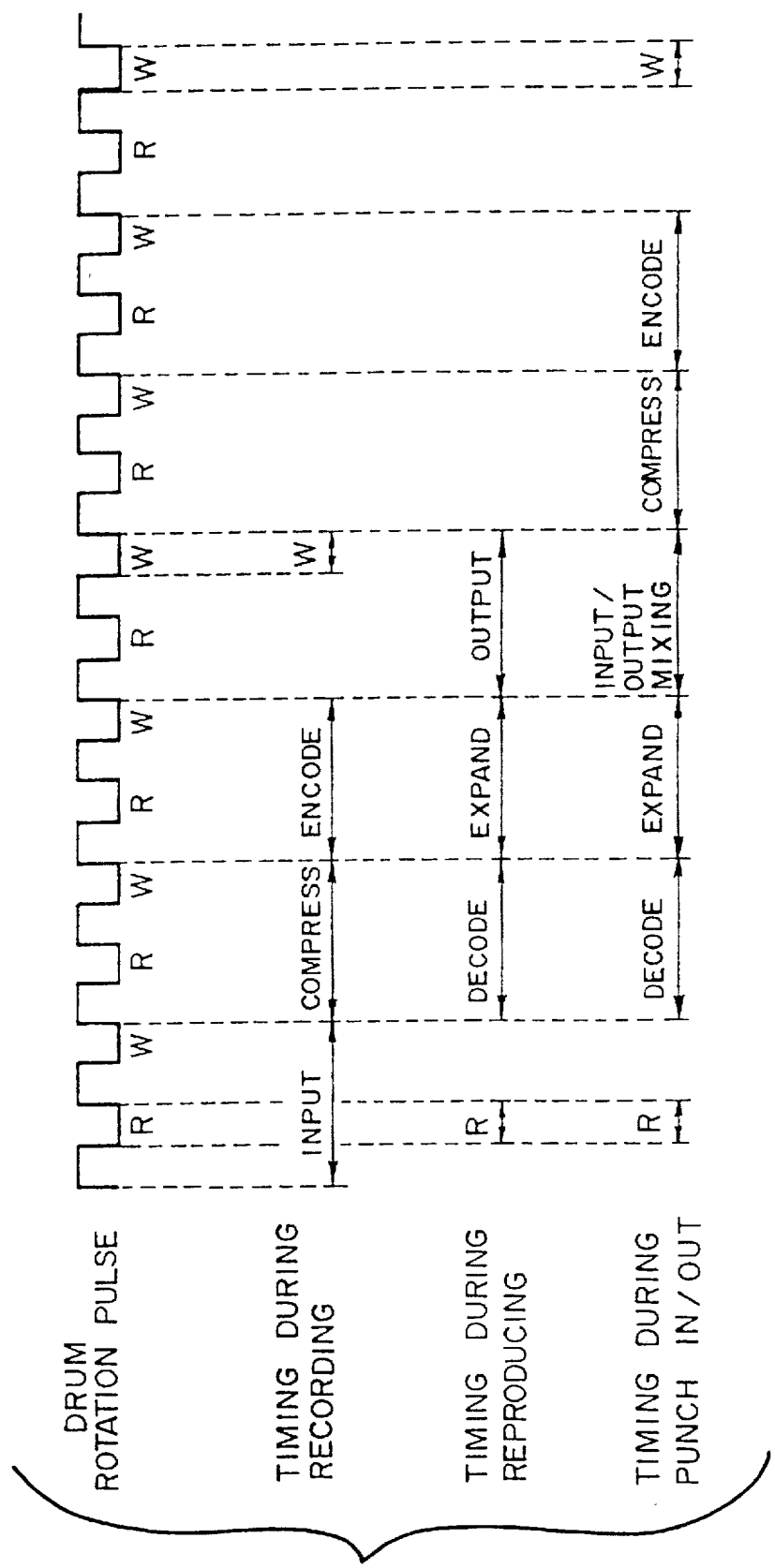
FIG. 31 is a timing diagram showing punch-in/out editing in the eighth embodiment.

FIG. 31 shows, from top toward bottom, a drum rotation pulse (60 Hz), a timing during recording, a timing during reproducing, and a timing during punching-in/out. During recording, an input signal of one frame is compressed, encoded and recorded in a section. During reproducing, the signal reproduced in a section R is decoded and expanded into an output signal of one frame. During punching-in/out, reproducing and recording processes are performed continuously. An output signal and an input signal are mixed with each other into identical timings. In punching-in/out, recording is performed at the seventh frame after being reproduced.

Therefore, in an offset memory circuit of the servo circuit 1814, seven frames, namely, a tracking actuator driving voltage equivalent to the total width of 14 tracks are stored. And from a tracking servo circuit, a tracking error voltage which is seven frames preceding is outputted. A tracking actuator driving voltage equivalent to the total width of 14 tracks can be obtained by repeating the reproducing of the same track.

In this embodiment, (2 channels X 1) magnetic heads are used. The number of channels magnetic head should by no means be limited to this specific example. Also this invention can cope with an alternative case in which a pair of magnetic heads are diametrically opposite to each other. Further, the number of magnetic heads is optional.

Additionally, in this embodiment, N tracks are scanned two times in one cycle. The number of repetition of scanning may be at least two; one of them may be allocated to recording.

According to this embodiment, as mentioned above, since a signal of N tracks is recorded and reproduced during one cycle, insert editing and punch-in/out editing such that a track pattern will be continuous and uniform can be achieved.

(9) Ninth Embodiment

Figure 32:
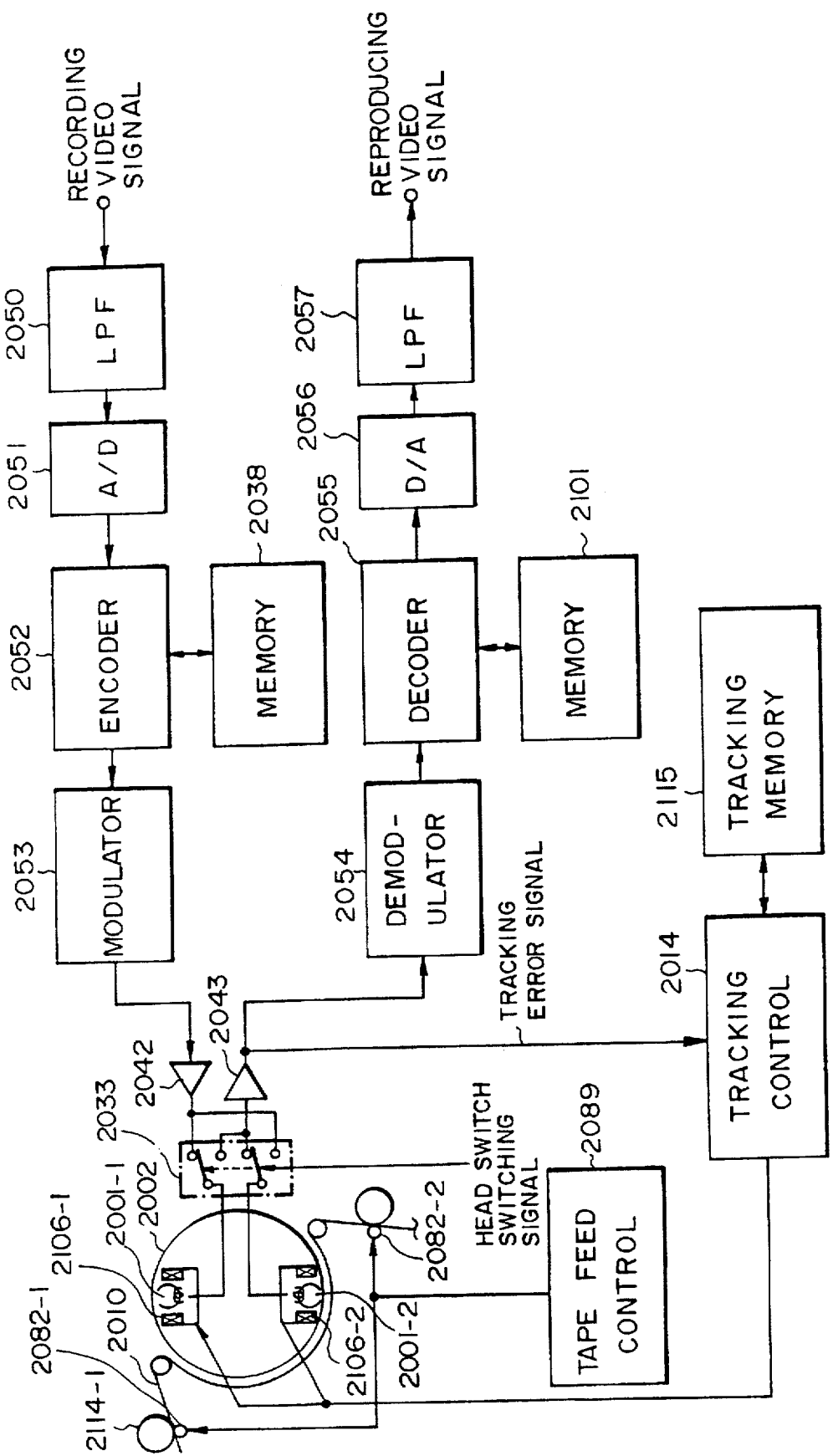
FIG. 32 is a block diagram showing a magnetic recording and reproducing apparatus according to a ninth embodiment.

FIG. 32 shows a digital recording and reproducing apparatus according to a ninth embodiment.

In FIG. 32, 2010 designates a magnetic tape; 2001-1, a first magnetic head; and 2001-2, a second magnetic head. The rotary drum 2002 causes the first and second magnetic heads 2001-1, 2001-2 to rotate, thus enabling helical scan recording. A first magnetic head actuator 2016-1 causes the first magnetic head 2001-1 to move perpendicularly to the direction of scanning by the rotary drum 2002. A second magnetic head actuator 2016-2 causes the first magnetic head 2001-2 to move in the same manner as that by the first magnetic actuator 2016-1. FIG. 32 further shows capstans 2082-1, 2082-2 for feeding the magnetic tape 2010 at a constant speed, pinch rollers 2114-1, 2114-2, and a tape feed control circuit 2089 for controlling the feed speed of the magnetic tape 2010 by controlling the capstans 2082-1, 2082-2 and the pinch rollers 2114-1, 2114-2 and for enabling the reciprocating feed of the magnetic tape 2010. A tracking control circuit 2014 controls the position of the magnetic heads 2001-1, 2001-2, based on a tracking error signal, by controlling the magnetic head actuators 2016-1, 2016-2. A tracking memory 2115 stores one track of the amount of control from the tracking control circuit 2014 to the magnetic head actuators 2106-1, 2106-2. A head switch 2033 switches the connection between the magnetic heads and the circuits. This switching is performed in response to a head switch changeover signal.

Figure 33:
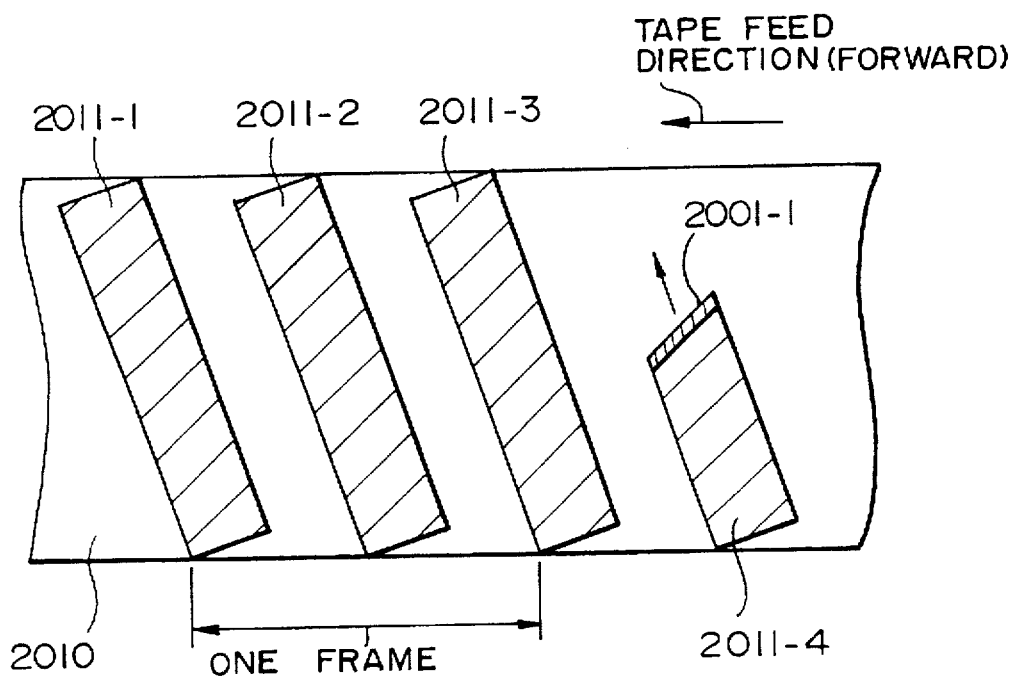
FIG. 33 is a diagram showing a track pattern on the magnetic tape when the magnetic tape is fed in the forward direction in the ninth embodiment.

FIG. 33 shows a track pattern on the magnetic tape 2010 in this embodiment. This track pattern is a recording track pattern during forward tape feed. A track 2011-1 is a forward track on which the first magnetic head 2001-1 makes forward recording during the first rotation of the rotary drum 2002, and a track 2011-2 is a forward track on which the first magnetic head 2001-1 makes forward recording during the second rotation of the rotary drum 2002. During the next rotation of the rotary drum 2002, the first magnetic head 2001-1 makes recording on the track 2011-3 and further recording on the track 2011-4 during next to the next rotation.

Figure 34:
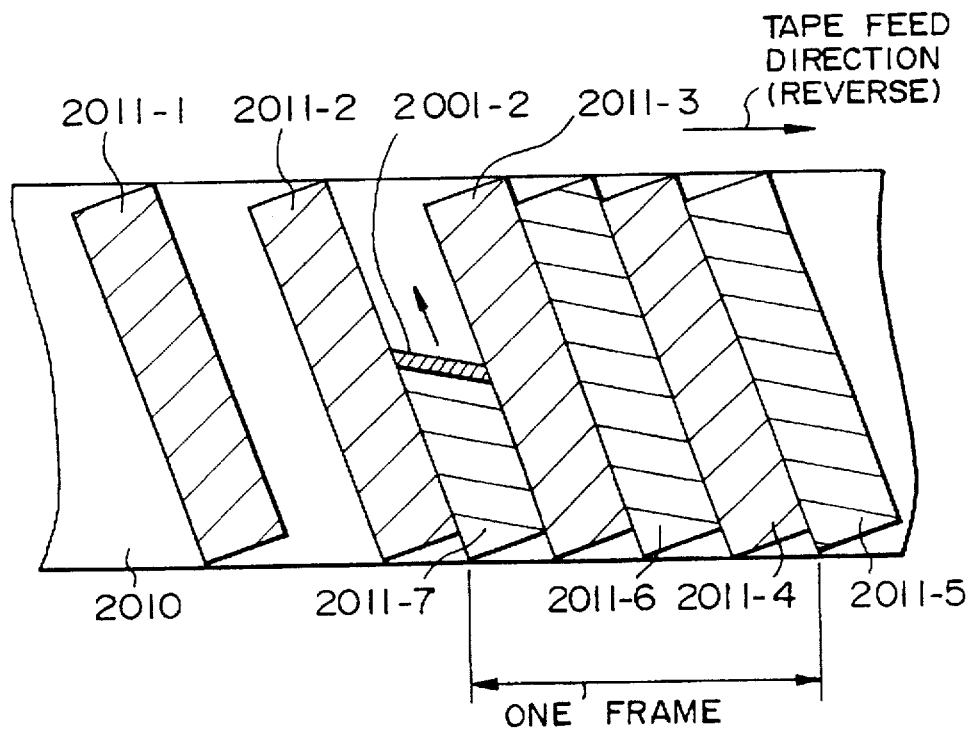
FIG. 34 is a diagram showing a track pattern on the magnetic tape when the magnetic tape is fed in the backward or reverse direction in the ninth embodiment.

FIG. 34 shows a recording track pattern during reverse or backward tape feed. During the first rotation of the rotary drum 2002, the second magnetic head 2001-2 makes recording on a reverse or backward track 2011-5. During the second rotation of the rotary drum 2002, the second magnetic head 2001-2 makes recording on a reverse or backward track 2011-6. Further, at the time point of FIG. 34, a track 2011-7 is being formed recorded by the second magnetic head 2001-2. In FIG. 34, inclined lines in the track pattern indicate the azimuthal angle of the magnetic heads 2001-1, 2001-2.

Figure 35:
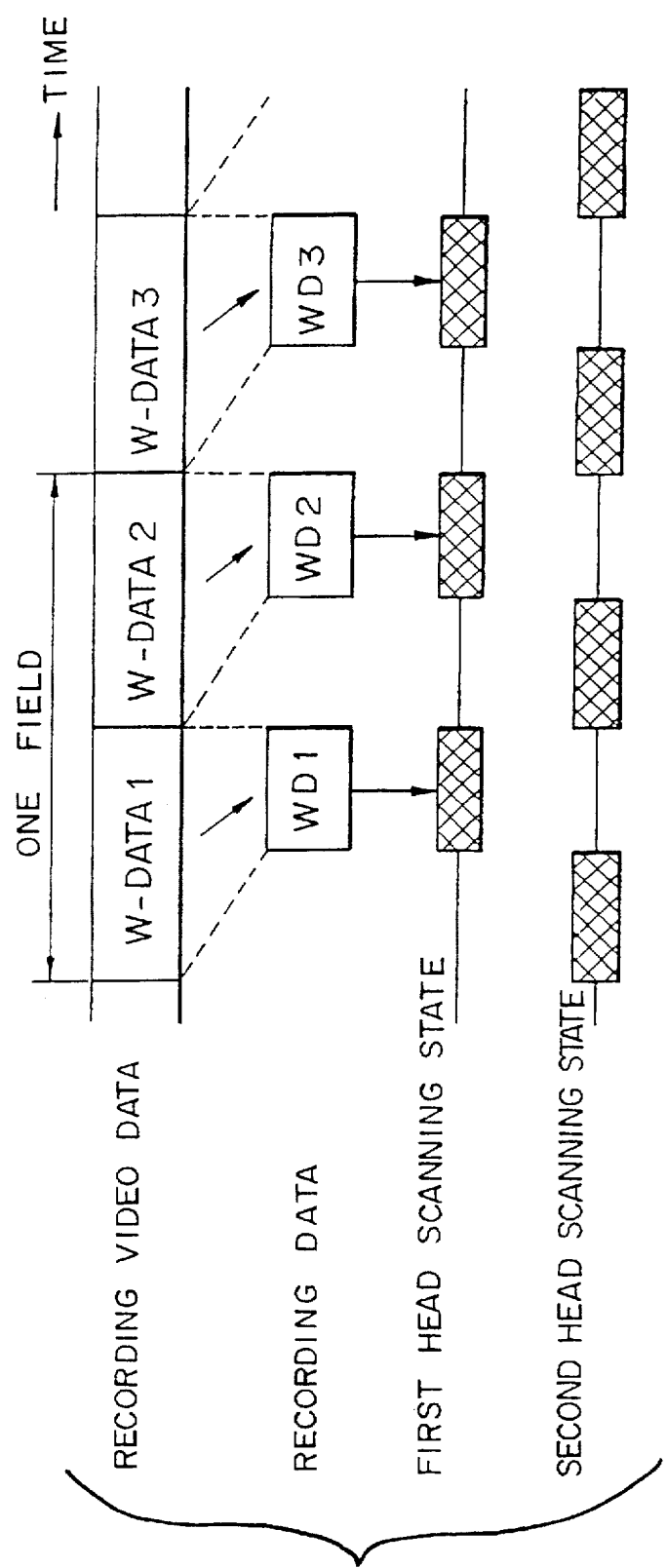
FIG. 35 is a diagram showing data to be recorded and the movement of the magnetic heads when the magnetic tape is fed in the forward direction in the ninth embodiment.
Figure 36:
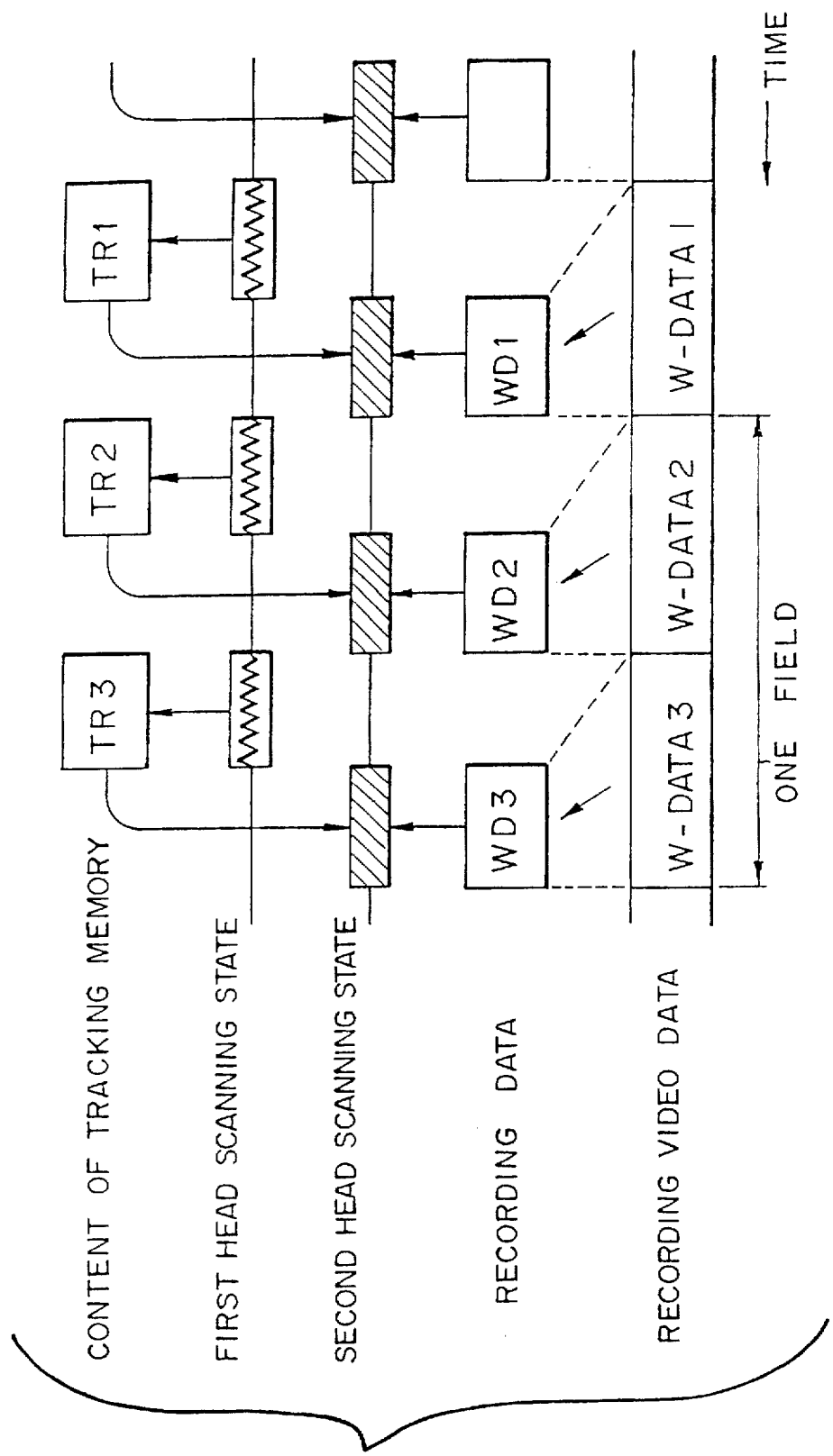
FIG. 36 is a diagram showing data to be recorded and the movement of the magnetic heads when the magnetic tape is fed in the backward or reverse direction in the ninth embodiment.

FIG. 35 shows data to be recorded and the movement of the magnetic heads when the magnetic tape is fed in the forward direction, and FIG. 36 shows data to be recorded and the movement of the magnetic heads when the magnetic tape is fed in the backward or reverse direction.

Also shown in FIGS. 35 and 36 are recording video data, recording data obtained as the result of time axis compression and modulation by encoding the recording video data, the scanning manner of the first magnetic head 2001-1, and the scanning manner of the second magnetic head 2001-2. FIG. 36 further shows the content of the tracking memory 2115. Each of the frame portions on a line indicating the scanning of the head represents a magnetic head tracing period. Of various patterns in the individual frames, a checker pattern represents the magnetic head fixing state; a hatched pattern, the control amount applying state; and a zigzag pattern, the tracking state.

Figure 37:
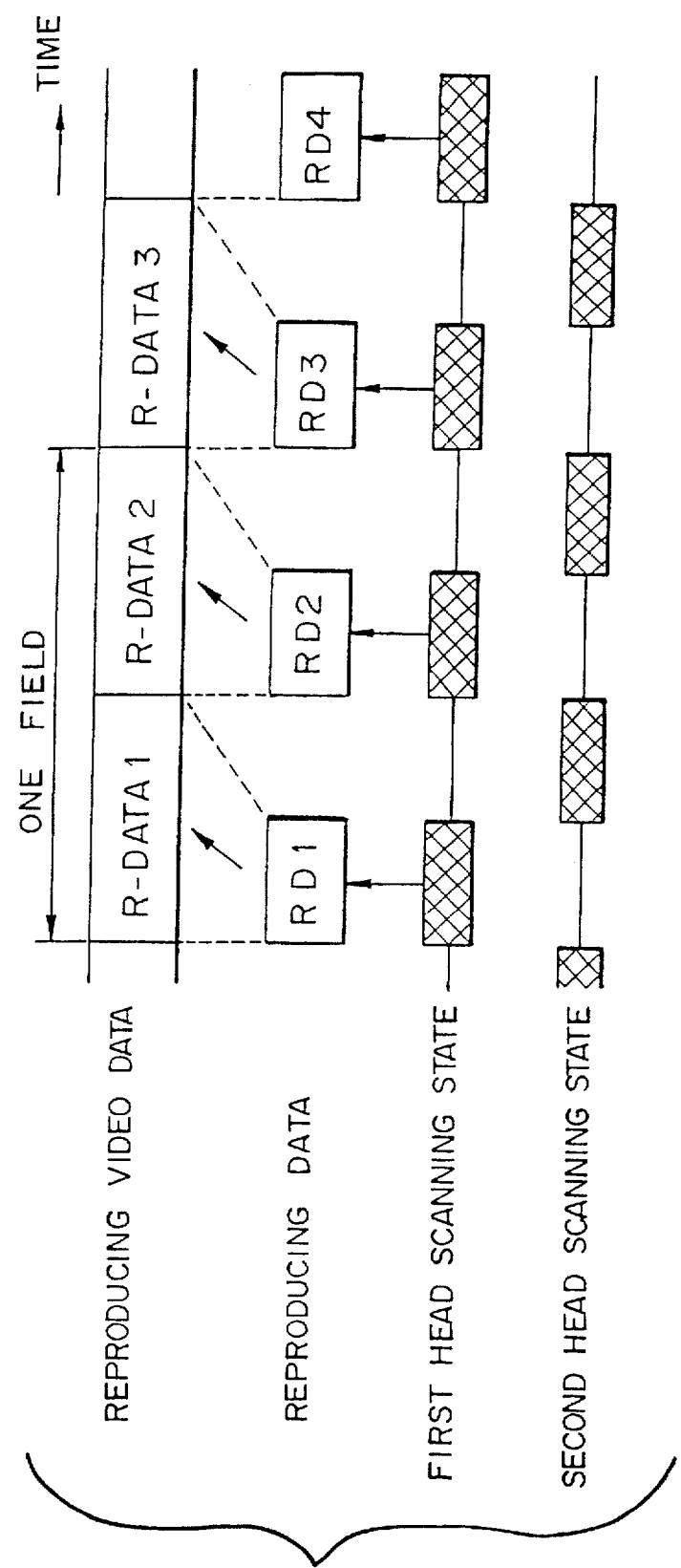
FIG. 37 is a diagram showing data to be reproduced and the movement of the magnetic heads when the magnetic tape is fed in the forward direction in the ninth embodiment.
Figure 38:
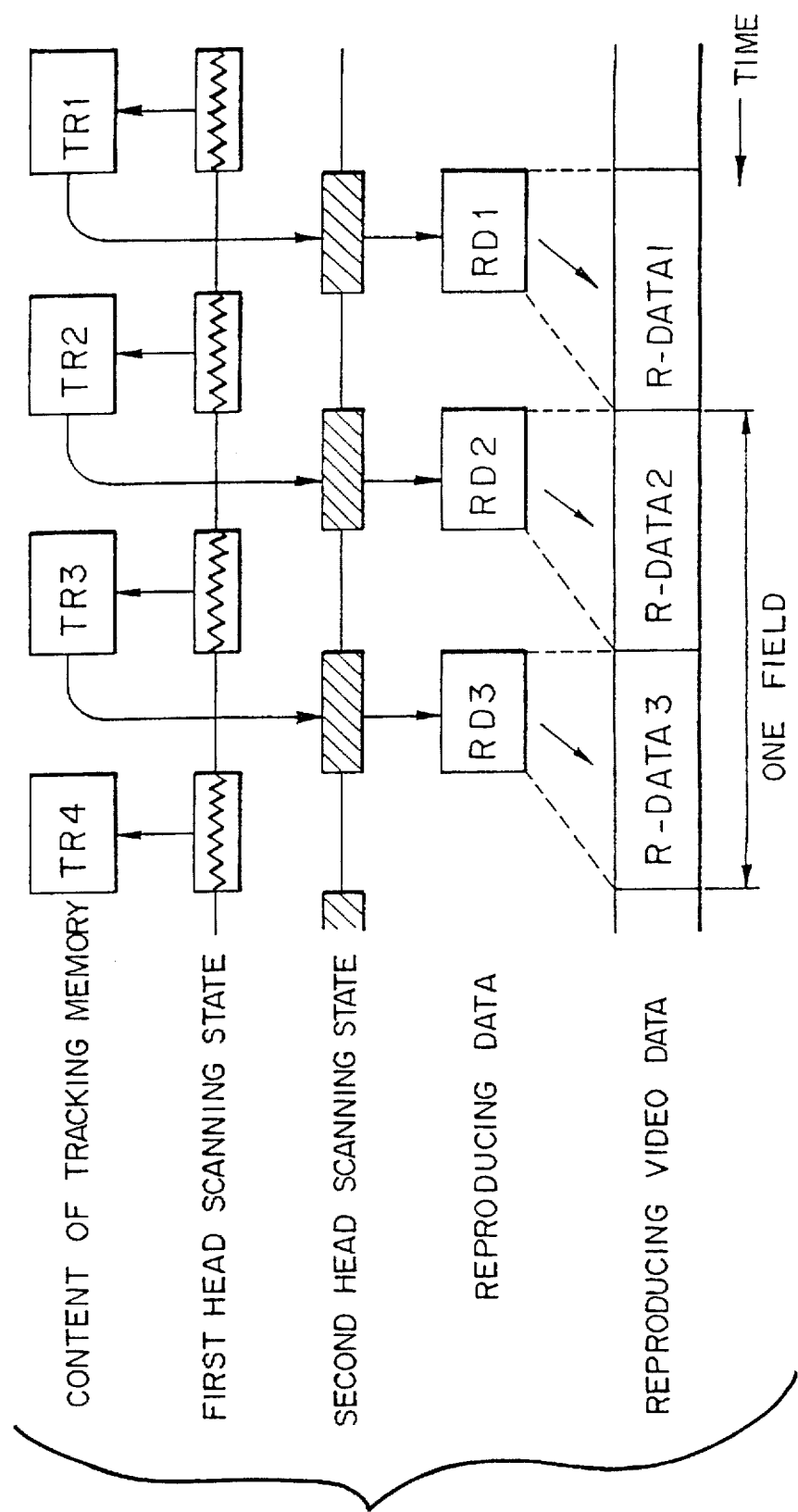
FIG. 38 is a diagram showing data to be reproduced and the movement of the magnetic heads when the magnetic tape is fed in the backward or reverse direction in the ninth embodiment.

FIG. 37 shows data to be reproduced and the movement of the magnetic heads when the magnetic tape is fed in the forward direction. FIG. 38 shows data to be reproduced and the movement of the magnetic heads when the magnetic tape is fed in the backward or reverse direction. In FIGS. 37 and 38, recording video data and recording data are substituted by reproducing video data and reproducing data which are reproduced prior to demodulation, decoding and time-axis expansion.

In operation, the rotary drum 2002, unlike a rotary drum in a magnetic recording and reproducing apparatus in which the VHS method is used, is driven to rotate in the following manner. Specifically, in the VHS method, during the period corresponding to one frame (one cycle of scanning of information) of a recording video signal, the rotary drum makes one rotation. During this one rotation, two tracks are recorded on the magnetic tape. In this embodiment, by doubling the number of rotations of the rotary drum 2002, the rotary drum 2002 makes two rotations during the period corresponding to one frame, and the first and second magnetic heads 2001-1, 2001-2 trace two tracks twice (i.e., scan four tracks in total). Further, by doubling the feed speed of the magnetic tape 2010, it is possible to obtain an adequate width of the tracks.

Here to record one field for one track, it is necessary to compress the time axis for recording. This embodiment is directed particularly to a digital VTR for digitally processing video signals and performing recording and reproducing. In the following description, explanation concerning audio signals is omitted. Practically, audio signals together with video signals are recorded and reproduced as digital data.

In the recording system, a recording video signal is first band-restricted by the LPF 2050 so that only the video signal band component is sampled by the A/D converter 2051 in a predetermined synchronism to convert analog signals into digital video data.

To the digital video data, error correction codes or such are added by the encoder 2052 so that recording/reproducing with no error can be performed. This encoding is performed by using a buffer memory 2038. In the encoder 2052, at the same time, compressing of the time axis is performed, and the time-axis-compressed data are outputted.

The digital video data are further encoded, by the modulator 2053, into optimum codes suitable for recording/reproducing on the magnetic tape 2010. The recorded and encoded data are recorded on the magnetic tape 2010 by the magnetic head 2001-1 or 2001-2 via the magnetic head amplifier 2042 and the head switch 2033.

Here, a head switch changeover signal is generated in synchronism with the rotation of the rotary drum 2002 as the rotary drum 2002 is switched at every ½ rotation by the head switch 2033.

In the reproducing system, the signals reproduced by the magnetic heads 2001-1, 200-2 are supplied, via the head switch 2033, to the reproducing amplifier 2043 for amplifying. The resulting signal is decoded, for recording, by the demodulator 2054 as reproducing digital video data. As a result, the original data before encoding by the modulator 2053 is obtained. Errors of the original data are corrected and detected by the decoder 2055. Here in decoding, a buffer memory 2101 is used. The output of the decoder 2055 is time-expanded to restore the original time axis of the data.

The reproducing digital video data are converted back into analog video signals by the D/A converter 2056 and are band-restricted by the LPF 2057. As a result, reproducing video signals are obtained.

With the foregoing digital processing, data of one field are recorded/reproduced on one track.

The reciprocating recording/reproducing method will now be described.

The magnetic tape 2010 are fed by capstans 2082-1, 2082-2 and pinch rollers 2114-1, 2114-2 disposed on opposite sides of the rotary drum 2002. The direction of feed of the magnetic tape is switched between forward and backward by a tape feed control circuit 2089. During reproducing and backward recording, the tape feed control circuit 2089 controls, by the pilot signal recorded in the track, the phase between the capstans 2082-1, 2082-2 and the rotary drum 2002 in such a manner that the magnetic heads 2001-1, 2001-2 scan near the individual track.

The recording track pattern when the magnetic tape is fed in the forward direction is such as shown in FIG. 33. Namely, in this case, recording is performed by only the first magnetic head 2001-1; during the first rotation of the rotary drum 2002, data of the first field in one frame are recorded on a forward track 2011-1. During the second rotation of the rotary drum 2002, data of the second field are recorded on a forward track 2011-2. Data are thereby recorded on the magnetic tape 2010 every other track (skipping a space where a reverse and backward track is to be formed).

Further, when the magnetic head is fed in the reverse or backward direction, recording is performed by only the second magnetic head 2001-2. During the first rotation of the rotary drum 2002, data of the first field are recorded on the backward track 2011-5. During the second rotation, data of the second field are recorded on the backward track 2011-6.

However, when the magnetic tape is fed in the backward or reverse direction, the angle of inclination of the recording track is apt to be slightly different, compared to the case in which the magnetic tape is fed in the forward direction. Therefore, for compensating this difference, a movable magnetic head must be used to record data on the backward track between the adjacent forward tracks.

To this end, in this embodiment, as shown in FIG. 32, there are provided a magnetic head actuator 2106-1 for moving the first magnetic head 2001-1 and another magnetic head actuator 2106-2 for moving the second magnetic head 2001-2.

In recording by such movable magnetic heads, for example, when the magnetic tape is fed in the forward direction, the positions of the magnetic head actuators 2106-1, 2106-2 are controlled by the tracking control circuit 2014 to fix the magnetic heads 2101-1, 2101-2 in predetermined positions, thus recording by the first magnetic head 2101-1.

This operation will now be described in greater detail with reference to FIG. 35. Firstly, recording video data W-DATA1, W-DATA2, . . . are encoded, time-compressed and modulated. The resulting data are supplied to the first magnetic head 2001-1 as recording data WP1, WD2, . . . . . The first magnetic head 2001-1 is fixed in position, and the recording data are recorded by only this first magnetic head 2001-1. Accordingly the track pattern will be intermittent as shown in FIG. 33.

Then when the magnetic tape is fed in the backward direction, as shown in FIG. 36, the scanning by the first magnetic head 2001-1 which is the preceding head is performed prior to the scanning by the second magnetic head 2001-2 which is the recording head. The object of this scanning is the preceding adjacent track recorded (i.e., forward track). At that time, the output of the first magnetic head 2001-1 is supplied to the reproducing amplifier 2043, and the tracking control circuit 2014 detects a tracking error signal from an envelope of the reproducing signal, i.e., the output of the reproducing amplifier 2043. The tracking control circuit 2014 controls the first magnetic head actuator 2106-1 to control the position of the first magnetic head 2101-1, thereby scanning the forward track by the first magnetic head 2101-1.

Here, the tracking control circuit 2014 stores in the tracking memory 2115 an amount of control of the first magnetic head actuator 2106-1 which amount is equivalent to the amount of deviation to the track inclination of one track. Then, the position of the second magnetic head 2106-2 scanning on the magnetic tape 2010 is controlled, by the second magnetic head actuator 2016-2, so as to follow the forward track 2011-1 or the forward track 2011-2, depending on the amount of control that is read from the tracking memory 2115 by the tracking control circuit 2014.

FIG. 36 shows the flow of forward recording. In FIG. 36, data are recorded by the second magnetic head 2001-2. At that time, the first magnetic head 2001-1 which is the preceding head makes tracking, and the tracking control circuit 2014 reads the amount of control TR1, TR2, . . . to store it in the tracking memory 2115. Thus the amount of control stored in the tracking memory 2115 is used for controlling the second magnetic head actuator 2106-2 in recording the recording data on the magnetic tape 2010.

Reproducing is performed in the same method. First when the magnetic tape is fed in the forward direction, as shown in FIG. 37, the positions of the magnetic head actuator 2106-1, 2106-2 are controlled to fix the magnetic heads 2001-1, 2001-2 at respective predetermined positions. In addition, data on the forward track are reproduced by only the first magnetic head 2001-1. The reproduced data RD1, RD2, . . . reproduced by the first magnetic head 2001-1 are demodulated, decoded and time-expanded, thus becoming reproducing video data R-DATA1, R-DATA2, . . . .

Then when the magnetic tape is fed in the backward direction, as shown in FIG. 38, the first magnetic head 2001-1 makes tracking of the preceding adjacent track (i.e., forward track) prior to the second magnetic head 2001-1 which is the reproducing head. Here, likewise during the recording, the amount of control of the first magnetic head actuator 2106-1 is stored in the tracking memory 2115. The second magnetic head 2002-2 traces the magnetic tape 2010 to do reproducing based on the content of the tracking memory 2115.

Namely, the amount of control TR1, TR2, . . . stored in the tracking memory 2115, i.e. the result of the tracking by the first magnetic head 2001-1, is applied to the second magnetic head actuator 2106-2 during reproducing by the second magnetic head 2001-2.

As mentioned above, the first magnetic head 2001-1 makes recording/reproducing when the magnetic tape is fed in the forward direction and tracking of the forward track, while the second magnetic head 2001-2 makes recording and reproducing when the magnetic tape is fed in the backward direction. Therefore, reciprocating recording/reproducing can be realized.

Figure 39:
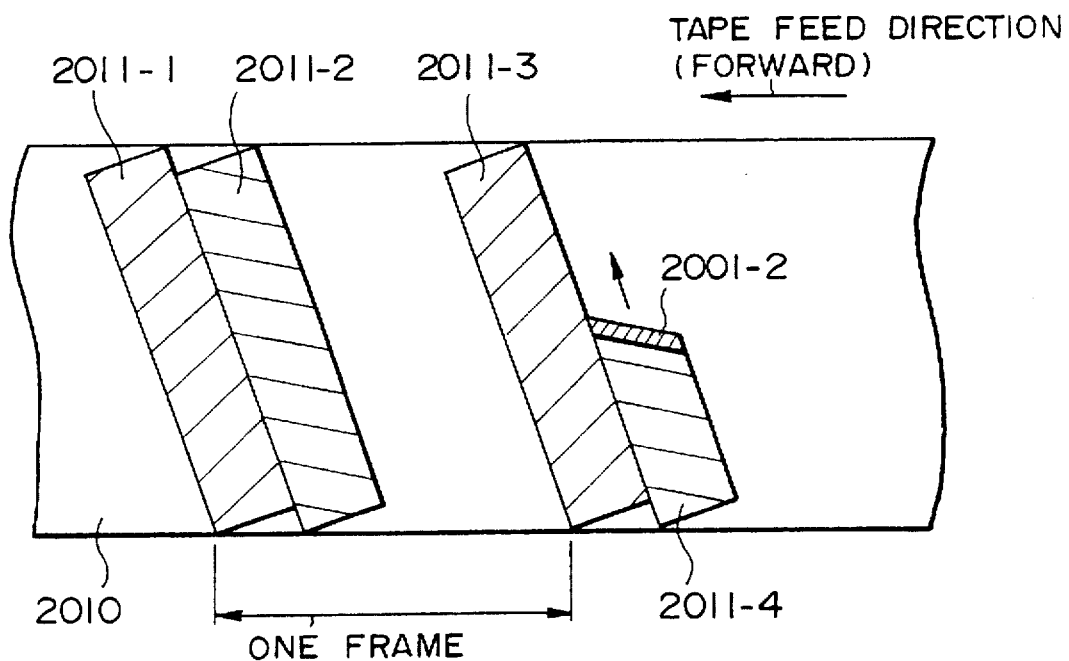
FIG. 39 is a diagram showing a track pattern on the magnetic tape when the magnetic tape is fed in the forward direction according to a tenth embodiment.
Figure 40:
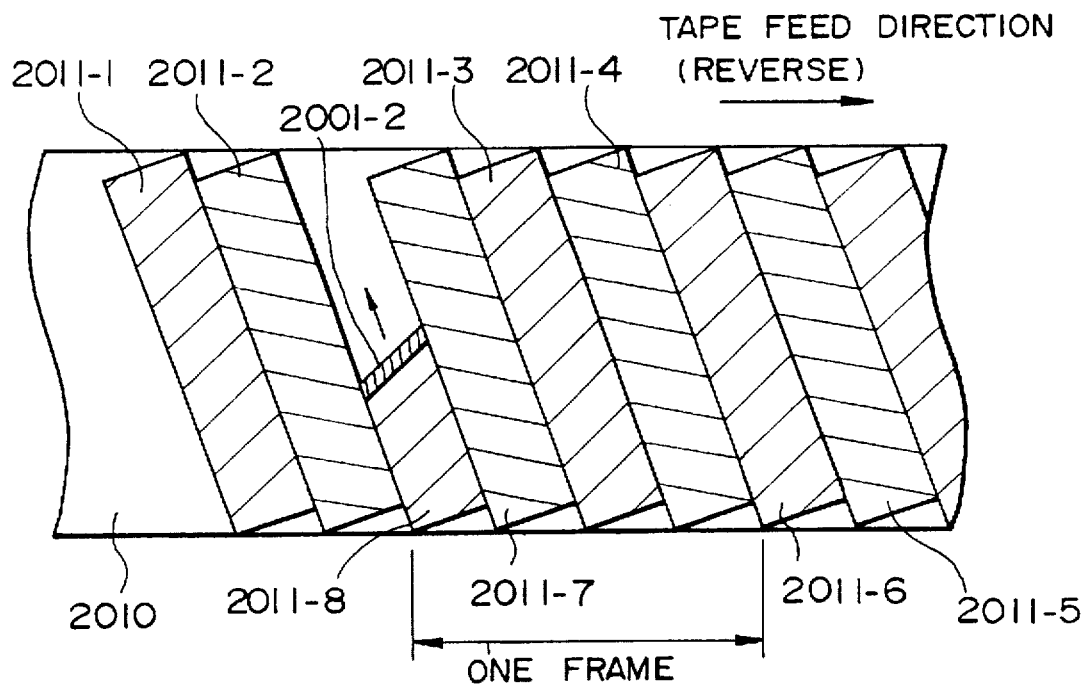
FIG. 40 is a diagram showing track pattern when the magnetic tape is fed in the backward or reverse direction in the tenth embodiment.
Figure 41:
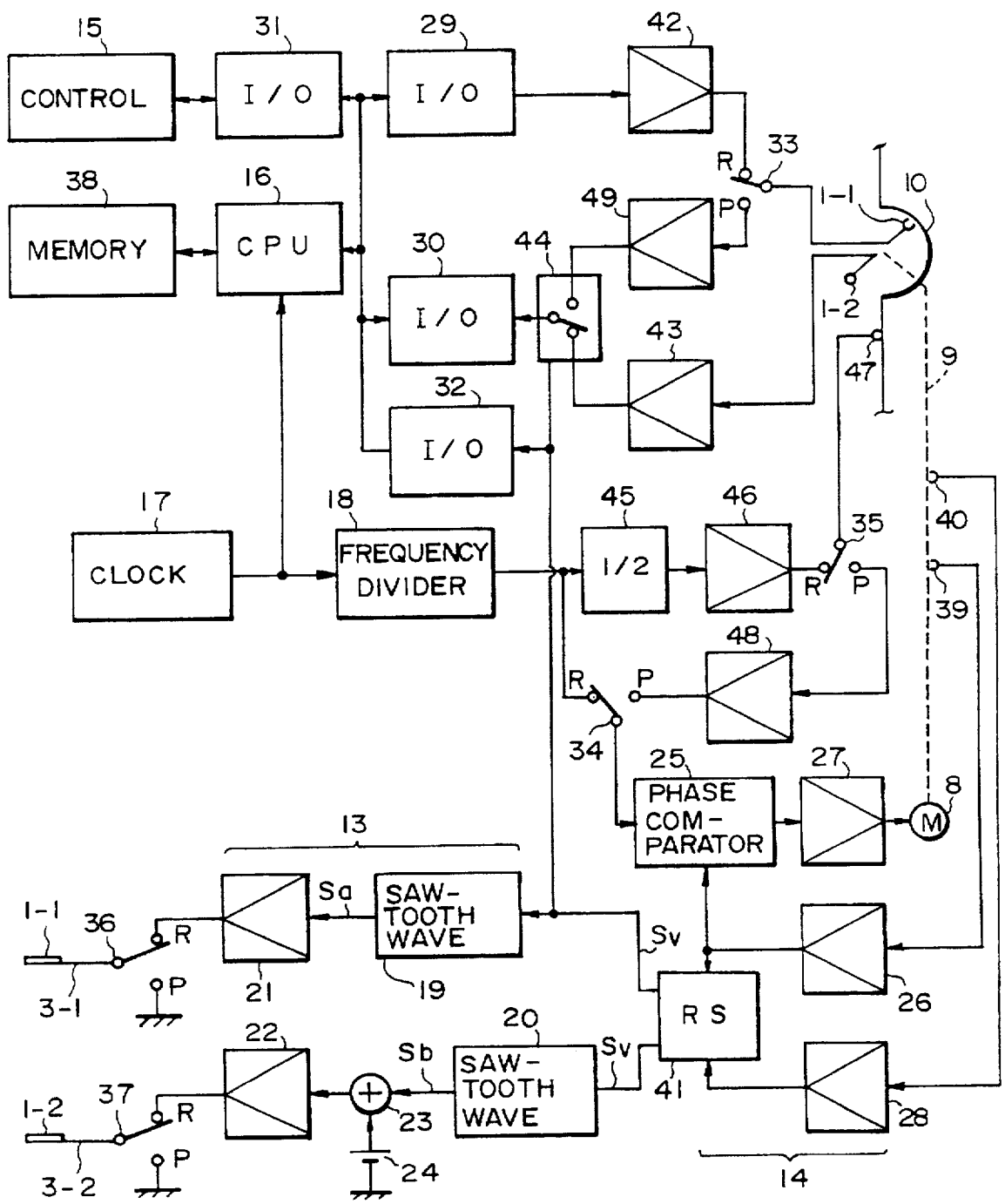
FIG. 41 is a block diagram showing a magnetic recording and reproducing apparatus according to a first prior art.
Figure 42:
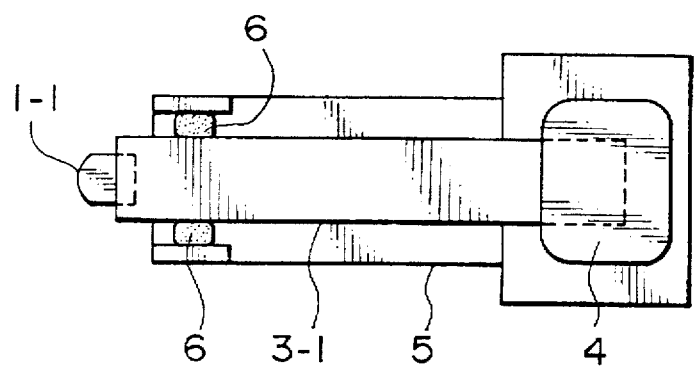
FIG. 42 is a plan view showing an electric strain element supporting the magnetic head in the first prior art.
Figure 43:
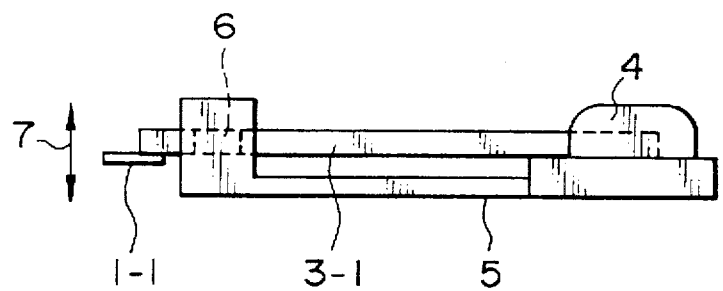
FIG. 43 is a side elevational view showing the electric strain element in the first prior art.
Figure 44:
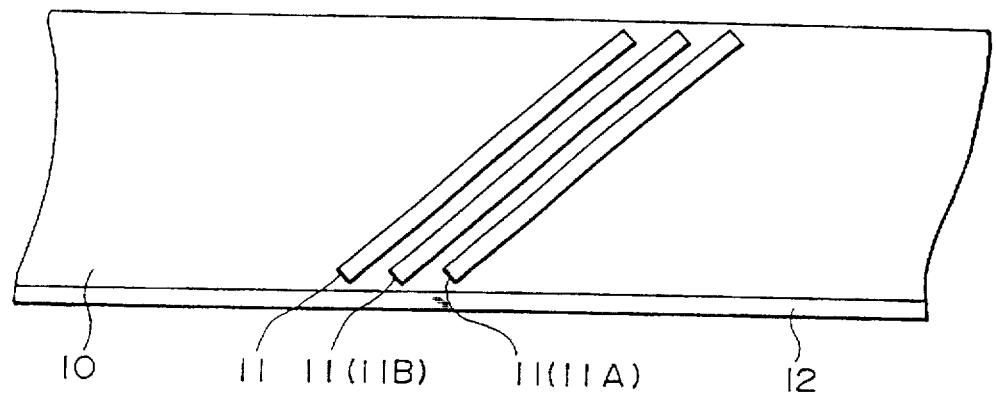
FIG. 44 is a diagram showing a track pattern on the magnetic tape in the first prior art.
Figure 45:
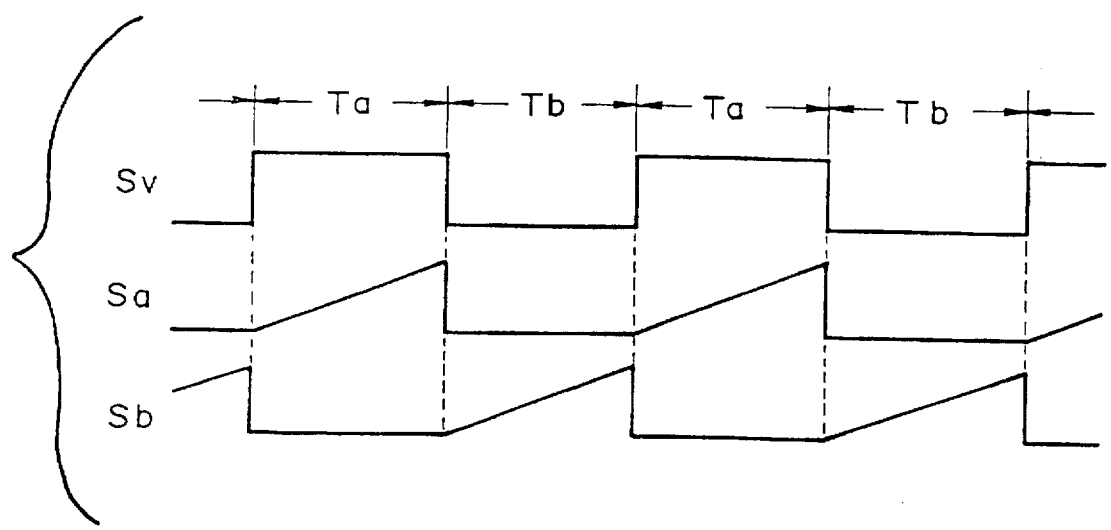
FIG. 45 is a timing diagram showing the operation timing in the first prior art.
Figure 46:
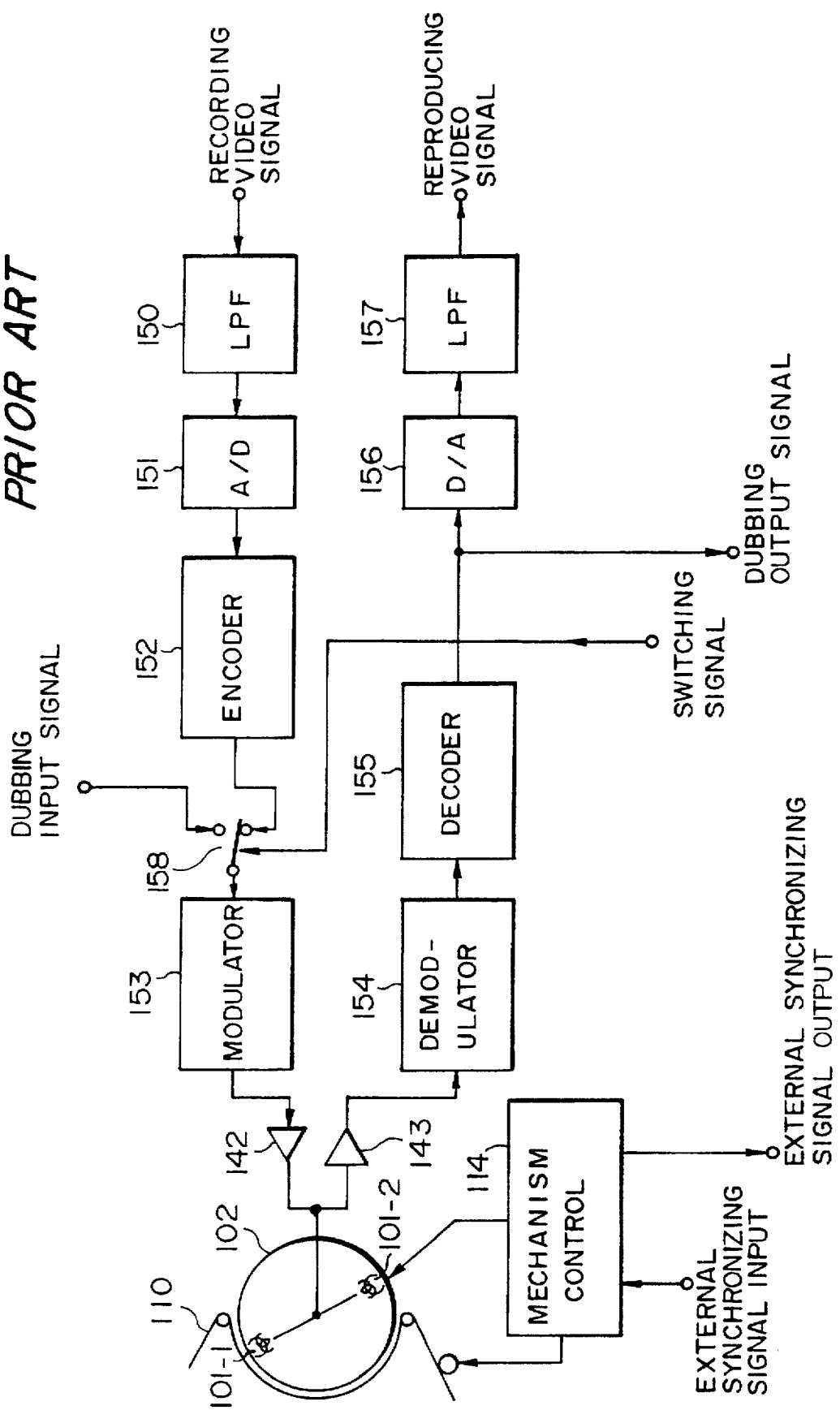
FIG. 46 is a block diagram showing a magnetic recording and reproducing apparatus according to a second prior art.

In this embodiment, the forward track and the backward track are alternately arranged. The forward and backward tracks may be arranged in an alternative pattern such as shown in FIGS. 39 and 40.

In recording widen the magnetic tape is fed in the forward direction, the first magnetic head 2001-1 records on the forward track 2011-1 during the first rotation of the rotary drum 2010, and the second magnetic head 2001-2 records the forward track 2011-2 during the same first rotation.

In recording when the magnetic tape is fed in the backward direction, the first magnetic head 2001-1 makes tracking of the forward track 2011-1 during the first rotation of the rotary drum 2010. The amount of control at that time is stored in the tracking memory 2115, and the second magnetic head 2001-2 at the first rotation of the rotary drum 2010 records the backward track 2011-5, with applying the amount of control to the second magnetic head actuator 2001-2. Further, the first magnetic head 2001-1 at the second rotation of the rotary drum 2010 records the backward track 2011-6, with applying to the first magnetic head actuator 2106-1 the amount of control by which the forward track 2011-1 was subjected to tracking.

Then in reproducing when the magnetic tape is fed in the forward direction, like during recording, the first and second magnetic heads 2001-1, 2001-2 perform reproducing of the forward track 2011-1, 2011-2 during the first rotation of the rotary drum 2010. Also when the magnetic tape is fed in the backward direction, the forward track 2011-1 is subjected to tracking so that the backward tracks 2011-5, 2011-6 are reproduced by the first and second magnetic heads 2001-1, 2001-2.

In this embodiment, only one magnetic head is used. Alternatively, two magnetic heads can be fixed on the magnetic head actuators in combination.

Further in this embodiment, one cycle of information is defined as one frame, and one cycle of information is recorded on two tracks. Alternatively, one cycle of information may be one field, or one frame plus an integral number of fields. The number of tracks on and from which one cycle of information is to be recorded and reproduced should not be limited to any specific number.

As mentioned above, partly since during one cycle scanning period of information the rotary drum is rotated at a more-than-one-fold speed to scan 2N or more tracks during one cycle scanning period, partly since intermittent forward recording/reproducing is performed on the magnetic tape at the forward scanning track by a plurality of magnetic heads and, during the backward scanning track, a plurality of or one magnetic head are caused to follow the forward recorded portion by the tracking control circuit, and partly since backward recording/reproducing is performed, during part of forward recording/reproducing on tracks of the magnetic heads, by storing the amount of head position control and by applying the amount of head position control stored in the magnetic head actuators which moves the magnetic heads making backward recording, it is possible to instantaneously switch from forward recording/reproducing to backward recording/reproducing and vice versa without turning the magnetic tape inside out, thus enabling reciprocating recording/reproducing. Further, it is possible to increase the number of scanning tracks so that video.audio signals can be recorded/reproduced with high quality.

What is claimed is:

1. A magnetic recording and reproducing apparatus comprising:

a rotary drum driven at a first rotational speed during self-recording, self-reproducing, dubbing-recording and dubbing-reproducing wherein the first rotational speed rotates the rotary drum m times per frame where m is an integer greater than 1, said rotary drum having an outer periphery frictionally engageable with a magnetic tape such that an axis of rotation of said rotary drum is disposed at a predetermined angle with respect to a moving direction of the magnetic tape;

m magnetic heads disposed on the outer periphery of said rotary drum rotating past the magnetic tape during self-recording, self-reproducing, dubbing-recording and dubbing-reproducing;

magnetic head drive and control means for causing one of m said magnetic heads to perform scanning of tracks having a predetermined width on the magnetic tape during self-recording and self-reproducing, and for causing m said magnetic heads to successively scan tracks having the predetermined width on the magnetic tape during dubbing-recording and dubbing-reproducing;

tape driving means for driving the magnetic tape at a first tape speed during self-recording and self-reproducing and for driving the magnetic tape at a second tape speed during dubbing-recording and dubbing-reproducing, wherein the second tape speed is m times the first tape speed;

time axis compressing means for compressing a time axis of a recording signal by 1/m times and for supplying the recording signal whose time axis is compressed by 1/m times to one of m said magnetic heads during self-recording and to m said magnetic heads during dubbing-recording;

time axis expanding means for expanding the time axis of a reproducing signal during self-reproducing;

dubbing input means for fetching the recording signal from a dubbing input source, whose time axis is compressed by 1/m times and supplying the fetched recording signal to m said magnetic heads during dubbing-recording; and dubbing output means for fetching the reproducing signal, whose time axis is compressed by 1/m times, from said magnetic heads and outputting the fetched reproducing signal.

2. The magnetic recording and reproducing apparatus according to claim 1, wherein said magnetic head drive and control means includes dubbing synchronizing means for causing said magnetic heads to record in timed relation with a synchronizing signal to synchrome the supply of the reproducing signal during dubbing-recording.

3. The magnetic recording and reproducing apparatus according to claim 1, wherein said magnetic head drive and control means includes tracking control means for controlling tracking of at least one of said magnetic heads in such a manner that adjacent tracks are continuously scanned by said magnetic head.

4. The magnetic recording and reproducing apparatus according to claim 1, and further comprising:

an A/D converter converting an analog recording signal into a digital recording signal and supplying the digital recording signal to said time axis compressing means; and a D/A converter converting a digital reproducing signal, whose time axis is expanded by said time axis expanding means, into an analog reproducing signal.

5. The magnetic recording and reproducing apparatus according to claim 4, and further comprising:

means for encoding the digital recording signal for error correction; and means for decoding the digital reproducing signal for error correction.

6. The magnetic recording and reproducing apparatus according to claim 4, and further comprising:

means for encoding the digital recording signal for recording; and means for decoding the digital reproducing signal for recording.

7. A magnetic recording and reproducing system comprising:

a slave deck including a slave rotary drum having two slave magnetic heads disposed thereon for reading from and recording to a slave magnetic tape wound around the slave rotary drum;

slave deck magnetic head control means for controlling the slave magnetic heads;

slave deck tape speed control means for controlling slave magnetic tape speed;

slave deck compressing means for compressing a recording signal by a factor of ½;

slave deck expanding means for expanding a reproducing signal by a factor of 2;

a master deck including a master rotary drum having two master magnetic heads disposed thereon for reading from and recording to a master magnetic tape wound around the master rotary drum;

master deck magnetic head control means for controlling the master magnetic heads;

master deck tape speed control means for controlling master magnetic tape speed;

switch means for switching between a self-recording mode in which the recording signal is supplied to said slave deck compressing means and then switched so as to be supplied to the slave magnetic heads for recording by one of the slave magnetic heads and a dubbing-recording mode in which a compressed recording signal is supplied from said master deck and then switched so as to be supplied to the slave magnetic heads for recording by both of the slave magnetic heads;

wherein when the magnetic recording and reproducing system is in a self-reproducing mode or the self-recording mode:

said slave deck magnetic head control means causes one of the slave magnetic heads to read a self-reproducing signal from the slave magnetic tape or record the recording signal to the slave magnetic tape, respectively; and said slave deck tape speed control means causes the slave magnetic tape to travel at a first tape speed, and wherein when the magnetic recording and reproducing system is in the dubbing-recording mode:

said master deck magnetic head control means causes both of the master deck magnetic heads to read the compressed recording signal from the master magnetic tape, said master deck tape speed control means causes the master magnetic tape to travel at a second tape speed which twice as fast as the first tape speed, said slave deck magnetic head control means causes both of the slave magnetic heads to record the compressed recording signal from the master deck, and said slave deck tape speed control means causes the slave magnetic tape to travel at the second speed.

8. The magnetic recording and reproducing system of claim 7, further including a dubbing-reproducing mode, wherein when the system is in the dubbing-reproducing mode:

said slave deck magnetic head control means causes both of the slave deck magnetic heads to read the dubbing-reproducing signal from the slave magnetic tape;

said slave deck expanding means expanding the dubbing-reproducing signal by a factor of 2.

9. The magnetic recording and reproducing system of claim 7, and further comprising:

dubbing synchronizing means for synchronizing the slave magnetic heads and the master magnetic heads by supplying a synchronizing signal from said master deck to said slave deck when the system is in the dubbing-recording mode.

10. The magnetic recording and reproducing system of claim 7, and further comprising:

an A/D converter converting an analog recording signal into a digital recording signal and supplying the digital recording signal to said slave deck compressing means; and a D/A converter converting an expanded reproducing signal from said slave deck expanding means.

11. The magnetic recording and reproducing system of claim 10, and further comprising:

means for encoding the digital recording signal for error correction; and means for decoding the digital reproducing signal for error correction.

12. A magnetic recording and reproducing system comprising:

a master deck including a master rotary drum having m magnetic heads disposed thereon for reading from and recording to a master magnetic tape wound around the master rotary drum;

master deck magnetic head control means for controlling the master magnetic heads;

master deck tape speed control means for controlling master deck tape speed;

a slave deck including a slave rotary drum having m magnetic heads disposed thereon for reading from and recording to a slave magnetic tape wound around the slave rotary drum;

slave deck magnetic head control means for controlling the slave magnetic heads;

slave deck tape speed control means for controlling slave deck tape speed;

slave deck compressing means for compressing a recording signal by a factor of 1/m;

slave deck expanding means for expanding a reproducing signal by a factor of m; and switch means for switching between a self-recording mode in which a recording signal is supplied to said slave deck compressing means and then switched so as to be supplied to the slave magnetic heads for recording by one of the m slave magnetic heads and a dubbing-recording mode in which a compressed recording signal is supplied from said master deck and then switched so as to be supplied to the slave magnetic heads for recording by all of said m slave magnetic heads;

wherein when the magnetic recording and reproducing system is in the self-reproducing mode or the self-recording mode:

said slave deck magnetic head control means causes one of the slave deck magnetic heads to read a self-reproducing signal from the slave magnetic tape or record the recording signal to the slave magnetic tape, respectively; and said slave deck tape speed control means causes the slave magnetic tape to travel at a first speed, and wherein when the magnetic recording and reproducing system is in the dubbing-recording mode:

said master deck magnetic head control means causes m of the master deck magnetic heads to read the compressed recording signal from the master magnetic tape, said master deck tape speed control means causes the master magnetic tape to travel at a second speed, which is m times as fast as the first speed, said slave deck magnetic head control means causes m of the slave magnetic heads to record the compressed recording signal from the master deck, and said slave deck tape speed control means causes the slave magnetic tape to travel at the second speed.

13. The magnetic recording and reproducing system of claim 12, further including a dubbing-reproducing mode, wherein when the system is in the dubbing-reproducing mode:

said slave deck magnetic head control means causes m of the slave deck magnetic heads to read the dubbing-reproducing signal from the slave magnetic tape;

said slave deck expanding means expanding the dubbing-reproducing signal by a factor of m.

14. The magnetic recording and reproducing system of claim 12, and further comprising:

dubbing synchronizing means for synchronizing the slave magnetic heads and the master magnetic heads by supplying a synchronizing signal from said master deck to said slave deck when the system is in the dubbing-recording mode.

15. The magnetic recording and reproducing system of claim 12, and further comprising:

an A/D converter converting an analog recording signal into a digital recording signal and supplying the digital recording signal to said slave deck compressing means; and a D/A converter converting in expanded reproducing signal from said slave deck expanding means.

16. The magnetic recording and reproducing system of claim 15, and further comprising:

means for encoding the digital recording signal for error correction; and means for decoding the digital reproducing signal for error correction.

* * * * *